US009744094B2

(12) United States Patent
Liu et al.

(10) Patent No.: US 9,744,094 B2

(45) Date of Patent: Aug. 29, 2017

(54) WALKER APPARATUS AND BACKREST THEREFOR

(71) Applicant: Evolution Technologies Inc., Port Coquitlam (CA)

(72) Inventors: Julian Liu, Port Moody (CA); Nicolas Cinguino, Shanghai (CN)

(73) Assignee: Evolution Technologies Inc. (CA)

( * ) Notice: Subject to any disclaimer, the term of this patent is extended or adjusted under 35 U.S.C. 154(b) by 0 days.

(21) Appl. No.: 15/149,611

(22) Filed: May 9, 2016

(65) Prior Publication Data

US 2016/0250095 A1 Sep. 1, 2016

Related U.S. Application Data

(63) Continuation-in-part of application No. 14/193,806, filed on Feb. 28, 2014, now Pat. No. 9,339,432.

(51) Int. Cl.

| | |
|---|---|
| ***B62B 7/08*** | (2006.01) |
| ***A61H 3/04*** | (2006.01) |
| *A61H 3/00* | (2006.01) |

(52) U.S. Cl.

CPC ......... *A61H 3/04* (2013.01); *A61H 2003/002* (2013.01); *A61H 2003/046* (2013.01); *A61H 2201/0161* (2013.01); *A61H 2201/0192* (2013.01); *A61H 2201/1623* (2013.01); *A61H 2201/1633* (2013.01)

(58) Field of Classification Search

CPC .... A61H 3/00; A61H 3/04; A61H 2201/1623; B62B 7/08; B62B 7/064; A47C 7/44

See application file for complete search history.

(56) References Cited

U.S. PATENT DOCUMENTS

| | | | | |
|---|---|---|---|---|
| 188,835 A | | 3/1877 | Allen | |
| 291,351 A | | 1/1884 | Jackson | |
| 522,117 A | | 6/1894 | Humphrey | |
| 534,443 A | | 2/1895 | Manguine | |
| 879,803 A | | 2/1908 | Vlasak | |
| 1,767,925 A | | 6/1930 | Hargreaves | |
| 2,169,860 A | | 8/1939 | Von Hoom | |
| 2,469,359 A | * | 5/1949 | Ames | A61H 3/04 280/211 |
| 2,483,307 A | | 9/1949 | Wheary, Jr. | |

(Continued)

FOREIGN PATENT DOCUMENTS

| | | |
|---|---|---|
| AT | 214095 B | 3/1961 |
| AT | 242315 B | 9/1965 |

(Continued)

OTHER PUBLICATIONS

US 7,364,173, 04/2008, Meyers et al. (withdrawn)

(Continued)

*Primary Examiner* — Bryan Evans

(74) *Attorney, Agent, or Firm* — Berenato & White, LLC

(57) ABSTRACT

There is provided a walker apparatus having a pair of spaced-apart, upright frame members. The walker apparatus includes a seat operatively connected to the upright frame members. The walker apparatus has a backrest cantilevered from the frame members. The backrest has at least one opening extending therethrough for permitting a user's vision past the backrest when the user grips the upright frame members.

20 Claims, 43 Drawing Sheets

(56) References Cited

U.S. PATENT DOCUMENTS

| | | | |
|---|---|---|---|
| 2,631,655 | A | 3/1953 | Jannello |
| 2,656,881 | A | 10/1953 | Hamilton |
| 2,681,809 | A | 6/1954 | Hamill |
| 2,732,047 | A | 1/1956 | Finkelstein |
| 2,812,227 | A | 11/1957 | Hill |
| 2,864,466 | A | 12/1958 | Taylor |
| 2,866,495 | A | 12/1958 | Diehl et al. |
| 2,937,248 | A | 5/1960 | Michetti |
| 2,987,149 | A | 6/1961 | Finkelstein |
| 3,018,506 | A | 1/1962 | Haydock |
| 3,061,049 | A | 10/1962 | Bramley |
| 3,109,899 | A | 11/1963 | Pastene |
| 3,142,351 | A | 7/1964 | Green |
| 3,194,577 | A | 7/1965 | Berlin |
| 3,268,965 | A | 8/1966 | Arthur |
| 3,288,250 | A | 11/1966 | Oja et al. |
| 3,376,400 | A | 4/1968 | Batt et al. |
| 3,409,105 | A | 11/1968 | Clinton |
| 3,690,652 | A | 9/1972 | Schneider |
| 3,692,155 | A | 9/1972 | Laurita |
| 3,890,668 | A | 6/1975 | Stosberg et al. |
| 3,903,944 | A | 9/1975 | Montgomery et al. |
| 3,927,727 | A | 12/1975 | Hanagan |
| 3,969,964 | A | 7/1976 | George et al. |
| 4,029,279 | A | 6/1977 | Nakatani |
| 4,029,311 | A | 6/1977 | Chanslor et al. |
| 4,056,115 | A | 11/1977 | Thomas |
| 4,087,141 | A | 5/1978 | Roberts |
| 4,116,464 | A | 9/1978 | Haley |
| 4,149,721 | A | 4/1979 | Strickland |
| 4,184,618 | A | 1/1980 | Jones |
| 4,185,936 | A | 1/1980 | Takahashi |
| 4,261,561 | A | 4/1981 | Ilon |
| 4,286,401 | A | 9/1981 | Pachmayr et al. |
| 4,325,561 | A | 4/1982 | Lynn |
| 4,371,183 | A | 2/1983 | Dion |
| 4,384,713 | A | 5/1983 | Deutsch et al. |
| 4,414,702 | A | 11/1983 | Neumann |
| 4,415,198 | A | 11/1983 | Brearley |
| 4,449,750 | A | 5/1984 | Pultman |
| 4,460,188 | A | 7/1984 | Maloof |
| 4,462,138 | A | 7/1984 | Black |
| 4,477,098 | A | 10/1984 | Minnebraker |
| 4,493,488 | A | 1/1985 | Panaia et al. |
| 4,494,271 | A | 1/1985 | Perlin et al. |
| 4,509,662 | A | 4/1985 | Weiss |
| 4,570,370 | A | 2/1986 | Smith et al. |
| 4,572,409 | A | 2/1986 | Finnegan |
| 4,596,484 | A | 6/1986 | Nakatani |
| 4,659,099 | A | 4/1987 | Malone |
| 4,669,146 | A | 6/1987 | Saito et al. |
| 4,676,416 | A | 6/1987 | Harmon |
| 4,722,114 | A | 2/1988 | Neumann |
| 4,740,010 | A | 4/1988 | Moskovitz |
| 4,761,092 | A | 8/1988 | Nakatani |
| 4,765,644 | A | 8/1988 | Bell |
| 4,800,911 | A | 1/1989 | Endres et al. |
| 4,800,991 | A | 1/1989 | Miller |
| 4,830,035 | A | 5/1989 | Liu |
| 4,853,500 | A | 8/1989 | Tydlacka |
| 4,856,123 | A | 8/1989 | Henderson et al. |
| 4,883,317 | A | 11/1989 | Davenport |
| 4,890,355 | A | 1/1990 | Schulten |
| 4,907,794 | A | 3/1990 | Rose |
| 4,907,839 | A | 3/1990 | Rose et al. |
| 4,913,452 | A | 4/1990 | Zun |
| 4,930,697 | A | 6/1990 | Takahashi et al. |
| 4,962,781 | A | 10/1990 | Kanbar |
| 4,974,760 | A | 12/1990 | Miller |
| 5,012,963 | A | 5/1991 | Rosenbaum |
| 5,020,560 | A | 6/1991 | Turbeville |
| 5,046,748 | A | 9/1991 | Oat-Judge |
| 5,052,075 | A | 10/1991 | Harris |
| 5,103,530 | A | 4/1992 | Andrisin, III et al. |
| 5,109,569 | A | 5/1992 | Shaw |
| 5,125,685 | A | 6/1992 | Takahashi et al. |
| 5,158,313 | A | 10/1992 | Becker |
| 5,167,048 | A | 12/1992 | Geiger et al. |
| 5,188,139 | A | 2/1993 | Garelick |
| 5,268,986 | A | 12/1993 | Kakii et al. |
| 5,269,157 | A | 12/1993 | Ciminelli et al. |
| 5,279,180 | A | 1/1994 | Henriksson |
| 5,293,965 | A | 3/1994 | Nagano |
| 5,294,027 | A | 3/1994 | Plastina |
| 5,348,336 | A | 9/1994 | Fernie et al. |
| 5,353,824 | A | 10/1994 | Woods et al. |
| 5,356,237 | A | 10/1994 | Sung |
| 5,380,034 | A | 1/1995 | Wilson |
| 2,710,084 | A | 6/1995 | Braverman |
| 5,429,377 | A | 7/1995 | Duer |
| 5,433,235 | A | 7/1995 | Miric et al. |
| 5,465,745 | A | 11/1995 | Davis |
| 5,465,986 | A | 11/1995 | MacRae |
| 5,475,896 | A | 12/1995 | Wang |
| 5,482,189 | A | 1/1996 | Dentler et al. |
| 5,499,697 | A | 3/1996 | Trimble et al. |
| 5,513,789 | A | 5/1996 | Woods et al. |
| 5,527,096 | A | 6/1996 | Shimer |
| 5,531,238 | A | 7/1996 | Azzarelli et al. |
| 5,551,413 | A | 9/1996 | Walk |
| 5,593,461 | A | 1/1997 | Reppert et al. |
| 5,594,974 | A | 1/1997 | Wattron et al. |
| 5,605,345 | A | 2/1997 | Erfurth et al. |
| 5,621,997 | A | 4/1997 | Pearce |
| 5,622,404 | A | 4/1997 | Menne |
| 5,632,362 | A | 5/1997 | Leitner |
| 5,639,052 | A | 6/1997 | Sauve |
| 5,640,741 | A | 6/1997 | Yano |
| 5,662,342 | A | 9/1997 | Basharat |
| 5,687,984 | A | 11/1997 | Samuel |
| 5,692,762 | A | 12/1997 | Obitts |
| 5,722,717 | A | 3/1998 | Rettenberger |
| 5,772,234 | A | 6/1998 | Luo |
| 5,774,936 | A | 7/1998 | Vetter |
| 5,775,352 | A | 7/1998 | Obitts |
| 5,813,582 | A | 9/1998 | Wright |
| 5,816,650 | A | 10/1998 | Lucas, Jr. |
| 5,865,065 | A | 2/1999 | Chiu |
| 5,896,779 | A | 4/1999 | Biersteker et al. |
| 5,901,891 | A | 5/1999 | Douglass |
| 5,915,712 | A | 6/1999 | Stephenson et al. |
| 5,927,441 | A | 7/1999 | Luo |
| 5,953,962 | A | 9/1999 | Hewson |
| 5,954,161 | A | 9/1999 | Lee |
| 6,032,765 | A | 3/2000 | Hsi-Chia |
| 6,047,439 | A | 4/2000 | Stearn |
| 6,079,290 | A | 6/2000 | Li |
| 6,079,894 | A | 6/2000 | Obitts |
| 6,082,468 | A | 7/2000 | Pusateri et al. |
| 6,098,487 | A | 8/2000 | Chien |
| 6,099,002 | A | 8/2000 | Uchiyama |
| 6,112,446 | A | 9/2000 | Förster et al. |
| 6,135,475 | A | 10/2000 | Brown et al. |
| 6,142,526 | A | 11/2000 | Katz |
| 6,161,896 | A | 12/2000 | Johnson et al. |
| 6,164,154 | A | 12/2000 | Munger et al. |
| 6,189,914 | B1 | 2/2001 | Worth et al. |
| 6,192,772 | B1 | 2/2001 | Huang |
| 6,196,562 | B1 | 3/2001 | Zhuang |
| 6,202,502 | B1 | 3/2001 | Chung-Che |
| 6,216,825 | B1 | 4/2001 | Hung |
| 6,247,741 | B1 | 6/2001 | Seel et al. |
| 6,247,882 | B1 | 6/2001 | Huang |
| 6,283,484 | B1 | 9/2001 | Malmström |
| 6,296,261 | B1 | 10/2001 | deGoma |
| 6,296,263 | B1 | 10/2001 | Schultz et al. |
| 6,311,708 | B1 | 11/2001 | Howle |
| 6,318,392 | B1 | 11/2001 | Chen |
| 6,338,355 | B1 | 1/2002 | Cheng |
| 6,338,493 | B1 | 1/2002 | Wohlgemuth et al. |
| 6,340,168 | B1 | 1/2002 | Woleen |
| 6,347,777 | B1 | 2/2002 | Webber et al. |
| 6,354,619 | B1 | 3/2002 | Kim |
| 6,364,070 | B1 | 4/2002 | Chen |

(56) References Cited

U.S. PATENT DOCUMENTS 6,371,142 B1 4/2002 Battiston
6,378,883 B1 4/2002 Epstein
6,378,942 B1 * 4/2002 Chu ........................ A47C 7/46
297/284.4
6,386,575 B1 5/2002 Turner
6,401,321 B2 6/2002 Carey et al.
6,409,196 B1 6/2002 McFarland
6,442,797 B1 9/2002 Yang et al.
6,467,785 B2 10/2002 Toppses
6,491,318 B1 12/2002 Galt et al.
6,494,469 B1 12/2002 Hara et al.
6,502,280 B2 1/2003 Looker
6,527,136 B1 3/2003 Sabounjian
6,584,641 B1 7/2003 Milbredt
6,604,789 B1 8/2003 Downing
6,647,825 B1 11/2003 Lin
6,651,994 B2 11/2003 Hallgrimsson et al.
6,655,702 B2 12/2003 Senger
6,659,478 B2 12/2003 Hallgrimsson et al.
6,688,633 B2 2/2004 van't Schip
6,754,936 B2 6/2004 Ereñaga
6,755,285 B1 6/2004 Wu
6,769,701 B1 8/2004 Clausen
6,810,560 B1 11/2004 Tsai
6,817,066 B1 11/2004 Williams et al.
6,837,503 B2 1/2005 Chen et al.
D501,432 S 2/2005 Møller
6,877,519 B2 4/2005 Fink
6,886,216 B2 5/2005 Graham et al.
6,886,575 B2 5/2005 Diamond
6,889,998 B2 5/2005 Sterns et al.
7,052,030 B2 5/2006 Serhan
7,090,239 B2 8/2006 Yoshie et al.
7,108,004 B2 9/2006 Cowie et al.
7,182,179 B2 2/2007 Tolfsen
7,211,744 B2 5/2007 Jorgensen
7,219,906 B2 5/2007 Hallgrimsson et al.
7,231,689 B2 6/2007 Scheiber et al.
7,278,436 B2 10/2007 Gale et al.
7,290,742 B2 11/2007 Wang
7,306,246 B2 12/2007 Gale
7,353,566 B2 4/2008 Scheiber et al.
7,377,285 B2 5/2008 Karasin et al.
7,383,611 B2 6/2008 Foster
7,384,058 B2 6/2008 Munsey et al.
7,410,179 B2 8/2008 Lönkvist
7,422,550 B1 9/2008 Pinero et al.
7,445,216 B1 11/2008 Chou
7,494,138 B2 2/2009 Graham
7,500,689 B2 3/2009 Pasternak et al.
7,559,560 B2 7/2009 Li et al.
7,587,852 B1 9/2009 Harms
7,775,547 B2 8/2010 Dotsey et al.
7,828,305 B2 11/2010 Meyers et al.
7,837,205 B2 11/2010 Simard
7,841,257 B2 11/2010 Tomandl
7,926,834 B2 4/2011 Willis
7,980,415 B2 7/2011 Crawley
7,984,724 B1 7/2011 Eberle
8,002,363 B2 8/2011 Cheng
8,020,679 B2 9/2011 Wu
8,083,239 B2 12/2011 Liu
8,087,127 B2 1/2012 Dayt
8,157,273 B2 4/2012 Bar-Lev
8,167,351 B2 5/2012 Plowman
8,251,380 B2 8/2012 Liu
8,251,391 B2 8/2012 Kohler et al.
8,313,066 B2 11/2012 Hampton et al.
8,424,215 B2 4/2013 Quintiliani et al.
8,434,171 B2 5/2013 Wang
8,448,960 B2 5/2013 Liu
8,505,936 B2 8/2013 Liu
8,511,694 B2 8/2013 Bradshaw et al.
8,517,399 B2 8/2013 Liu
8,573,613 B2 11/2013 Liu
8,602,424 B2 12/2013 Liu
D697,163 S 1/2014 Bietsch
8,801,073 B1 8/2014 Gray, Jr. et al.
8,857,093 B2 10/2014 Hogue
8,864,151 B1 10/2014 Liu
8,936,256 B2 1/2015 Liu
9,022,397 B1 5/2015 Prettyman
9,022,413 B2 5/2015 Liu
2002/0079663 A1 6/2002 Hallgrimsson et al.
2002/0093178 A1 7/2002 Turner et al.
2002/0140196 A1 10/2002 Crouch et al.
2003/0010368 A1 1/2003 MacKinnon
2003/0226584 A1 12/2003 Serhan
2004/0094999 A1 5/2004 Volotsenko
2004/0111830 A1 6/2004 Cooper et al.
2005/0001398 A1 1/2005 Serhan
2005/0057021 A1 3/2005 Miyoshi
2005/0067804 A1 3/2005 Tolfsen
2005/0121481 A1 6/2005 Chiu
2005/0156395 A1 7/2005 Bohn
2005/0156404 A1 7/2005 Lauren et al.
2005/0211285 A1 9/2005 Cowie et al.
2005/0248169 A1 11/2005 Clark et al.
2005/0250605 A1 11/2005 Moore et al.
2006/0059656 A1 3/2006 Hackett
2006/0156511 A1 7/2006 Li
2007/0163633 A1 * 7/2007 Gale ........................ A61H 3/04
135/67
2007/0170699 A1 7/2007 Li et al.
2007/0199586 A1 8/2007 Cheng
2007/0227570 A1 10/2007 Gale et al.
2007/0235067 A1 10/2007 Gale et al.
2007/0267054 A1 11/2007 Meyers et al.
2007/0267453 A1 11/2007 Carroll
2007/0278271 A1 12/2007 Koren
2007/0278768 A1 12/2007 Lynam
2007/0283990 A1 12/2007 Fernandez et al.
2008/0042476 A1 2/2008 Hei et al.
2008/0079230 A1 4/2008 Graham
2008/0093874 A1 4/2008 Partch
2008/0111349 A1 5/2008 Willis
2008/0121258 A1 5/2008 Lin
2008/0129016 A1 6/2008 Willis
2008/0174084 A1 7/2008 Gee
2009/0033052 A1 2/2009 Bradshaw et al.
2009/0206578 A1 8/2009 Pizmony et al.
2010/0083994 A1 4/2010 Liu
2010/0301574 A1 12/2010 Derks
2011/0030749 A1 2/2011 Miller
2011/0146027 A1 6/2011 Tsai
2011/0173861 A1 7/2011 Roth
2011/0187067 A1 8/2011 Staggs
2011/0241303 A1 10/2011 Campbell
2012/0043739 A1 2/2012 Lui
2012/0084940 A1 4/2012 Tsai
2012/0104710 A1 5/2012 Liu
2012/0133106 A1 5/2012 Llu
2012/0205882 A1 8/2012 Staggs
2012/0280463 A1 11/2012 Liu
2012/0299272 A1 11/2012 Liu
2013/0061893 A1 3/2013 Nilsson et al.
2013/0062864 A1 3/2013 Huang
2013/0168947 A1 7/2013 Offord
2013/0187356 A1 7/2013 Hazeleger
2013/0264787 A1 10/2013 Cheng et al.
2013/0320640 A1 12/2013 Liu
2014/0125037 A1 5/2014 Andersen
2014/0175841 A1 6/2014 Liu
2014/0284891 A1 9/2014 Llu
2014/0305249 A1 10/2014 Liu
2014/0312586 A1 10/2014 Cheng et al.
2014/0333040 A1 11/2014 Liu
2015/0048582 A1 2/2015 Liu

FOREIGN PATENT DOCUMENTS

CA 2137650 A1 6/1998
CA 2285305 A1 10/1998
CA 2352801 A1 6/2000

(56) References Cited

FOREIGN PATENT DOCUMENTS

| | | | |
|---|---|---|---|
| CA | 2329485 | A1 | 6/2002 |
| CA | 2513558 | A1 | 9/2004 |
| CA | 2492392 | A1 | 9/2005 |
| CN | 2551232 | Y | 5/2003 |
| CN | 102512310 | A | 6/2012 |
| CN | 202490148 | U | 10/2012 |
| CN | 203544058 | U | 4/2014 |
| DE | 4328875 | C1 | 2/1995 |
| DE | 29818710 | U1 | 10/1999 |
| DE | 10021151 | A1 | 4/2002 |
| DE | 202004010326 | U1 | 11/2004 |
| DE | 102010031954 | A1 | 1/2012 |
| DE | 202011003227 | U1 | 4/2012 |
| EP | 1092411 | A2 | 4/2001 |
| EP | 2090276 | A1 | 8/2009 |
| EP | 2522404 | A1 | 11/2012 |
| GB | 23483 | A | 0/1913 |
| GB | 365901 | A | 1/1932 |
| GB | 984025 | A | 2/1965 |
| GB | 1396227 | A | 6/1975 |
| GB | 2180508 | A | 4/1987 |
| JP | 09123915 | A | 5/1997 |
| JP | 10291401 | A | 11/1998 |
| NL | 1022512 | C1 | 8/2004 |
| WO | 9206661 | A1 | 4/1992 |
| WO | 9851557 | A1 | 11/1998 |
| WO | 0222070 | A2 | 3/2002 |
| WO | WO2006112779 | A1 | 10/2006 |
| WO | 2008019454 | A1 | 2/2008 |

OTHER PUBLICATIONS

Corresponding International Search Report of PCT/CA2016/050371.

Caster, http://en.wikipedia.org/wiki/Caster, dated Oct. 20, 2010.

Merriam-Webster Dictionary, Arch—Definition and More from the Free Merriam-Webster Dictionary, dated Mar. 26, 2013.

English Abstract web printout of JP9123915.

English Abstract web printout of JP10291401.

English Abstract web printout of NL1022512.

English Abstract web printout of DE4328875.

Thelma Thibodeau, "Affidavit of Thelma Thibodeau", signed on Nov. 20, 2012, 113 pages, Montreal, Canada, listing the following: A web printout screen shot of http://doclibrary.invacare.fr/Office/Europe/Marketing/MktDocIE.nsf/MListeProduct? openform &bu=3000&subgroup=3300&family=3410 (exhibit TT-5) showing the words "Jazz Sales Brochure" besides a listing "May 1, 2008", which allegedly eventually links to "Dolomite Jazz Operating Instructions" shown in exhibit TT-7(http://doclibrary.invacare.fr/Office/Europe/Marketing/MktDocIE.nsf/VALLMDocument/BCCFF695FBFFA571C12575BA0056AB70/$File/OPERATING%20INSTRUCTIONS%20JAZZ.pdf). A web printout screen shot of http://web.archive.org/web/20080512005035/http://www.handicat.com/at-num-18827.html (exhibits TT-16, 17) dated May 12, 2008.

A web printout screen shot of http://web.archive.org/web/20080512005035/http://www.handicat.com/at-num-18827.html (translated) (exhibit TT-18) dated May 12, 2008.

A web printout screen shot of http://doclibrary.invacare.fr/Office/Europe/Marketing/MktDocCor.nsf/MListeDocument?openform &bu=3000&subgroup=3300&family=3410&product=65_JAZ showing the words "TUV Certificate 2007—Jazz" (exhibit T-23).

"Pruefprotokoll/test protocol Rollatoren 07/05", signed on Oct. 30, 2007 (exhibit TT-25), Hannover, Germany.

A web printout screen shot of http://web.archive.org/web/20080214151414/http://www.dolomite.biz/ (exhibit TT-32) dated Feb. 14, 2008.

A web printout screen shot of http://web.archive.org/web/20080919040758/http://www.dolomite.biz/dolomite/dolomite-jazz.php (exhibit TT-34) dated Feb. 14, 2008.

A web printout screen shot of http://web.archive.org/web/20080608193327/http://www.dolomite.biz/dolomite/products.php (exhibit TT-33) dated Feb. 14, 2008.

English Abstract web printout of DE102010031954.

A web screen shot printout from doclibrary.invacare.fr . . . (?) dated Aug. 6, 2013, in which adjacent to the heading "Dolomite Jazz", a "Jazz Sales Brochure" is listed as having a "start date of validity" of May 1, 2008, and in which a "Jazz spare parts list" is listed as having a "start date of validity" of May 1, 2008.

Two web screen shot printouts from doclibrary.invacare.fr . . . (?) dated Aug. 6, 2013, in which adjacent to a "Dolomite Jazz" heading, "2007" is set out by a "TUV certificate".

Two web screen shot printouts from handicat.com/classif4-num-03-09-06.html, dated Aug. 6, 2013, in which adjacent to a "Dolomite Jazz" heading, the words "Crée le . . . May 7, 2008—Modifiée: Jul. 24, 2013", which may mean "Created on May 7, 2008—Modified: Jul. 24, 2013".

A web screen shot printout of: web.archive.org/web/20080508194602/http://www.dolomite.biz/, dated May 8, 2008.

International Search Report and Written Opinion for PCT/CA2015/050058, dated May 1, 2015.

Translated English Abstract of CN2551232.

Translated English Abstract of CN202490148.

Translated English Abstract of DE202011003227.

International Search Report and Written Opinion for International Patent Application No. PCT/CA2016/050978.

International Search Report and Written Opinion for International Patent Application No. PCT/CA2016/051017.

* cited by examiner

WALKER APPARATUS AND BACKREST THEREFOR

CROSS-REFERENCE TO RELATED APPLICATIONS AND CLAIM TO PRIORITY

This application is a Continuation-In-Part of utility application Ser. No. 14/193,806 filed Feb. 28, 2014, the disclosures of which are incorporated herein by reference and to which priority is claimed.

FIELD OF THE INVENTION

There is provided a walker apparatus. In particular, there is provided a walker apparatus and a backrest therefor.

DESCRIPTION OF THE RELATED ART

It is known to have foldable walkers that include backrests. On the one hand, it may be desirable to provide a walker that is light weight and which includes relatively few parts. However, users with mobility issues may also have other medical deficiencies and walkers that include backrests in the form of a single band may be relatively uncomfortable for the user's back.

On the other hand, walkers with large backrests, while offering more back support, may be relatively bulky and may hamper the user's ability to fold the walker. Also, such backrests may inhibit the ability of the user to see past the walker, which may be particularly dangerous for users who may already have visual impairment challenges, for example.

There is accordingly a need for a backrest that promotes greater comfort to the user while at the same time not unduly hindering the foldability of the walker apparatus or impairing the user's field of vision while pushing the walker apparatus.

BRIEF SUMMARY OF INVENTION

There is thus provided a walker apparatus disclosed herein that overcomes the above disadvantages.

There is accordingly provided a walker apparatus having a pair of spaced-apart, upright frame members. The walker apparatus includes a seat operatively connected to the upright frame members. The walker apparatus has a backrest cantilevered from the frame members. The backrest includes a pair of spaced-apart straps.

There is further provided a walker apparatus having a pair of spaced-apart, upright frame members. The walker apparatus includes a seat operatively connected to the upright frame members. The walker apparatus has a backrest cantilevered from the frame members. The backrest is horizontally-split.

There is also provided a walker apparatus having a pair of spaced-apart, upright frame members. The walker apparatus includes a pair of arcuate-shaped support members extending outwards from the frame members. The walker apparatus includes a seat connected to and extending between the support members. The walker apparatus includes a pair of coupling members connecting the frame members and the support members together. Each of the coupling members has an upright tubular portion which at least partially extends around part of a respective one of the frame members. Each of the coupling members has an arcuate-shaped tubular portion which at least partially extends around part of a respective one of the support members.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
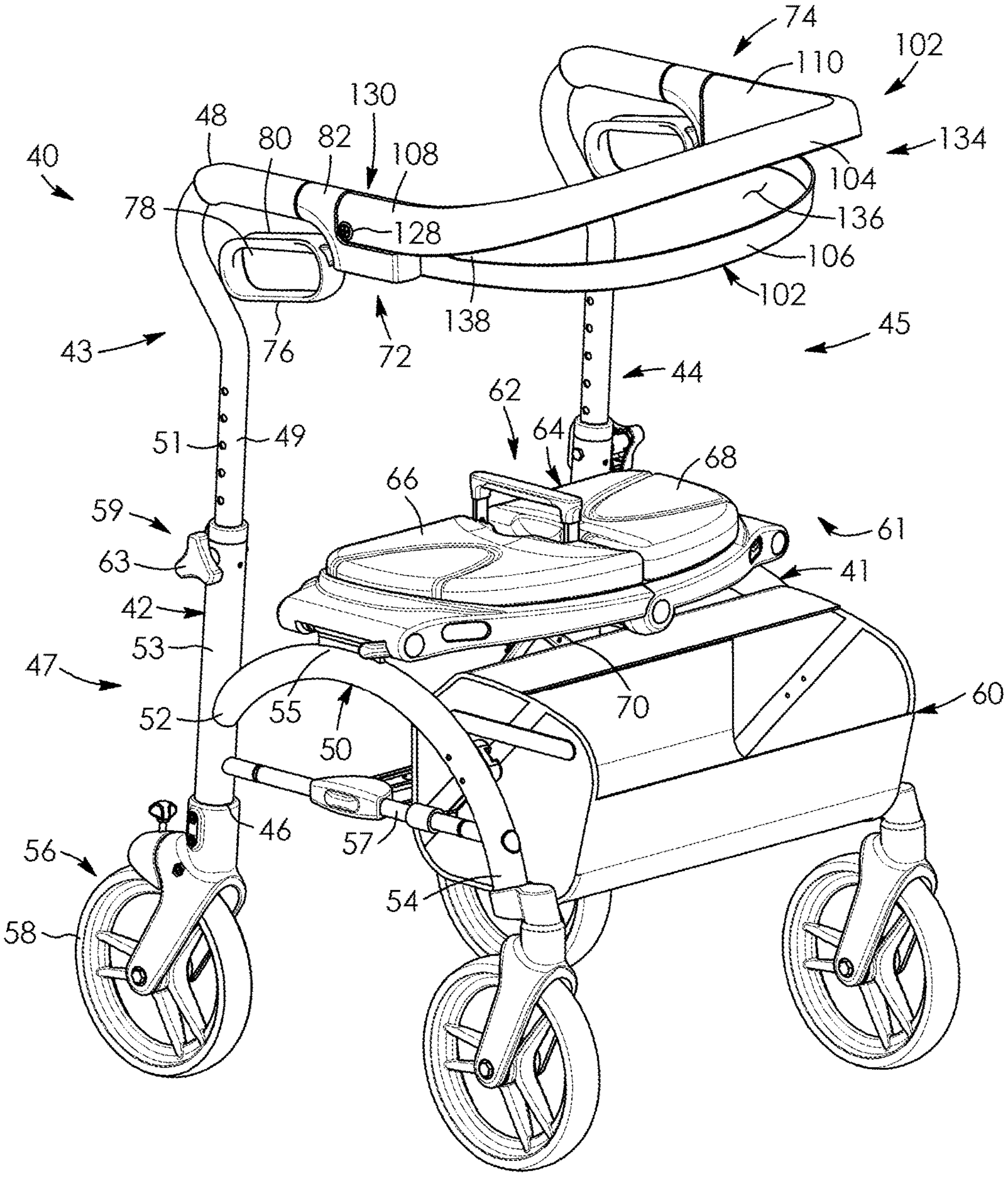
FIG. 1 is a front, side perspective view of a walker apparatus having a backrest according to one aspect, the walker apparatus being shown in an unfolded position.

Referring to the drawings and first to FIG. 1, there is shown a mobility aid device, in this example a walker apparatus 40 according to a first aspect. The walker apparatus is shown in FIGS. 1 to 21. As seen in FIG. 1, the walker apparatus 40 includes a pair of spaced-apart upright, frame members 42 and 44 positioned at respective spaced-apart sides 43 and 45 of the walker apparatus adjacent the rear 47 of the walker apparatus. Each of the frame members includes a lower end and an upper end spaced-apart from the lower end, as shown by lower end 46 and upper end 48 for frame member 42.

Each of the frame members 42 and 44 is telescoping and includes an inner tube 49 through which extends a plurality of apertures 51 and an outer tube 53 shaped to receive the inner tube. The walker apparatus 40 has an adjustment mechanism 59 for selectively adjusting and locking the telescoping tubes together. In this example the adjustment mechanism includes thumb screws 63. The thumb screws may be inserted through selective ones of the apertures 51 to fixedly adjust the height of the telescoping tubes 49 and 53. This enables the height of the walker apparatus 40 to be adjusted to provide an optimized height for the user 65 seen in FIG. 21.

Referring back to FIG. 1, the walker apparatus 40 includes a pair of support members 41 and 50 which are arc-shaped in this example. The support members include proximal ends connected to respective ones of the frame members, distal ends spaced-apart the proximal ends, and apexes positioned between the ends. This is shown by support member 50 having a proximal end 52 coupled to frame member 42, a distal end 54 spaced-apart from the proximal end and an apex 55 interposed between and spaced-apart above its ends 52 and 54. The proximal ends of the support members connect to the frame members at locations adjacent to and spaced-apart from the lower ends 46 of the frame members in this example. Rods 57 extend from the lower ends 46 of respective ones of the frame members 42 and connect to respective ones of the support members 50 adjacent to the distal ends 54 of the support members in this example.

The walker apparatus 40 includes a plurality of wheel assemblies rotatably connected to the lower ends of the frame members 42 and 44 and distal ends 54 of the support members 50. This is shown by wheel assembly 56 rotatably connecting to the end 46 of frame member 42. Each of the wheel assemblies includes a ground-engaging wheel 58. The walker apparatus 40 includes a collapsible basket 60 in this example. As seen in FIG. 1, the basket selectively connects to and extends between the support members 41 and 50 adjacent to the distal ends 54 of the support members. The basket 60 is positioned adjacent to the front 61 of the walker apparatus in this example. The walker apparatus 40 further includes a seat assembly 62, in this example comprising a seat 64 having two substantially planar portions 66 and 68 pivotally connected together. Portions 66 and 68 of the seat assembly pivotally connect to respective ones of the support members 50 and 41 at the apexes 55 of the support members in this example. Seat 64 thus operatively connects to the upright frame members 42 and 44.

Figure 2:
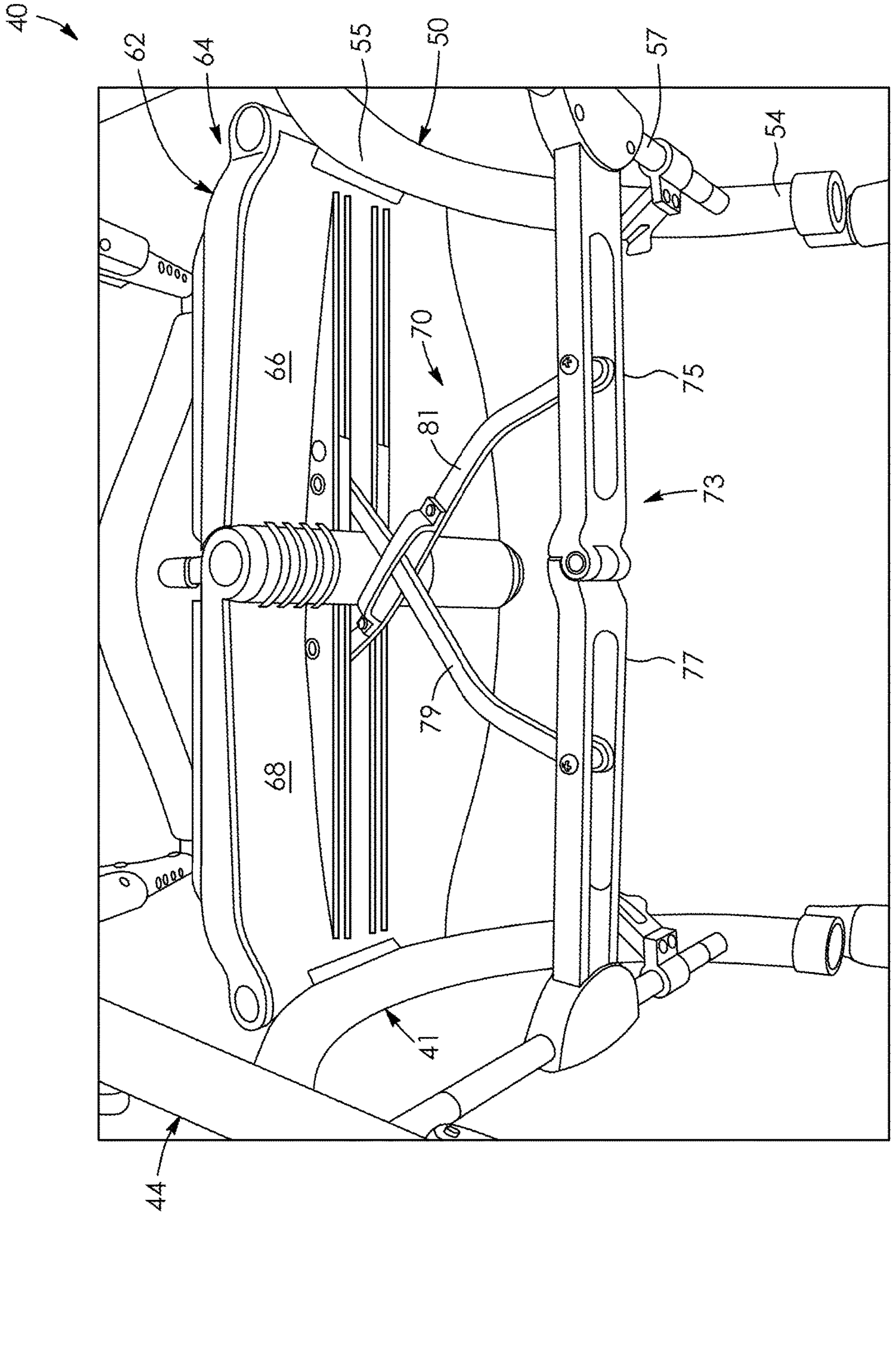
FIG. 2 is a fragmentary, bottom, rear perspective view of the walker apparatus of FIG. 1, showing the folding mechanism of the walker apparatus, the walker apparatus being shown with its collapsible basket being removed.

As best seen in FIG. 2, the walker apparatus 40 includes a folding mechanism 70. The folding mechanism includes in this example an inner frame assembly 73 formed of two inner frame members 75 and 77 which are hingedly connected together and which pivotally connect to and extend from respective ones of the rods 57. The folding mechanism 70 in this example includes a pair of intercrossing link members 79 and 81 that pivotally connect to and extend from respective portions 66 and 68 of the seat assembly 62. The link members 79 and 81 also pivotally connect to inner frame members 77 and 75, respectively of the inner frame assembly 73. The folding mechanism 70 thus operatively connects to and is interposed between frame members 42 and 44 of the walker apparatus 40.

Figure 13:
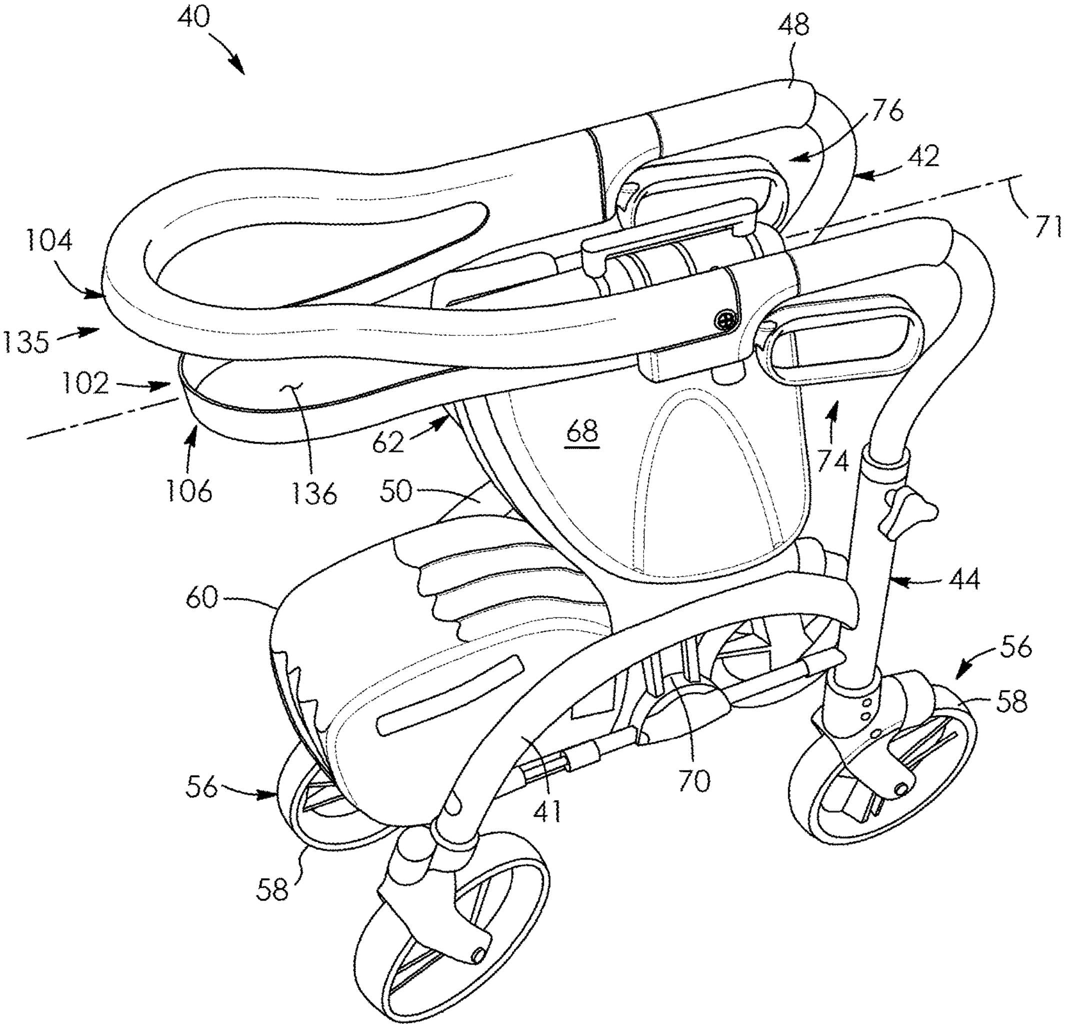
FIG. 13 is a rear perspective view of the walker apparatus of FIG. 1 shown in a folded position.
Figure 14:
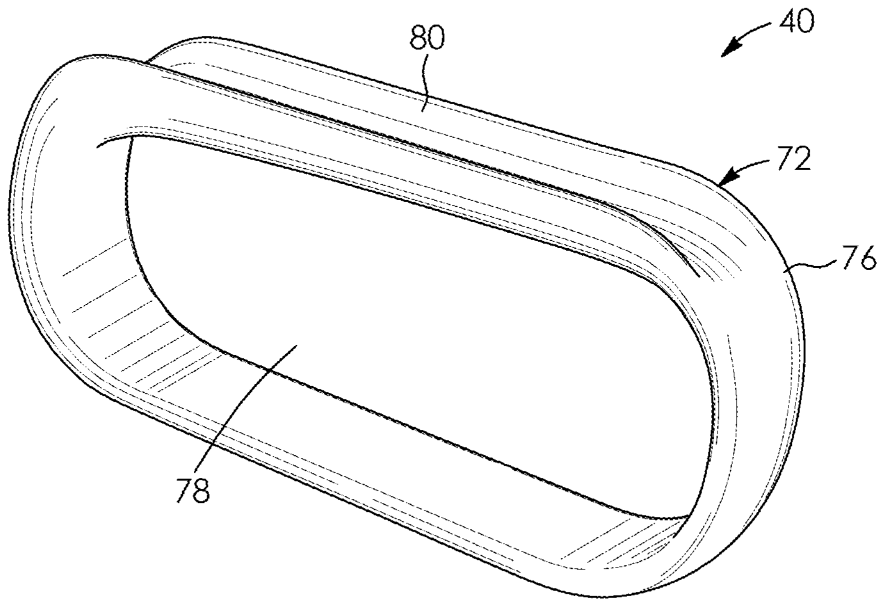
FIG. 14 is a front, side perspective view of a handle for the walker apparatus of FIG. 1.
Figure 15:
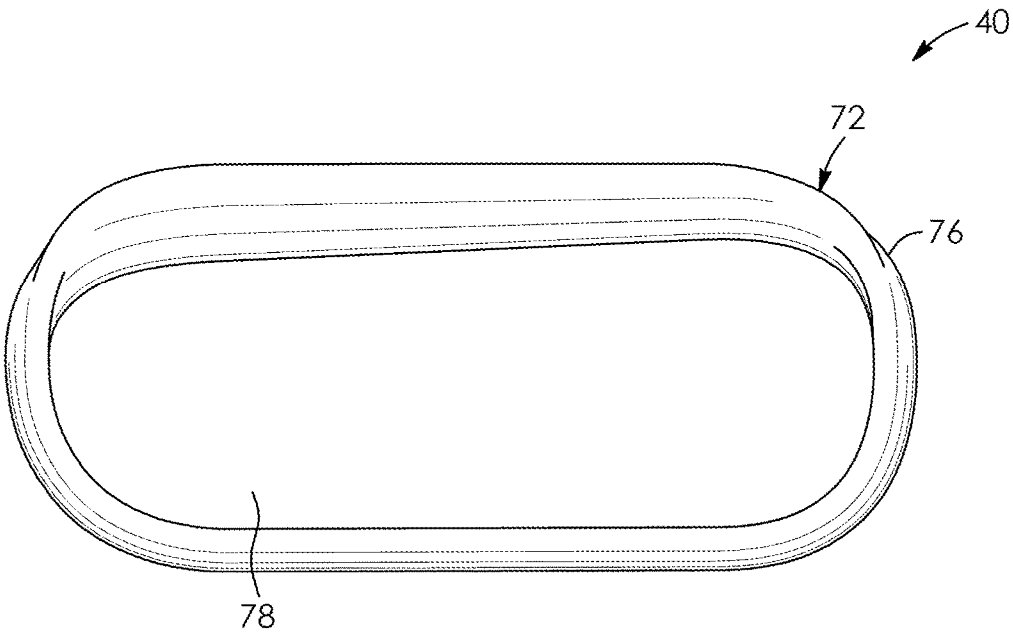
FIG. 15 is a first side elevation view of the handle of FIG. 14.
Figure 16:
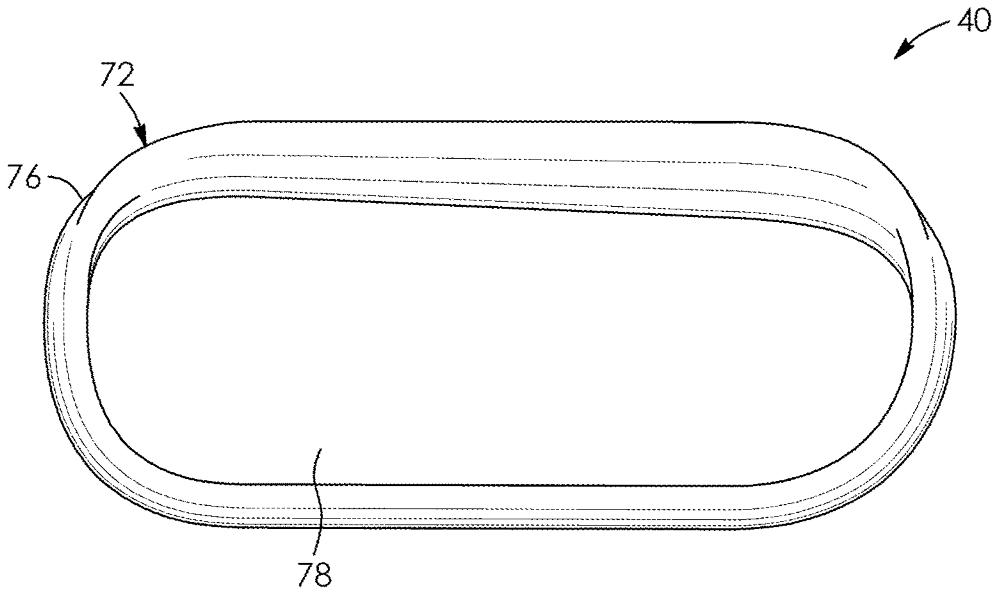
FIG. 16 is a second side elevation view of the handle of FIG. 14.
Figure 17:
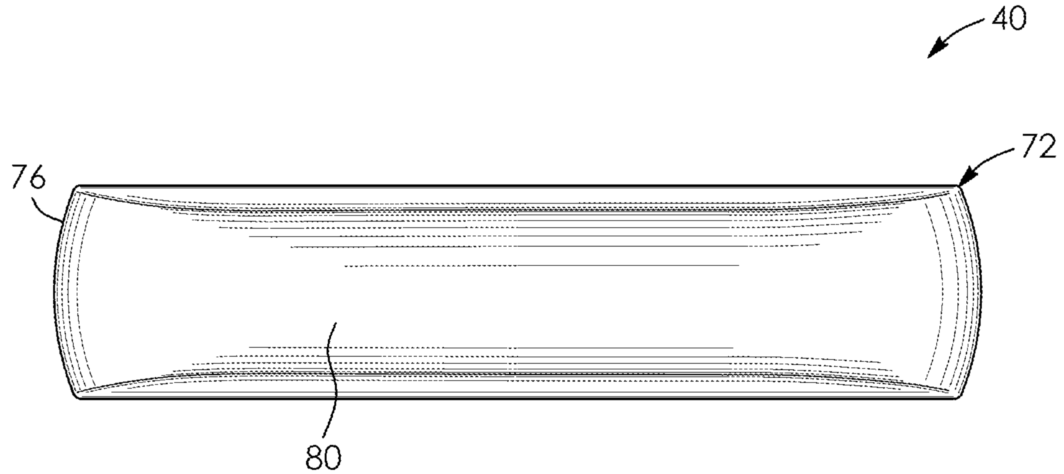
FIG. 17 is a top plan view of the handle of FIG. 14.
Figure 18:
FIG. 18 is a bottom an view of the handle of FIG. 14.
Figure 19:
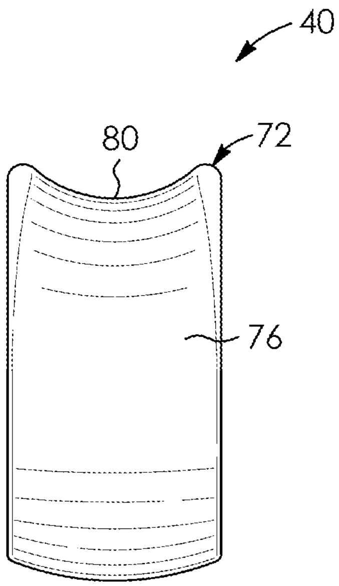
FIG. 19 is a front elevation view of the handle FIG. 14.
Figure 20:
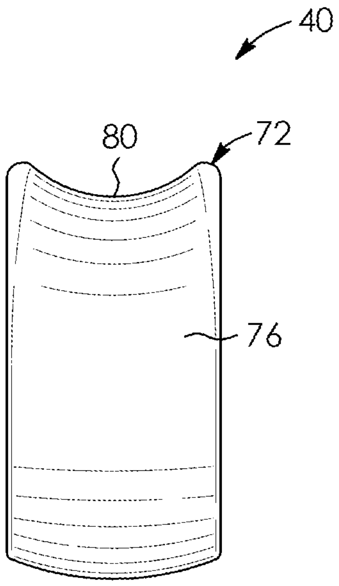
FIG. 20 is a rear elevation view of the handle of FIG. 14.

The folding mechanism is configured to selectively enable the walker apparatus to fold laterally, with the frame members 42 and 44 and support members 41 and 50 coming together thereby, as shown in FIG. 13. The folding mechanism thus enables the walker apparatus 40 to be laterally-foldable along a folding axis 71 seen in FIG. 13. Folding mechanism per se for walker apparatuses, including their various parts and functionings, are well known to those skilled in the art and thus folding mechanism 70 will not be described in further detail.

Referring back to FIG. 1, the walker apparatus 40 includes a pair of handle brake assemblies 72 and 74 that connect to and extend from respective ones of the upper ends 48 of the frame members 42 and 44. Actuation of the handle brake assemblies selectively causes at least one of the wheels 58 to brake.

The walker apparatus to this point in the description is described in further detail in U.S. Pat. No. 8,083,239 to Liu. Examples of telescoping tubes, wheel assemblies, folding mechanisms and braking assemblies for walkers per se, including their various parts and functionings, are well known to those skilled in the art and thus will not be described in further detail.

Referring to FIG. 1, each of the handle brake assemblies 72 and 74 includes a handle 76, actuation of which selectively causes at least one of the wheels 58 to brake. The handles are best shown in FIGS. 14 to 20. Each handle 76 is generally an elongate loop in shape and encloses an aperture 78 through which a user's hands may partially extend. Each handle has an elongated top potion 80 which is u-shaped in cross-section for receiving a thumb of the user. The operation of handle brake assemblies per se, including their various parts and their functionings, is well known to those skilled in the art and therefore will not be described in detail.

Figure 10:
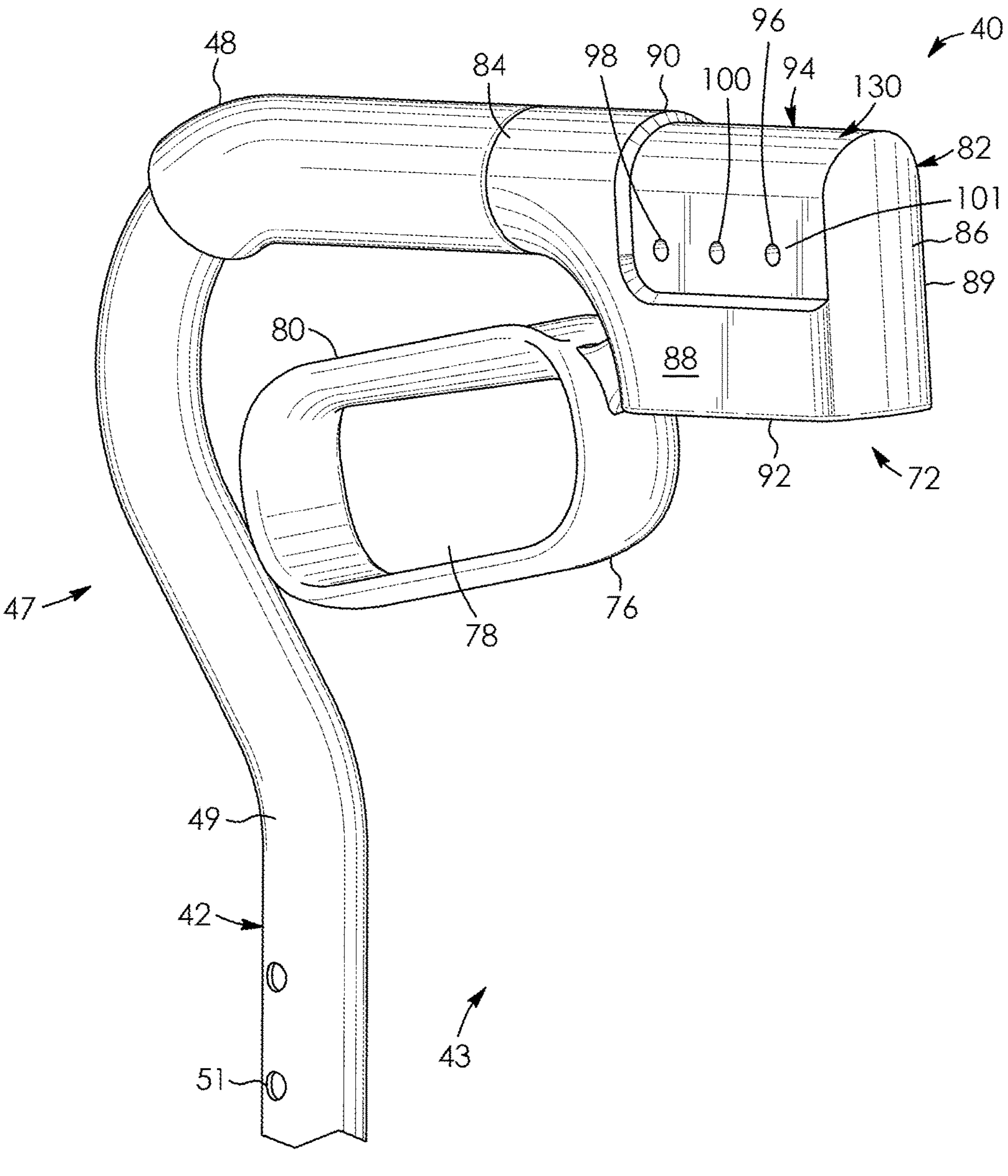
FIG. 10 is a side perspective view of a handle brake assembly of the walker apparatus of FIG. 1, together with an upright frame member thereof shown in fragment.
Figure 12:
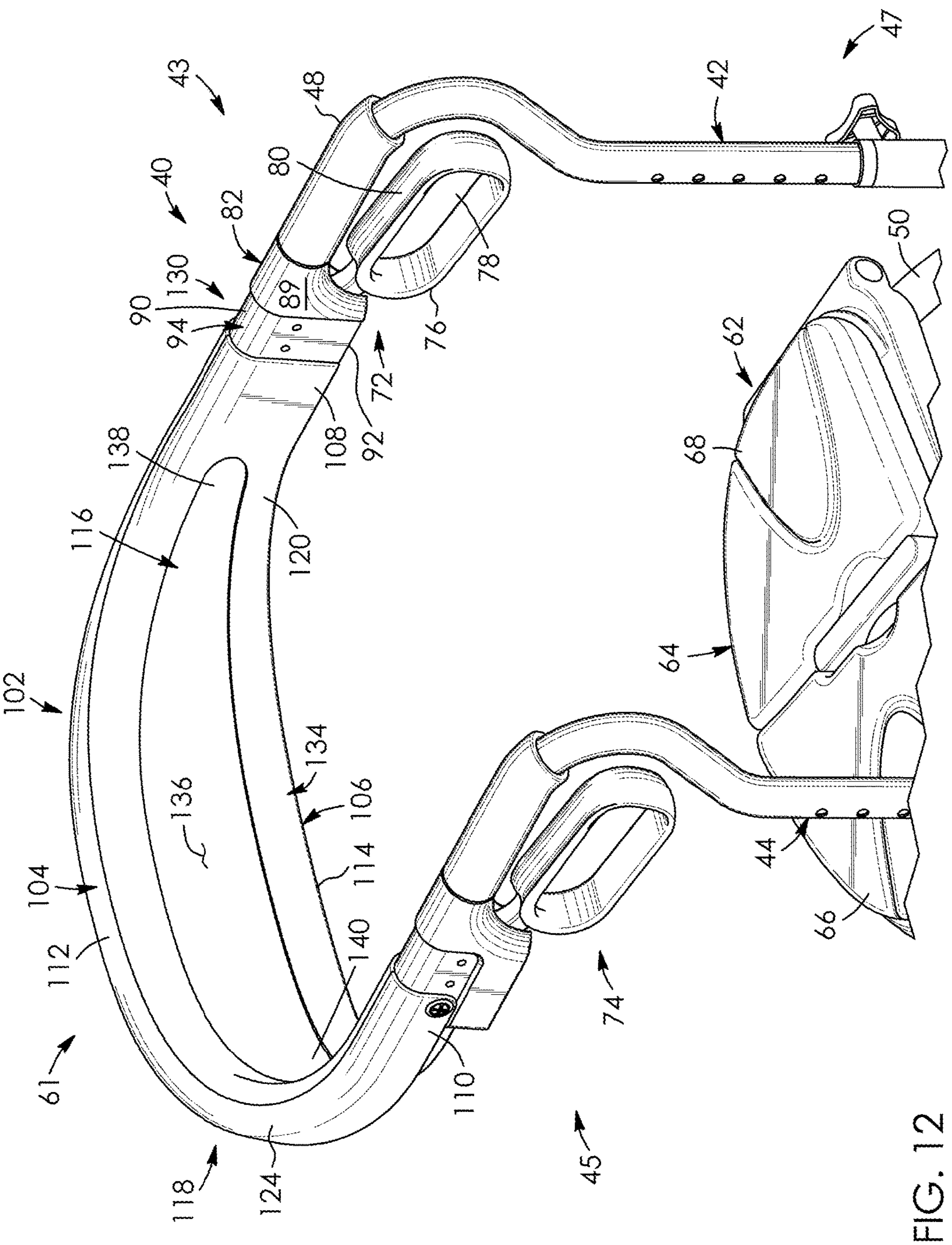
FIG. 12 is a side, rear perspective view of the walker apparatus of FIG. 11, the walker apparatus being shown in fragment with the backrest being shown in a second, extended position.

As seen in FIG. 1, each of the handle brake assemblies has a housing to Which respective ones of the handles 76 pivotally connect, as shown by housing 82 for assembly 72. Referring now to FIG. 10, each housing is generally a rectangular prism in shape. Each housing 82 has a proximal end 84 which operatively connects to the upper end 48 of its respective frame member 42, and a distal end 86 which is spaced-apart from its proximal end. Each housing has a pair of spaced-apart sides, including an outer side 88 and an inner side 89, each of which is generally rectangular in shape. Each housing 82 includes a rounded top 90 and flat bottom 92 in this example spaced-apart from its top. The sides 88 and 89, tops and bottoms of the housings extend from the proximal ends 84 to the distal ends 86 of the housings. The sides of the housings 82 extend from the tops 90 to the bottoms 92 of the housings. Each brake assembly 72 includes a recessed portion 94 which extends from the distal end 86 of the housing 82 towards the proximal end 84 of the housing. The recessed portion also extends downwards from the top 90 of the housing towards the bottom 92 of the housing by outer side 88 seen in FIG. 10 in this example when the walker apparatus 40 is upright. Referring to FIG. 12, the recessed portion 94 extends fully downwards from the top 90 of the housing 82 to the bottom 92 of the housing adjacent side 89 in this example.

As seen in FIG. 10, each handle brake assembly 72 includes a plurality of apertures extending therein at the recessed portion 94 and adjacent the outer side 88 of its housing 82. This is shown for assembly 72 by an outer aperture 96 adjacent to distal end 86 of the housing 82, an inner aperture 98 spaced-apart from aperture 96 in the direction of proximal end 84 of the housing, and an intermediate aperture 100 positioned between apertures 96 and 98.

As seen in FIG. 1, the walker apparatus 40 includes a backrest 102 cantilevered from the frame members 42 and 44. The backrest is flexible in this example and is arcuate-shaped when the walker apparatus is in its unfolded mode seen in FIG. 1. The backrest 102, according to one aspect, comprises a pair of spaced-apart, arcuate-shaped elongate upper and lower portions, in this example in the form of straps including an upper strap 104 and a lower strap 106. The straps connect together at common respective ends, in this example proximal ends 108 and 110 of the backrest 102. The straps 104 and 106 extend along the front 61 and sides 43 and 45 of the walker apparatus 40 in this example.

Figure 3:
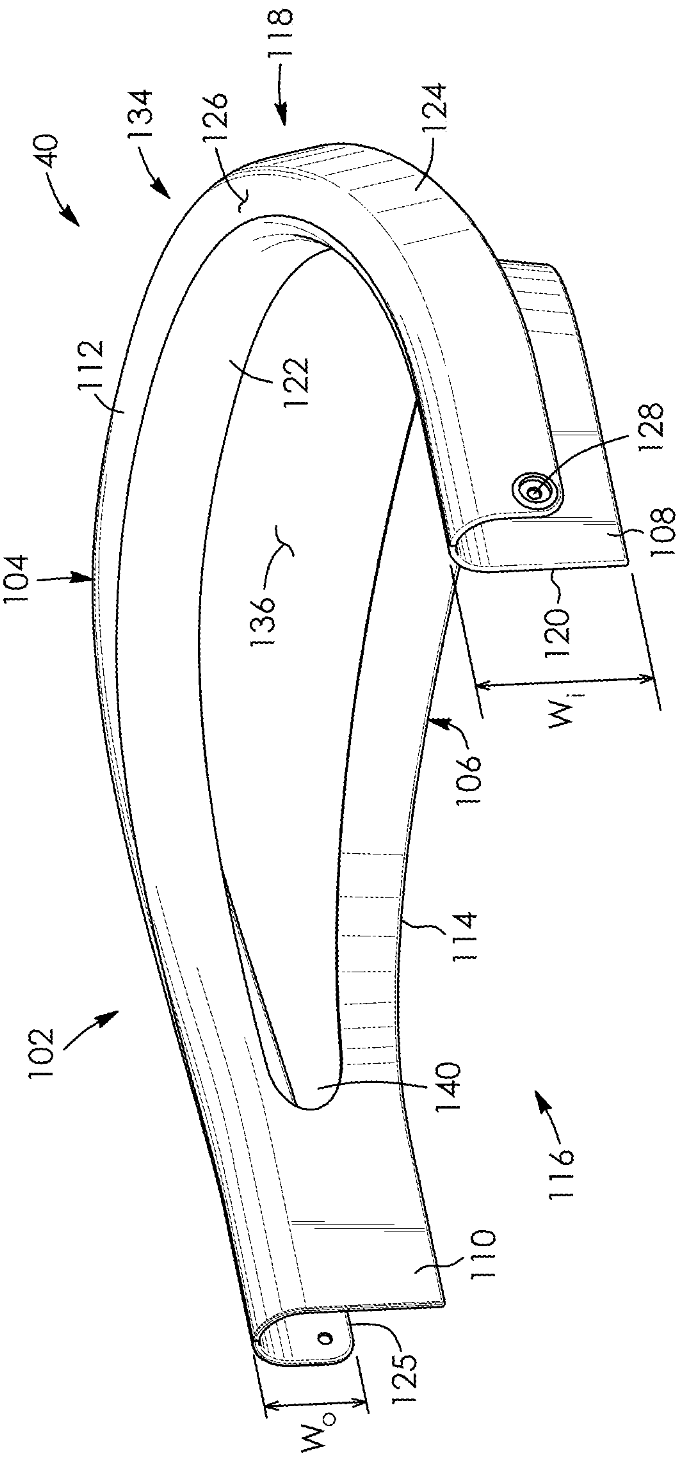
FIG. 3 is a rear, side perspective view of the backrest of FIG. 1.
Figure 6:
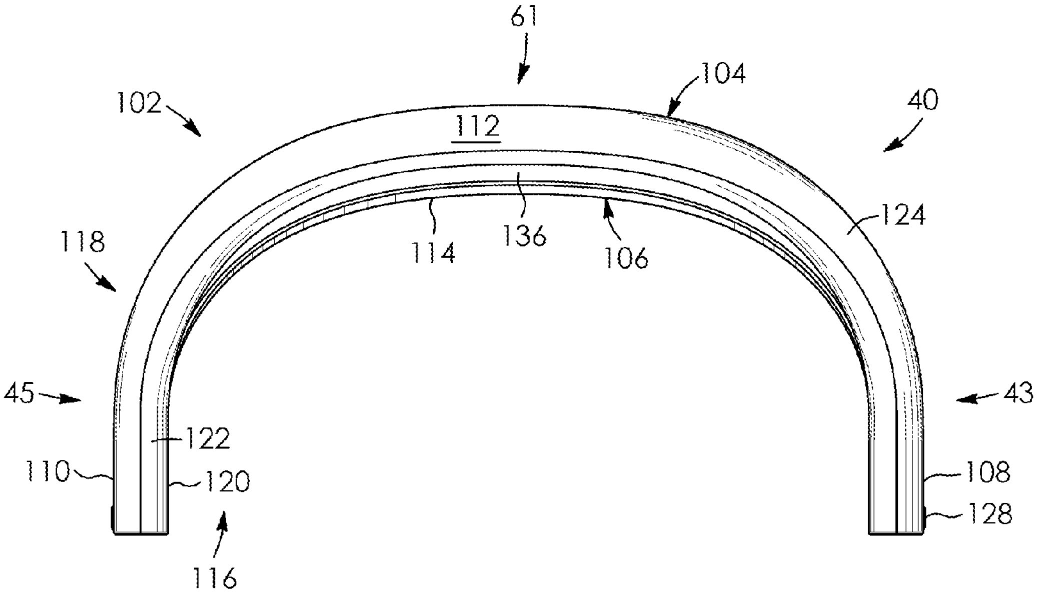
FIG. 6 is a top plan view of the backrest of FIG. 3.
Figure 7:
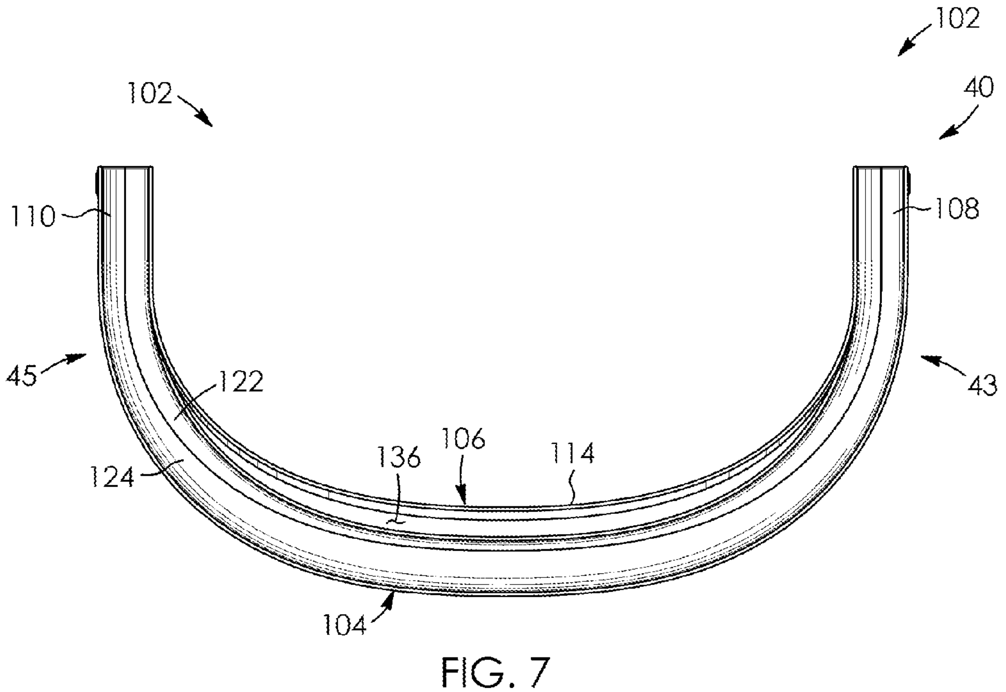
FIG. 7 is a bottom plan view of the backrest of FIG. 3.
Figure 8:
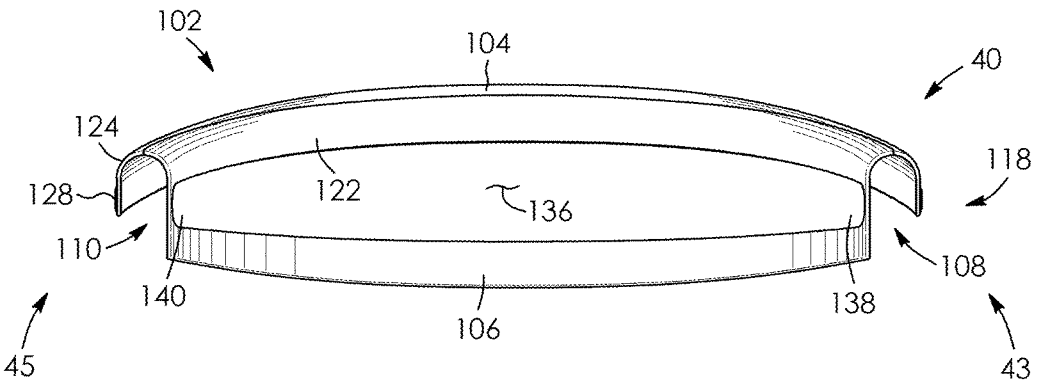
FIG. 8 is a rear elevation view of the backrest of FIG. 3.

Referring to FIG. 3, the backrest includes a top 112 on the upper strap 104 and a bottom 114 on lower strap 106. The top and bottom of the backrest 102 are generally arcuate or u-shaped, as seen in FIGS. 6 and 7, respectively. As best seen in FIG. 3, the upper strap 104, as well as top 112, are u-shaped and upwardly-convex in cross-section in this example. The lower strap 106 is substantially rectangular in cross-section in this case. Referring to FIG. 6, the backrest 102 includes a concave-shaped interior 116 and a convex-shaped exterior 118. As seen in FIG. 3, the interior and exterior of the backrest extend from the top 112 to the bottom 114 of the backrest.

The backrest 102 has an inner portion 120 which in this example is formed of polypropylene. However, this is not strictly required and other materials may be used in other embodiments. The inner portion 120 of the backrest 102 includes lower strap 106 and an inner half 122 of the upper strap 104. The inner portion 120 of the backrest is positioned within the interior 116 of the backrest. As seen in FIG. 6, the inner portion 120 of the backrest and inner half 122 of the upper strap 104 are arcuate-shaped, or u-shaped in top profile in this example. Referring back to FIG. 3, the inner portion of the backrest 102 has a width $W_i$ extending from the top 112 to the bottom 114 of the backrest. The inner portion 120 of the backrest 102 is substantially rectangular in cross-section with the exception of at the top 112 of the backrest, where the inner portion at least partially curves outwards towards exterior 118 of the backrest.

Figure 11:
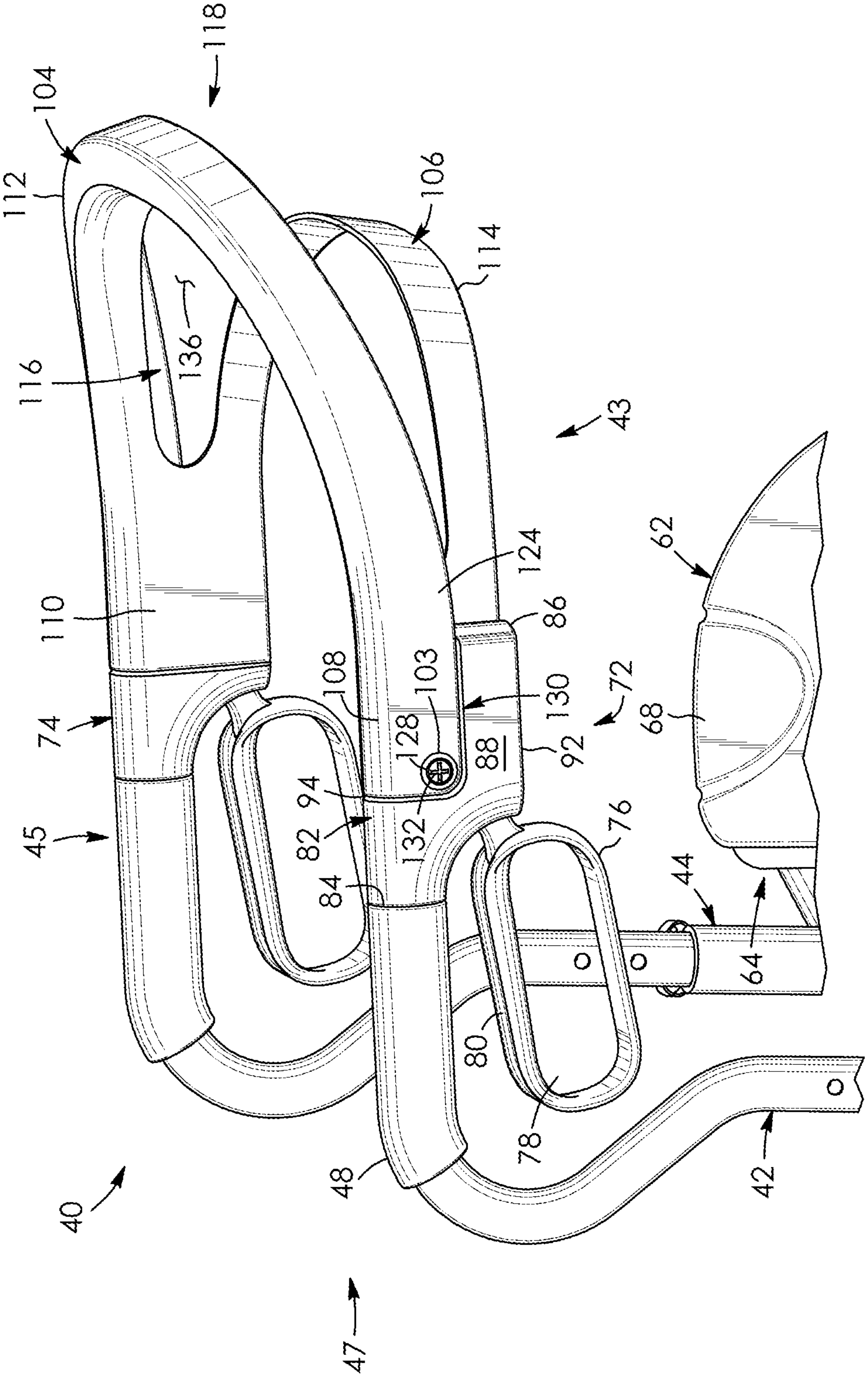
FIG. 11 is a side perspective view of the walker apparatus in fragment showing its handle brake assemblies and backrest connected thereto as well as its upright frame members in fragment, the backrest being shown in a first, retracted position.

As seen in FIG. 12, the inner portion 120 of the backrest 102, is shaped at the proximal ends 108 and 110 of the backrest to be received over recessed portions 94 of the handle brake assemblies at inner sides 89 of the housings. Referring to FIG. 11, the cross-sectional thickness of the backrest 102, at its ends 108 and 110, is generally equal to the extent to which recessed portions 94 are recessed from the rest of the housings 82 of the handle brake assemblies in this example.

Referring back to FIG. 3, the backrest has an outer portion 124 connected to and extending outwards from its inner portion 120. The outer portion of the backrest 102 comprises an outer half 126 of the upper strap 104. The outer half 126 is positioned adjacent to the exterior 118 of the backrest. The outer portion 124 of the backrest 102 in this example is formed by thermoplastic polyurethane. However, this is not strictly required and other materials may be used in other embodiments. As seen in FIG. 6, the outer portion 124 of the backrest 102 and outer half 126 of strap 104 are arcuate-shaped or u-shaped in top profile in this example. Referring back to FIG. 3, the outer portion of the backrest has a width $W_o$ extending from the top 112 of the backrest in a downwards direction to a lower peripheral edge 125 of the outer portion of the backrest when the walker apparatus is upright. The width of the outer portion 124 of the backrest 102 is generally about half of the width $W_i$ of the inner portion 120 of the backrest in this example. The outer portion of the backrest is substantially rectangular in cross-section with the exception of at the top 112 of the backrest, where it curves inwards towards interior 116 of the backrest and connects to the inner portion 120 of the backrest. Referring to FIG. 11, the outer portion 124 of the backrest 102, at the proximal ends 108 and 110 of the backrest, is shaped to be received over recessed portions 94 of respective ones of the handle brake assemblies at sides 88. This is shown in FIG. 11 by outer portion 124 at proximal end 108 of the backrest 102 being received over recessed portion 94 of assembly 72.

Referring to FIG. 3, the backrest 102 includes a pair of apertures, each extending through the outer portion 124 of the backrest at locations adjacent to respective ones of the proximal ends 108 and 110 of the backrest. This is seen in FIG. 3 by aperture 128 extending through the outer portion 124 of the backrest adjacent proximal end 108 of the backrest.

As seen with reference to FIGS. 1 and 10, the backrest includes an adjustment mechanism 130 that enables a user to adjust the extent to which the backrest 102 extends from the frame members 42 and 44 of the walker apparatus 40 to accommodate different body types. In this case, the adjustment mechanism includes a plurality of female connectors, in this example in the form of horizontally spaced-apart apertures 96, 98 and 100 seen in FIG. 10, portions 101 of assembly 72 adjacent to said apertures, apertures 128 extending through outer portions 124 of the backrest 102 seen in FIG. 11 and portions 103 of the backrest 102 adjacent to apertures 128. As seen in FIG. 11, the adjustment mechanism 130 also includes a plurality of male connectors, in this case fasteners, in this example screws 132 which extend through respective ones of apertures 128 and engage with selectively ones of apertures 96, 98 and 100 seen in FIG. 10.

When the screws extend through inner apertures 98 seen in FIG. 10, the backrest 102 may be in a first, retracted position, seen in FIG. 11, in which the proximal ends 108 and 110 of the backrest fully extend around the recessed portions 94 of the assemblies 72 and 74. When the screws 132 seen in FIG. 11 extend through outer apertures 96 seen in FIG. 10, the backrest may be in a second, extended position, seen in FIG. 12. The extended position of the backrest seen in FIG. 12 is more spaced-apart from frame members 42 and 44 compared to the retracted position of the backrest shown in FIG. 11. The backrest 102 is thus selectively connectable to a plurality of different spaced-apart positions along the handle brake assembly 72, with positioning of the straps 104 and 106 being adjustable thereby.

Figure 4:
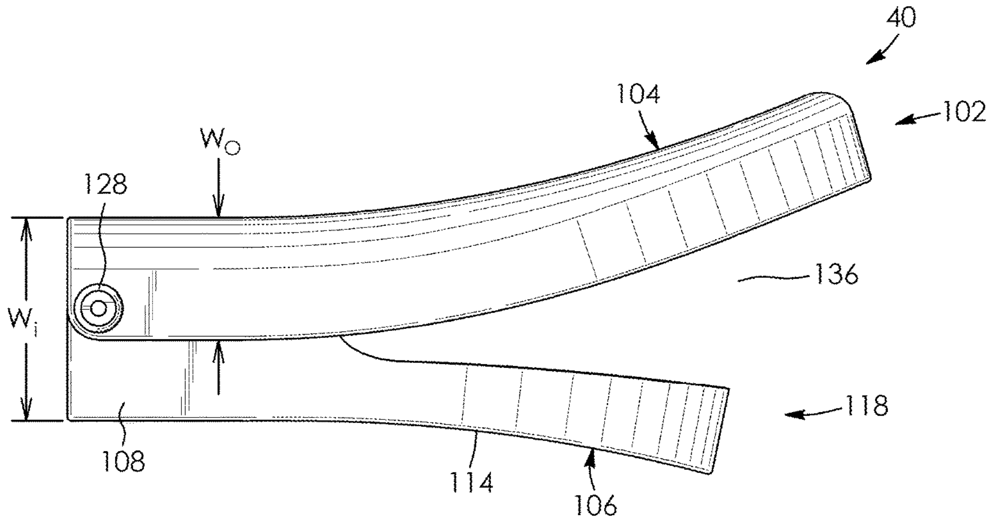
FIG. 4 is a first side elevation view of the backrest of FIG. 3.
Figure 5:
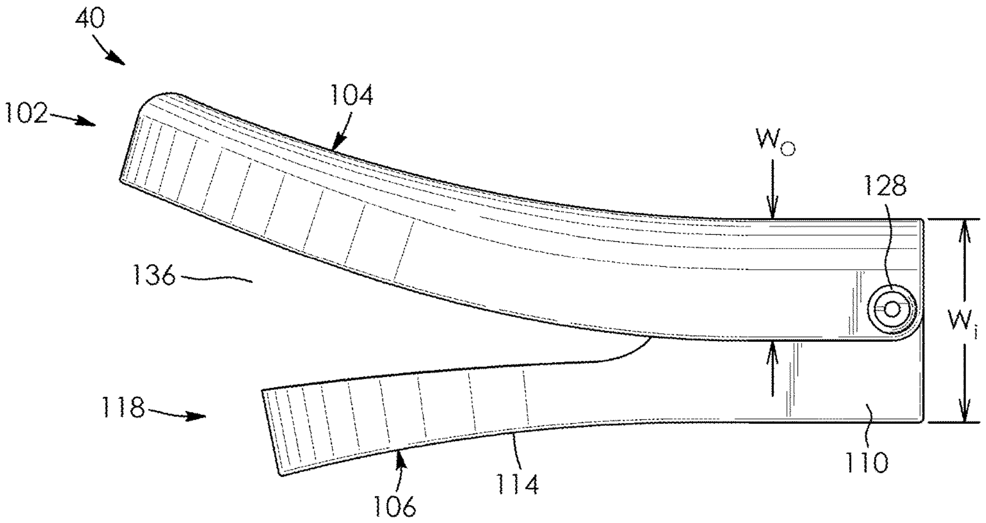
FIG. 5 is a second side elevation view of the backrest of FIG. 3.

Referring now to FIG. 11, the upper strap 104 extends from the upper ends 48 of the frame members 42 and 44. As seen in FIG. 4, the upper strap in this example extends in an upwardly curved manner, in this case in an upwardly-concave manner, from respective ones of the frame members. Lower strap 106 extends in this example in a downwardly curved manner, and in this case, a downwardly-concave manner. The straps 104 and 106 thus extend from the frame members 42 and 44 in outwardly divergent directions relative to each other.

As best seen in FIG. 12, the backrest 102 has a central portion 134 positioned between the frame members 42 and 44 of the walker apparatus 40. The straps 104 and 106 are increasingly spaced-apart away as they extend outwards from proximal ends 108 and 110 of the backrest 102 and towards the central portion 134 of the backrest. As seen in FIG. 13, the straps are most spaced-apart relative to each other in a region 135 that aligns with the folding axis 71 of the walker apparatus 40.

Figure 9:
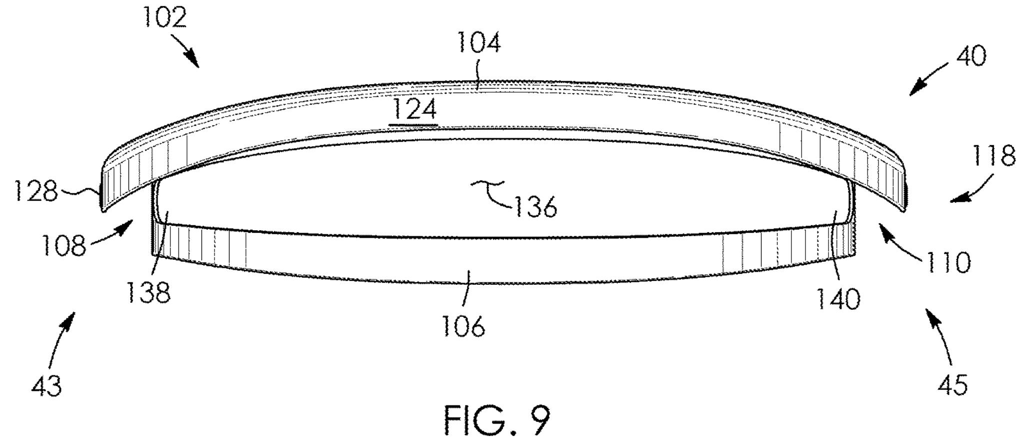
FIG. 9 is a front elevation view of the backrest of FIG. 3.
Figure 21:
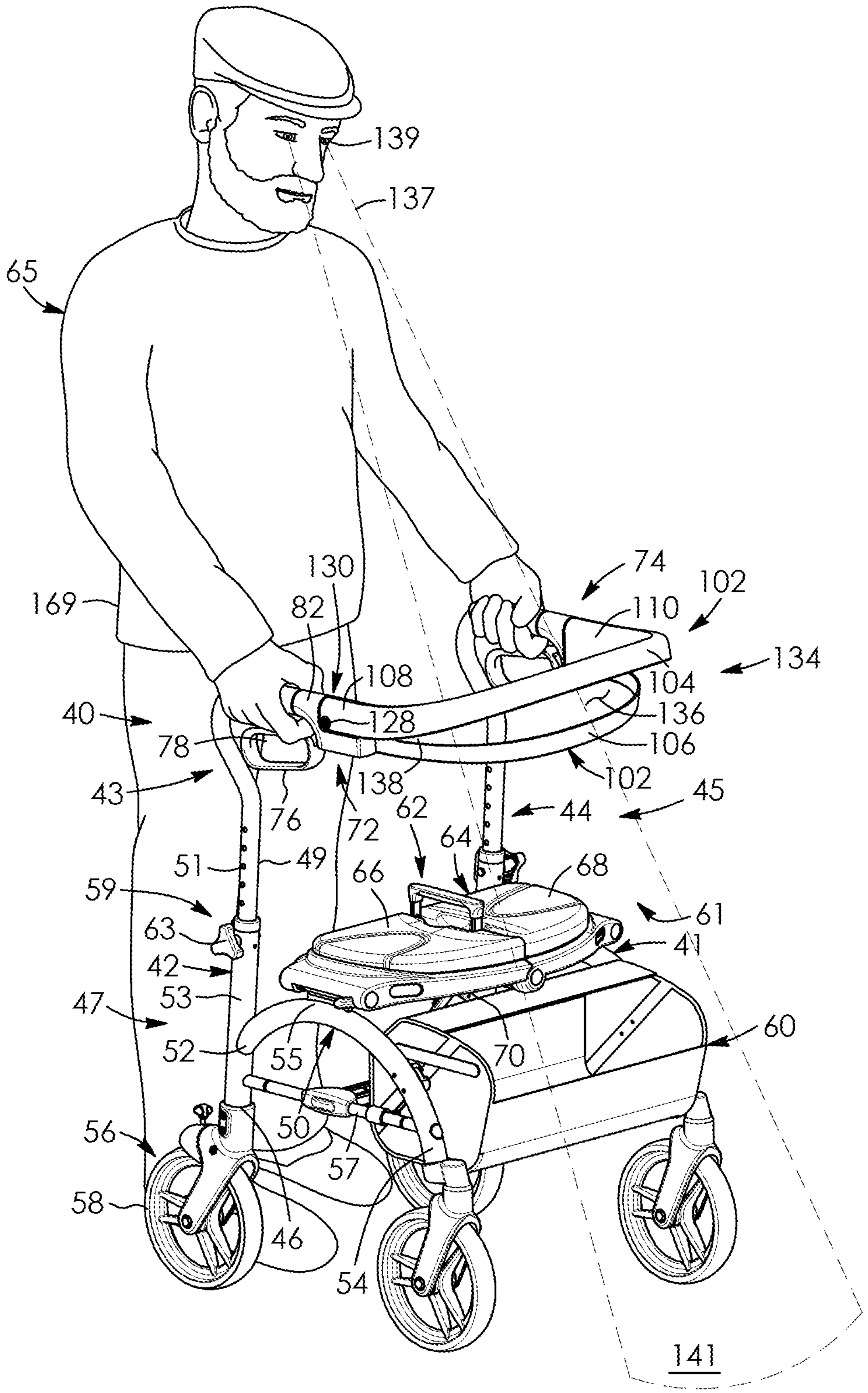
FIG. 21 is a front, side perspective view of the walker apparatus of FIG. 1 with a user gripping the upper ends of the upright frame members of the walker apparatus and looking through the backrest and past the walker apparatus towards the front thereof.

Referring to FIG. 21, the backrest 102 has at least one opening extending therethrough, in this example in the form of an elongated aperture 136 for permitting a user's vision past the backrest when the user grips the upright frame members 42 and 44. This is seen by line of vision having numeral 137 extending from eyes 139 of user 65 and extending through aperture 136 to ground 141 therebelow. As seen in FIG. 9, the aperture is oval-shaped in this example. The aperture 136 is positioned between the straps 104 and 106, shown in FIG. 1 in this example, and extends in a substantially horizontal direction in this example. The aperture 136 has spaced-apart ends 138 and 140 which are tapered and rounded in this example. Ends 138 and 140 are positioned adjacent to proximal ends 108 and 110, respectively, of the backrest 102 in this example. As seen in FIG. 1, the tapered ends of the aperture 136 and proximal ends of the backrest are positioned adjacent to the sides 43 and 45 of the walker apparatus 40. Straps 104 and 106 may be said to comprise a single backrest that is horizontally-split.

The above set out structure may result in a backrest that is more compact, lighter, and more ergonomically friendly, resulting in a walker apparatus 40 that may be easier and safer to use, and easier to fold compared to walker backrests and walkers of the known prior art.

Figure 22:
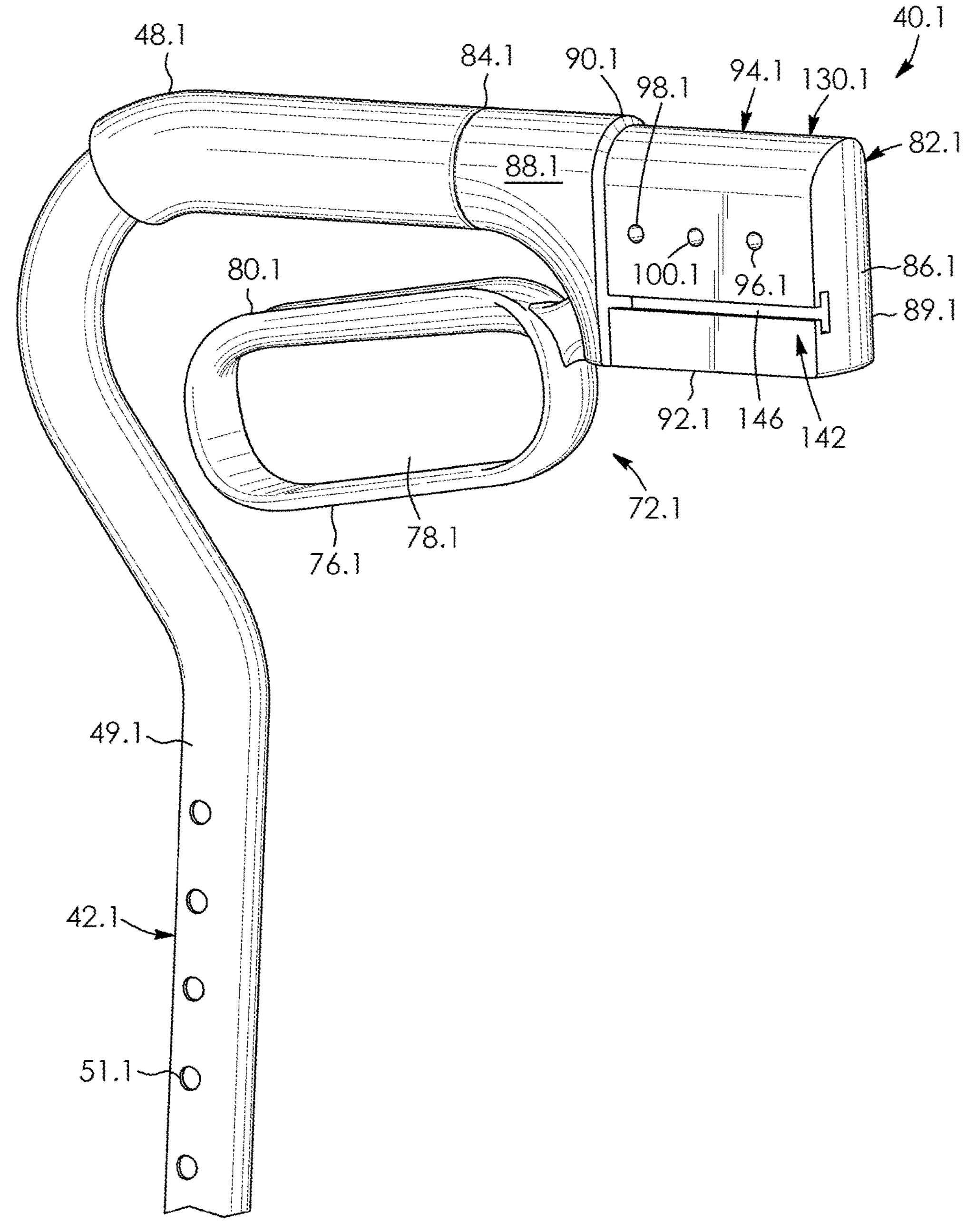
FIG. 22 is a side perspective view of a handle brake assembly, together with an upright frame member shown in fragment, for a walker apparatus according to a second aspect.
Figure 23:
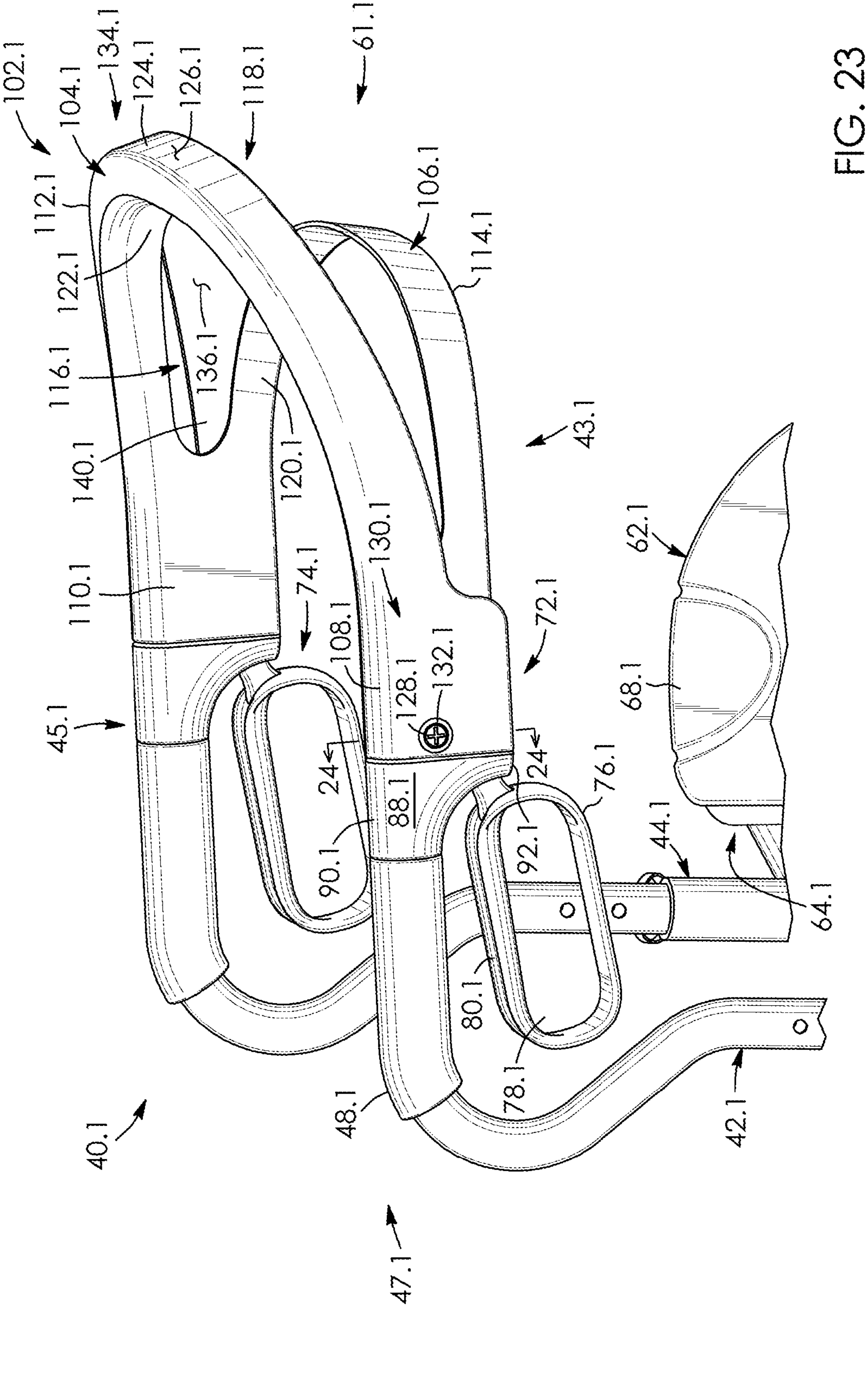
FIG. 23 is a side perspective view of the walker apparatus of FIG. 22 showing its handle brake assemblies and backrest connected thereto as well as its upright frame members in fragment.
Figure 24:
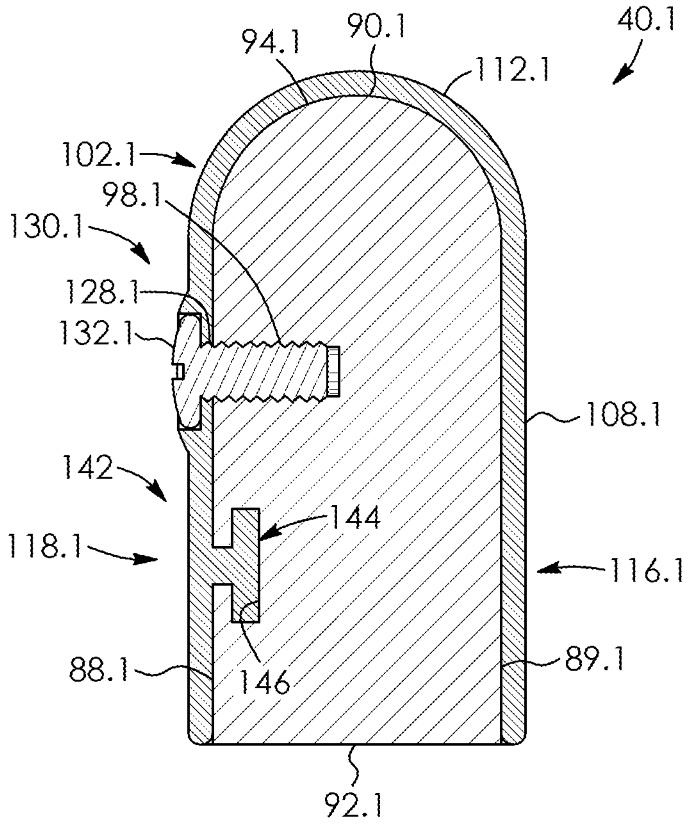
FIG. 24 is a sectional view of the handle brake assemblies of the walker apparatus taken along line 24-24 of FIG. 22.

FIGS. 22 to 24 show a walker apparatus 40.1 according to a second aspect. Like parts have like numbers and functionings as the apparatus shown in FIGS. 1 to 21 with the addition of decimal extension ".1". Walker apparatus 40.1 is substantially the same as walker apparatus 40 shown in FIGS. 1 to 21, with backrest 102.1 being cantilevered to upper ends 48.1 of frame members 42.1 and 44.1 and having an aperture 136.1 extending therethrough, but with apparatus 40.1 having the following differences.

As seen in FIG. 22, recessed portions 94.1 of the housings 82.1 extend from the top 90.1 to the bottom 92.1 of the housings in this example at the outer sides 88.1 thereof. Referring to FIG. 23, the proximal ends of the backrest 102.1 at the exterior 118.1 of the backrest 102.1 extend over the recessed portions of the housing 82.1 from the top to the bottom of the housing, as shown by proximal end 108.1 of the backrest.

As seen in FIGS. 22 and 24, walker apparatus 40.1 further includes a pair of slide rail assemblies connected to respective ones of the handle brake assemblies, as shown by slide rail assembly 142 for handle brake assembly 72.1. Referring to FIG. 24, each slide rail assembly comprises an elongate male portion, in this example a bracket 144 which, in this example, is connected to and which extends along the proximal end 108.1 of the backrest 102.1. The brackets are t-shaped in cross-section in this example. Each slide rail assembly 142 includes an elongate female portion, in this example in the form of a recess 146, which, in this example, extends parallel to and inwards from side 88.1 of housing 82.1 adjacent to recessed portion 94.1 of the housing. Each recess 146 is positioned adjacent to and is spaced-apart from bottom 92.1 of its housing in this example. Each recess 146 is shaped to slidably receive bracket 144 and is T-shaped in cross-section in this example, as seen in FIG. 22. The backrest 102.1 thus connects to and is extendable from the frame members 42.1 via the slide rail assemblies 142. Alternatively, brackets 144 may connect to the housing 82.1 and an elongate female portion may connect to, or alternatively, be a part of the proximal ends 108.1 of the backrest 102.1.

FIGS. 25 to 33 show a walker apparatus 40.2 according to a third aspect. Like parts have like numbers and functionings as the apparatus shown in FIGS. 1 to 21 with the addition of decimal extension ".2". Walker apparatus 40.2 is generally similar to walker apparatus 40 shown in FIGS. 1 to 21, with backrest 102.2 being cantilevered to upper ends 48.2 of frame members 42.2 and 44.2 and having an aperture 136.2 extending therethrough, but with the apparatus having the following differences.

Figure 25:
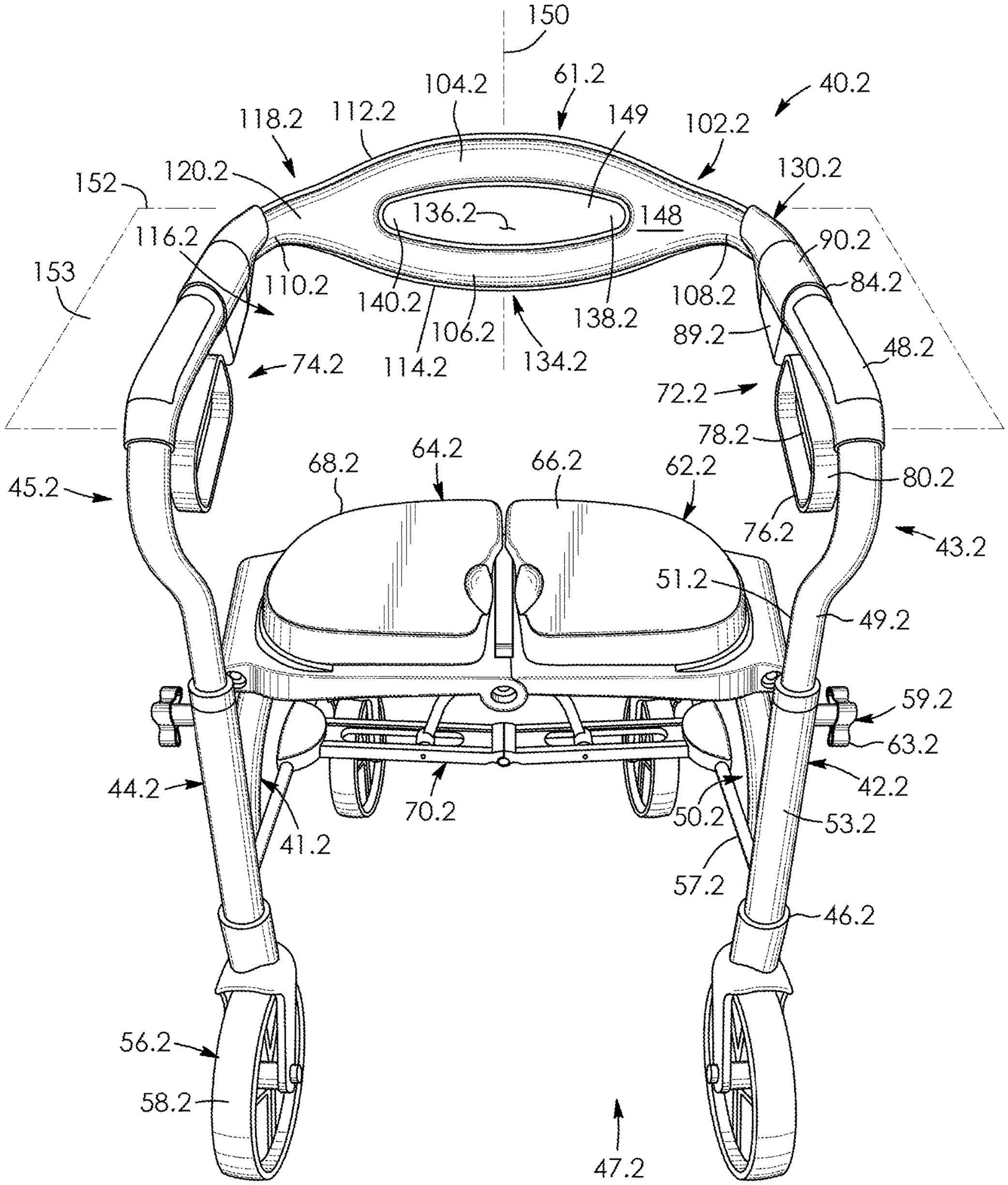
FIG. 25 is a rear perspective view of a walker apparatus having a backrest according to a third aspect.
Figure 26:
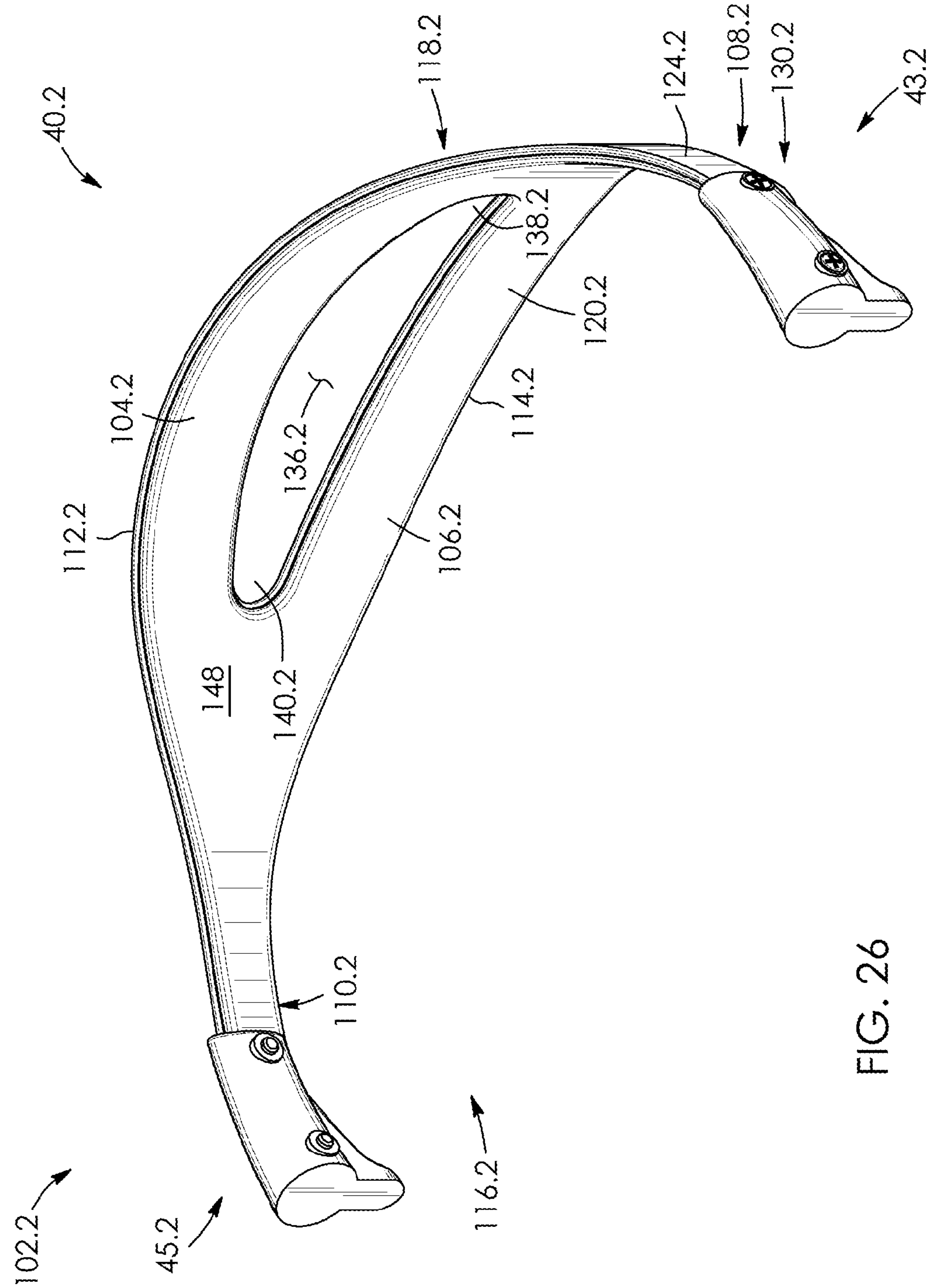
FIG. 26 is a rear, side perspective view of the backrest of the walker apparatus of FIG. 25.
Figure 27:
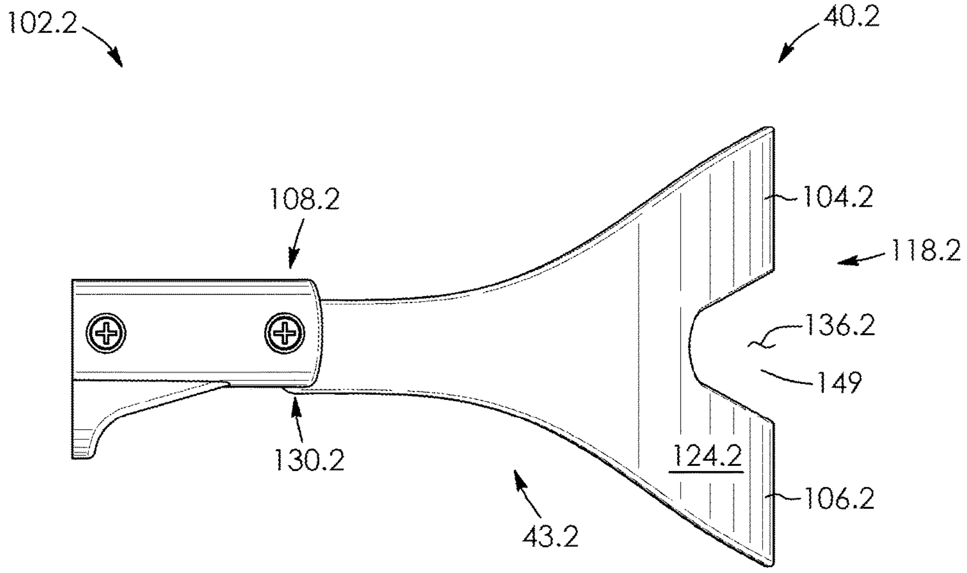
FIG. 27 is a first side elevation view thereof.
Figure 28:
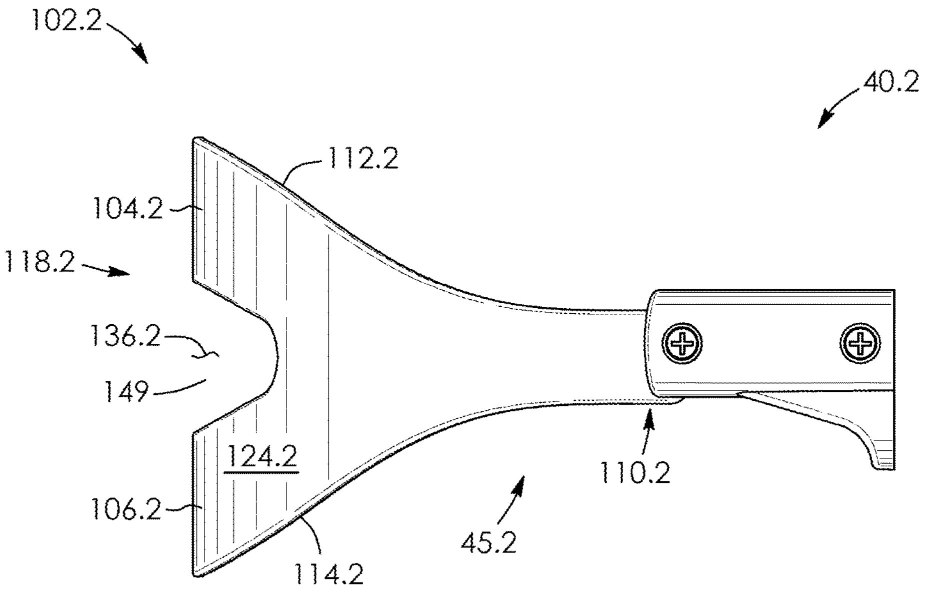
FIG. 28 is a second side elevation view thereof.
Figure 29:
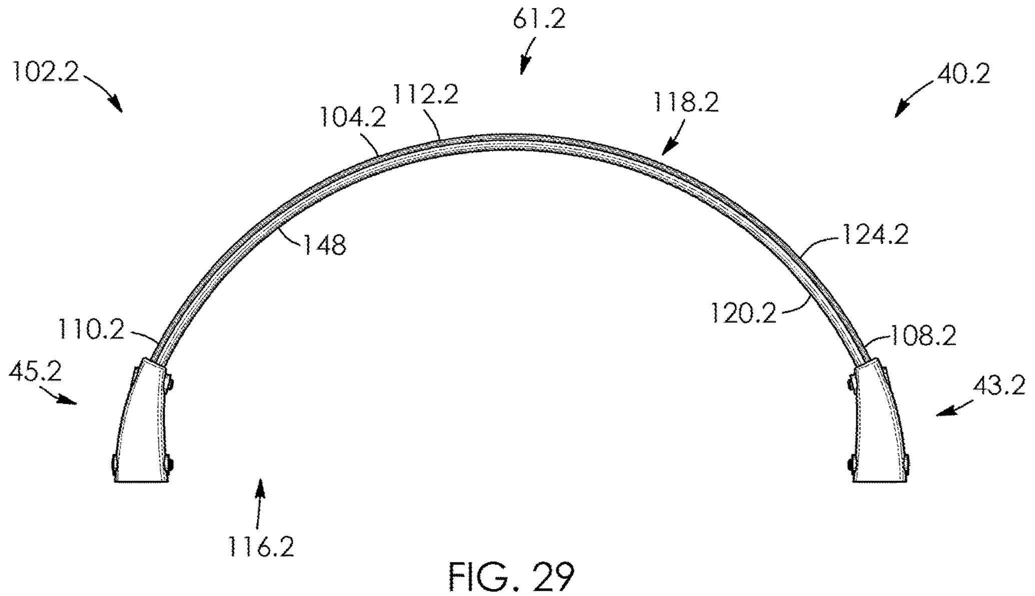
FIG. 29 is a top plan view thereof.
Figure 30:
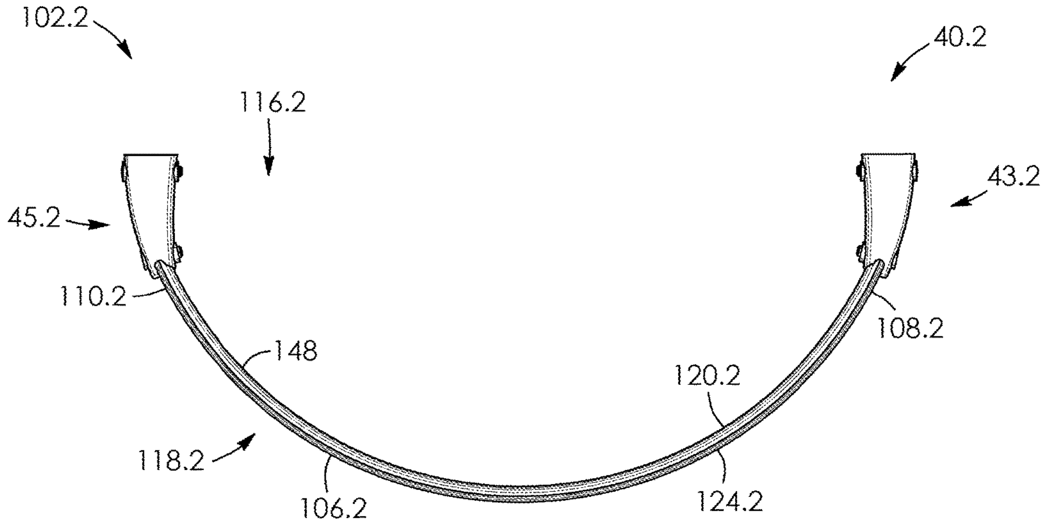
FIG. 30 is a bottom plan view thereof.
Figure 31:
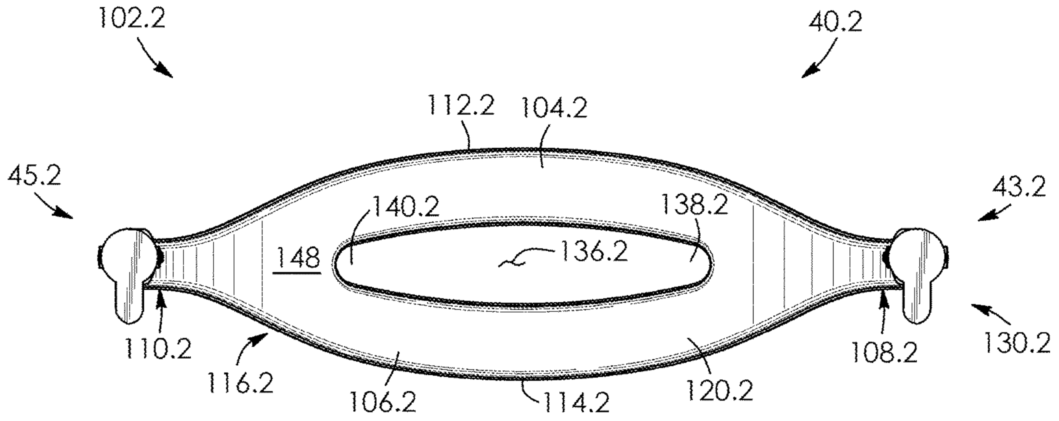
FIG. 31 is a rear elevation view thereof.
Figure 32:
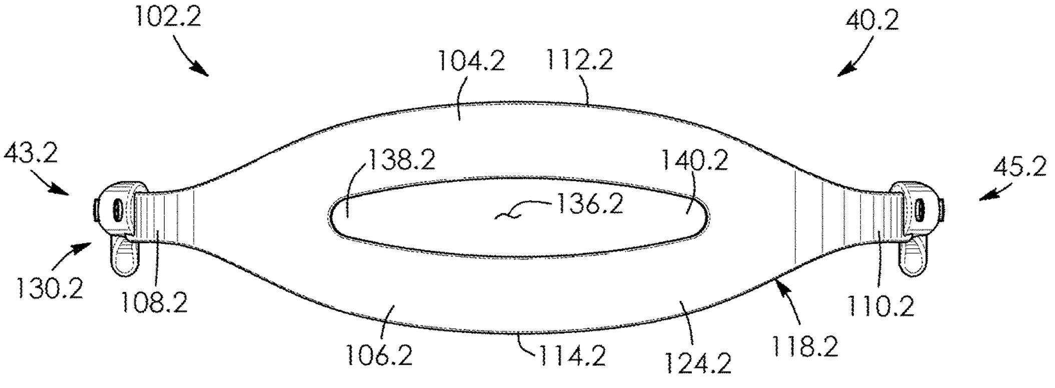
FIG. 32 is a front elevation view thereof.
Figure 33:
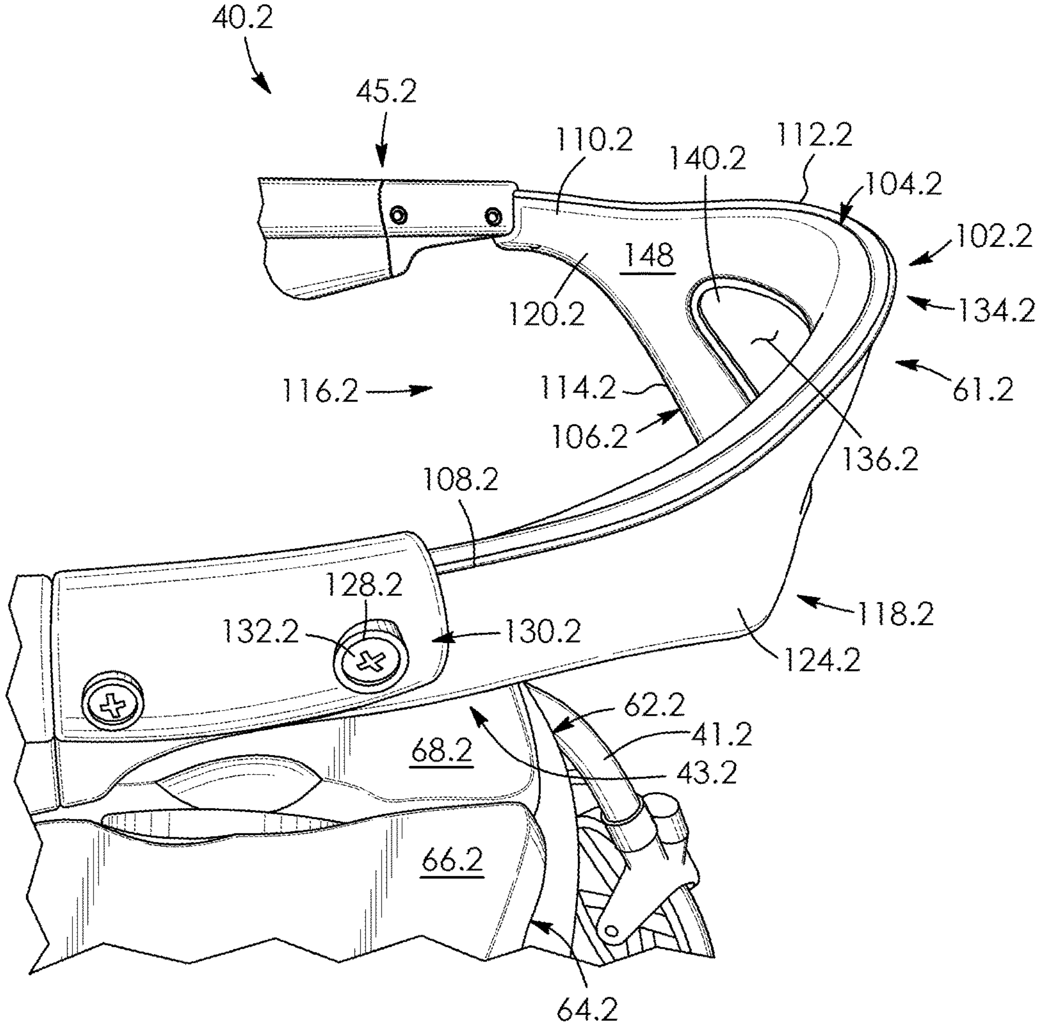
FIG. 33 is a fragmentary, side perspective view of the walker apparatus of FIG. 25 showing its handle brake assemblies and backrest connected thereto.

In this case, as best seen in FIG. 33, straps 104.2 and 106.2 extend along the front 61.2 of the walker apparatus. Referring to FIG. 25, the backrest 102.2 includes a cushioning member 148 located at and positioned within the concave-shaped interior 116.2 of the backrest. The cushioning member has an aperture 149 that coincides with and is coextensive with aperture 136.2 of the backrest. Ends 138.2 and 140.2 of aperture 136.2 are inwardly spaced-apart from proximal ends 108.2 and 110.2 of the backrest 102.2 and frame members 42.2 and 44.2. Backrest 102.2, straps 104.2 and 106.2 and aperture 136.2 are substantially symmetrical about the vertical, central axis 150 of the backrest and are substantially symmetrical about the horizontal axis 152 of the backrest in this case. The horizontal axis of the backrest and the upper ends 48.2 of the frame members 42.2 and 44.2 of walker apparatus 40.2 align within a horizontal plane 153 in this example. Strap 104.2 extends upwards from the horizontal plane in this example and strap 106.2 extends downwards from the horizontal plane as the straps extend towards the central portion 134.2 of the backrest when the walker apparatus 40.3 is upright.

Figure 34:
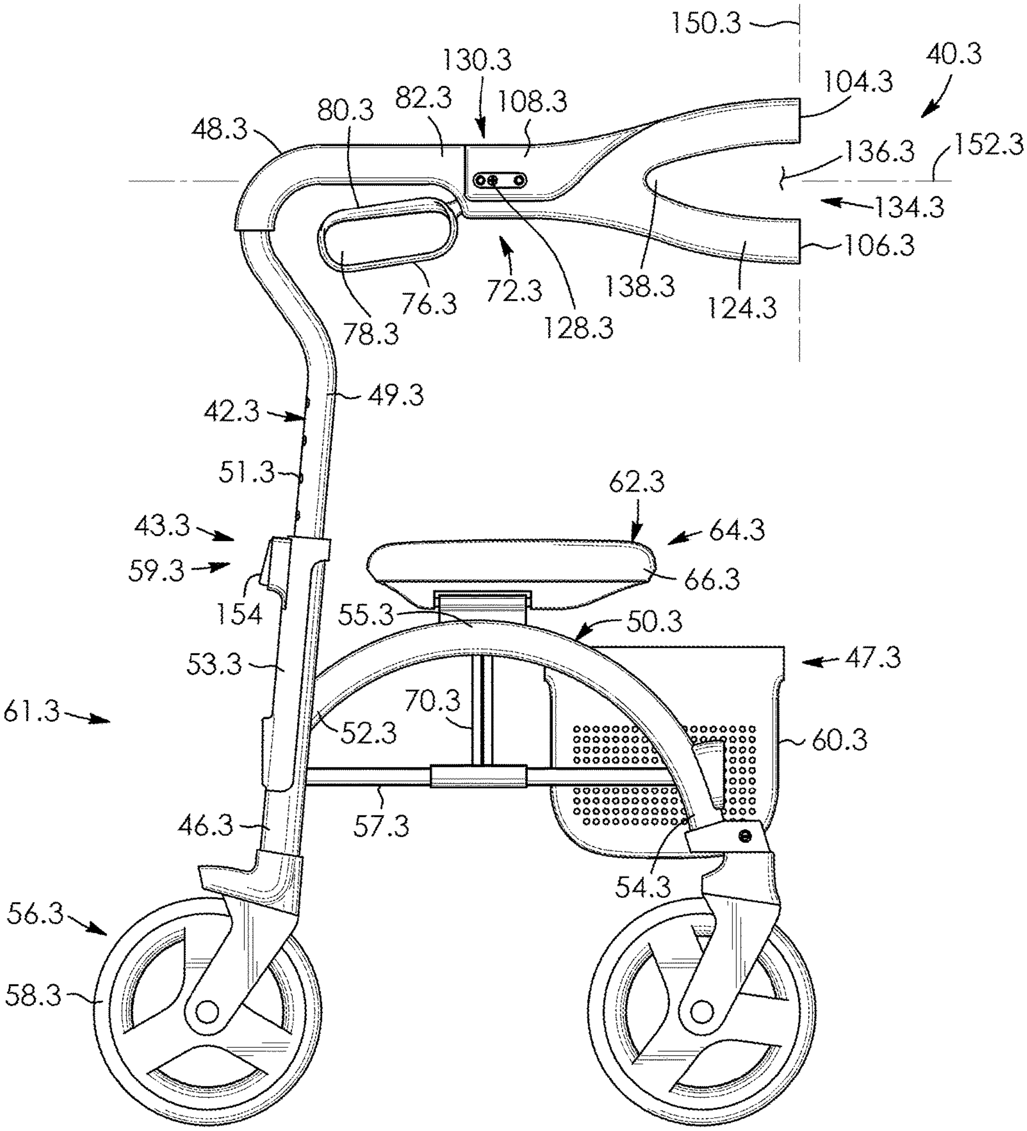
FIG. 34 is a side elevation view of a walker apparatus according to a fourth aspect.
Figure 35:
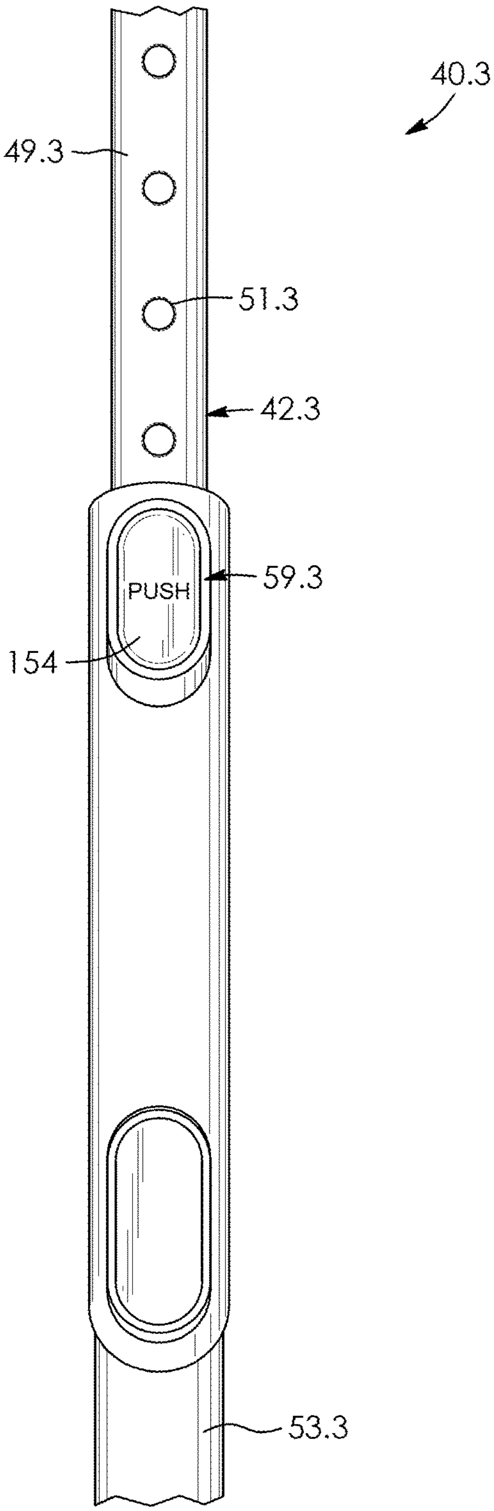
FIG. 35 is a fragmentary, rear elevation view of a frame member of the walker apparatus of FIG. 34.

FIGS. 34 and 35 show a walker apparatus 40.3 according to a fourth aspect. Like parts have like numbers and functionings as the apparatus shown in FIGS. 1 to 21 with the addition of decimal extension ".3". Walker apparatus 40.3 is generally similar to walker apparatus 40 shown in FIGS. 1 to 21, with backrest 102.3 being cantilevered to upper ends 48.3 of frame members 42.3 and 44.3 and having an aperture 136.3 extending therethrough, but with the apparatus having the following differences.

In this case, as seen in FIG. 34, the straps 104.3 and 106.3 extend outwards from the frame members 42.3 of the walker apparatus 40.3 in an elliptical manner. In this example, the backrest 102.3 is y-shaped when viewed from the side as it extends from the frame members. Similar to the backrest 102.2 shown in FIGS. 25 to 33, backrest 102.3, straps 104.3 and 106.3 and aperture 136.3 are substantially symmetrical about the vertical, central axis 150.3 of the backrest and are substantially symmetrical about the horizontal axis 152.3 of the backrest in this case.

The walker apparatus 40.3 includes a height-adjustment mechanism 59.3 for selectively adjusting and locking telescoping tubes 49.3 and 53.3 together. In this example and as best seen in FIG. 35, the adjustment mechanism includes a push button 154, instead of a thumb screw, for selecting coupling the tubes together and thus adjusting the height of the walker apparatus.

Figure 36:
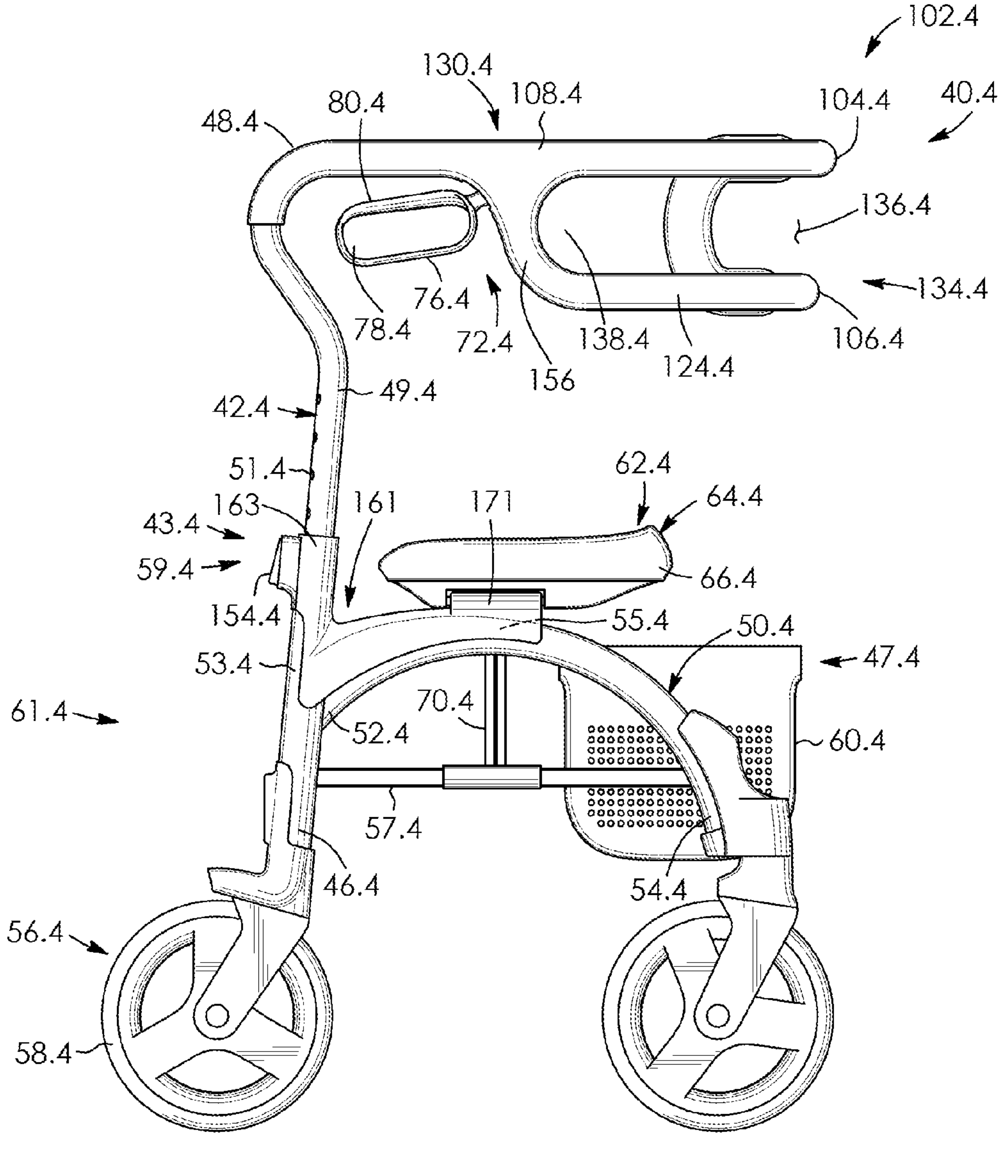
FIG. 36 is a side elevation view of a walker apparatus according to a fifth aspect.
Figure 37:
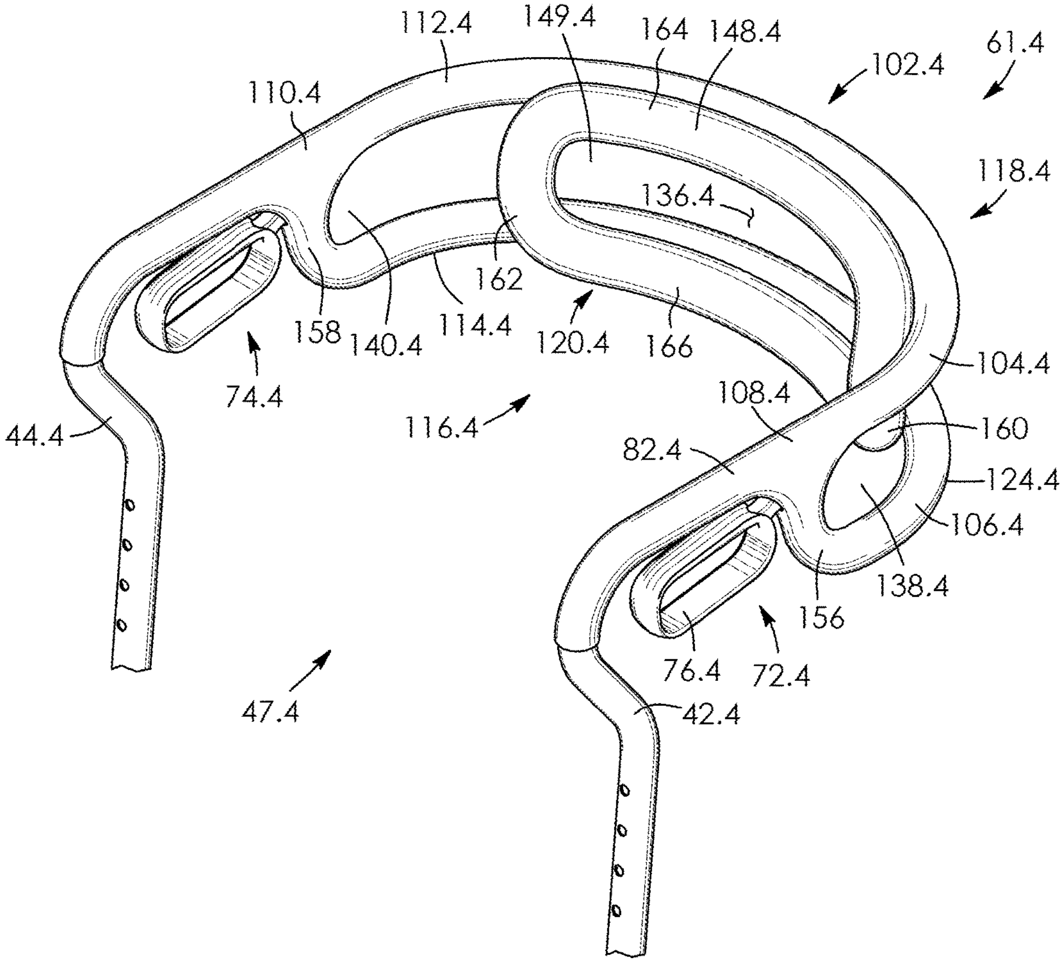
FIG. 37 is a top, rear perspective view of the walker apparatus of FIG. 36, the walker apparatus being shown in fragment.

FIGS. 36 and 37 show a walker apparatus 40.4 according to a fifth aspect. Like parts have like numbers and functionings as the apparatus shown in FIGS. 34 and 35 with decimal extension ".4" replacing previous decimal extension ".3" and being added for numbers not previously having a decimal extension. Walker apparatus 40.4 is generally similar to walker apparatus 40.3 shown in FIGS. 34 and 35, with backrest 102.4 being cantilevered to upper ends 48.4 of frame members 42.4 and 44.4 of the walker apparatus and having an aperture 136.4 extending therethrough, but with the apparatus having the following differences.

In this example, backrest 102.4 is u-shaped when viewed from the side as it extends outwards from the frame members 42.4 of the walker apparatus 40.4. As seen in FIG. 37, upper strap 104.4 aligns with and tangentially extends from the upper ends 48.4 of the frame members 42.4 and 44.4. Strap 104.4 is spaced-apart from and parallel to lower strap 106.4 in this example. Strap 106.4 and aperture 136.4 are spaced-apart below the upper ends of the frame members 42.4.

Backrest 102.4 further includes a pair of arc-shaped connecting members 156 and 158 that connect the upper strap 104.4 and lower strap 106.4 together. The straps 4 connect to and extend tangentially from the arc-shaped connecting members. The arc-shaped connecting members 156 and 158 and ends 138.4 and 140.4 of aperture 136.4 are semi-circular in this example and are positioned adjacent to the handle brake assemblies 72.4 and 74.4, respectively. Strap 106.4 is positioned below handles 76.4 of the walker apparatus 40.4.

Similar to cushioning member 148 of walker apparatus 40.2 of FIGS. 25 to 33, the walker apparatus 40.4 of FIG. 37 includes a cushioning member 148.4 located at the concave-shaped interior 116.4 of the backrest 102.4. The cushioning member connects to and extends from the backrest. The cushioning member 148.4 is loop-shaped and arcuate-shaped in this example. The cushioning member has a first curved end 160 outwardly spaced-apart from proximal end 108.4 of the backrest 102.4 and a second curved end 162 outwardly spaced-apart from proximal end 110.4 of the backrest. The cushioning member 148.4 has an elongate upper portion 164 and an elongate lower portion 166, each of which extends between ends 160 and 162 and is cylindrical in shape in this example. The cushioning member is positioned within the interior 116.4 of the backrest 102.4. The upper portion 164 of cushioning member 148.4 connects to and extends inwardly from the upper strap 104.4 and the lower portion 166 of the cushioning member connects to and extends inwardly from the lower strap 106.4 in this example. Aperture 149.4 of the cushioning member is oval-shaped in this example overlaps with aperture 136.4 of the backrest 102.4.

The walker apparatus 40.4 further comprises a pair of coupling members which selectively couple respective ones of the frame members and support members of the walker apparatus together, as seen by coupling member 161 in FIG. 36 coupling together frame member 42.4 and support member 50.4. The coupling members are L-shaped in side profile in this example. Each coupling member 161 comprises an upright tubular portion 163 which at least partially extends around portion 165 of a respective one of the frame members, in this example a portion adjacent to push-button 154.4. Each coupling member 161 further comprises an arcuate-shaped tubular portion 167 which at least partially extends around at least part of a respective one of the support members 50.4. Upper ends 171 of the tubular portions 167 align with the apexes 55.4 of the support members and include seat mounts, in this example cylindrical receptacles to which respective portions of the seat 64.4 pivotally connect. Alternatively, upper ends 171 of the tubular portions 167 may comprise elongated rods received by corresponding receptacles on the respective portions of the seat in other embodiments.

Figure 38:
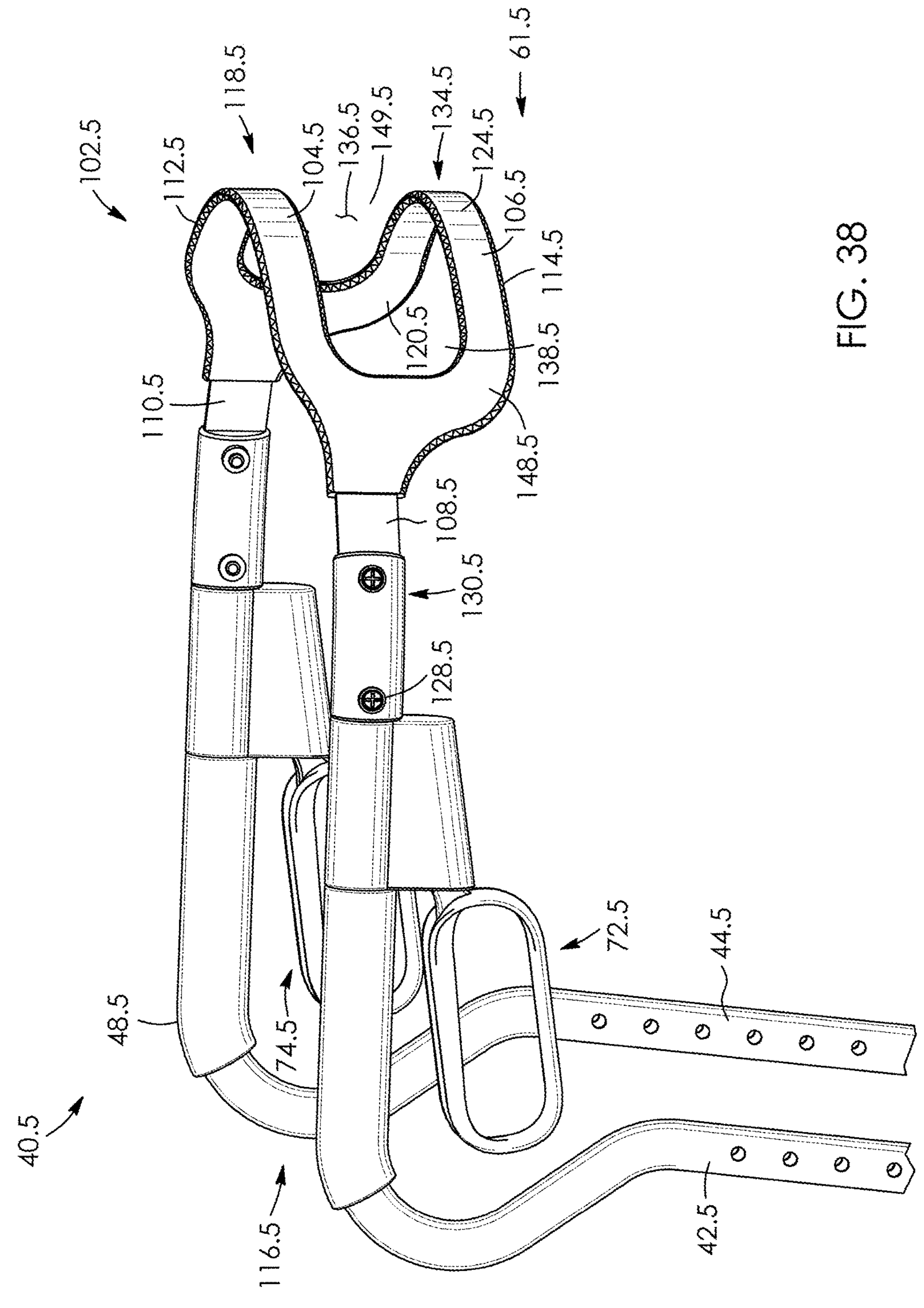
FIG. 38 is a fragmentary, side perspective view of a walker apparatus according to a sixth aspect.

FIG. 38 shows a walker apparatus 40.5 according to a sixth aspect. Like parts have like numbers and functionings as the apparatus shown in FIGS. 34 and 35 with decimal extension ".5" replacing decimal extension ".3" and being added for parts not previous having decimal extensions. Walker apparatus 40.5 is generally similar to walker apparatus 40.3 shown in FIGS. 34 and 35, with backrest 102.5 being cantilevered to upper ends 48.5 of frame members 42.5 and 44.5 and having an aperture 136.5 extending therethrough, but with the apparatus having the following differences.

Backrest 102.5 includes a cushioning member 148.5 that extends substantially around the straps 104.5 and 106.5. In this example, the cushioning member is in the form of a neoprene cover sewn around the straps. However, this is not strictly required and the cushioning member may be made other materials in other embodiments.

The backrest 102.5 is u-shaped in side profile as the backrest extends from the frame members 42.5 and 44.5 of the walker apparatus 40.5. Upper strap 104.5 extends above the upper ends 48.5 of the frame members of the walker apparatus and lower strap 106.5 extends below the upper ends of the frame members.

Figure 39:
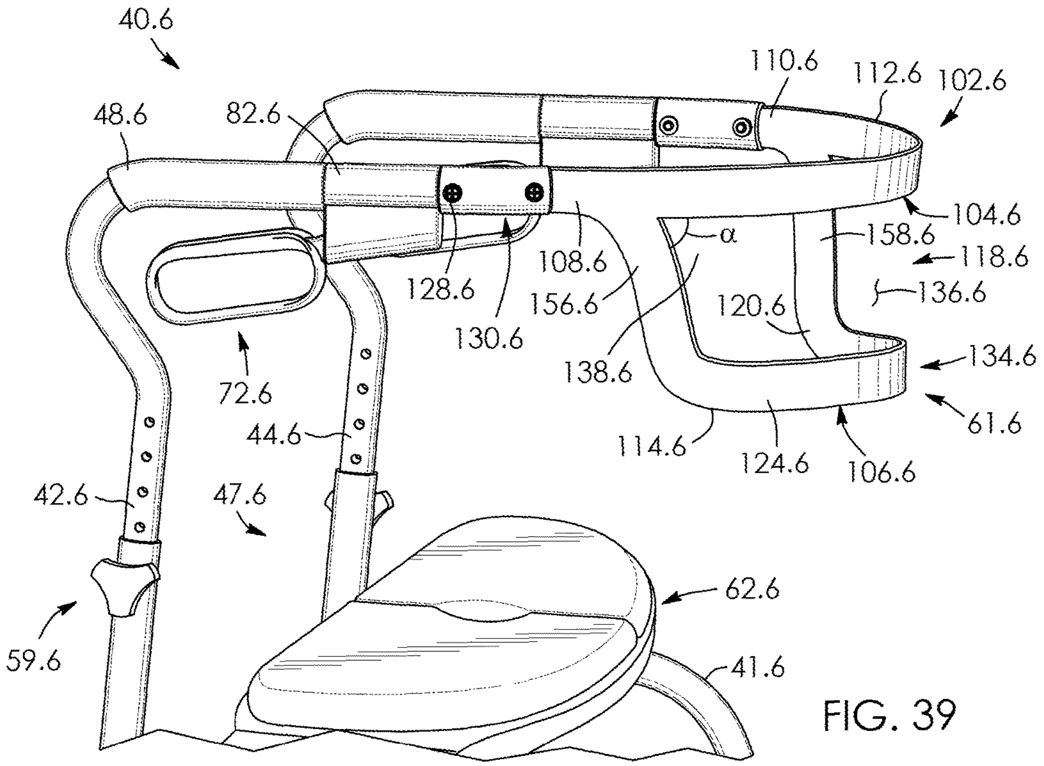
FIG. 39 is a fragmentary, side perspective view of a walker apparatus according to a seventh aspect.
Figure 40:
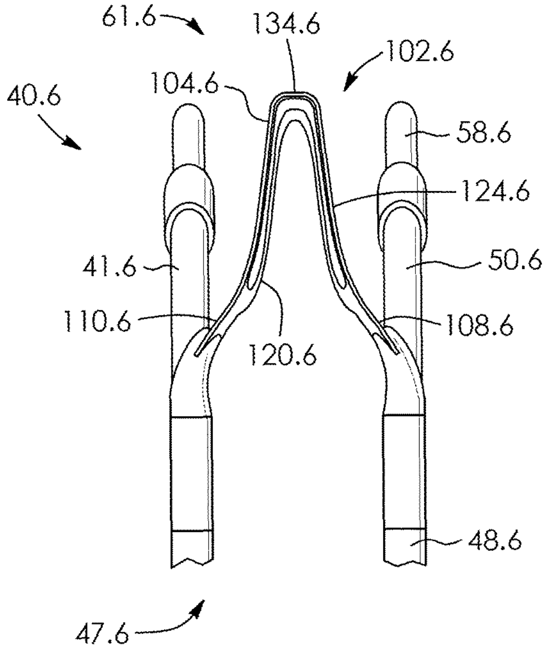
FIG. 40 is a fragmentary, top plan view thereof.
Figure 41:
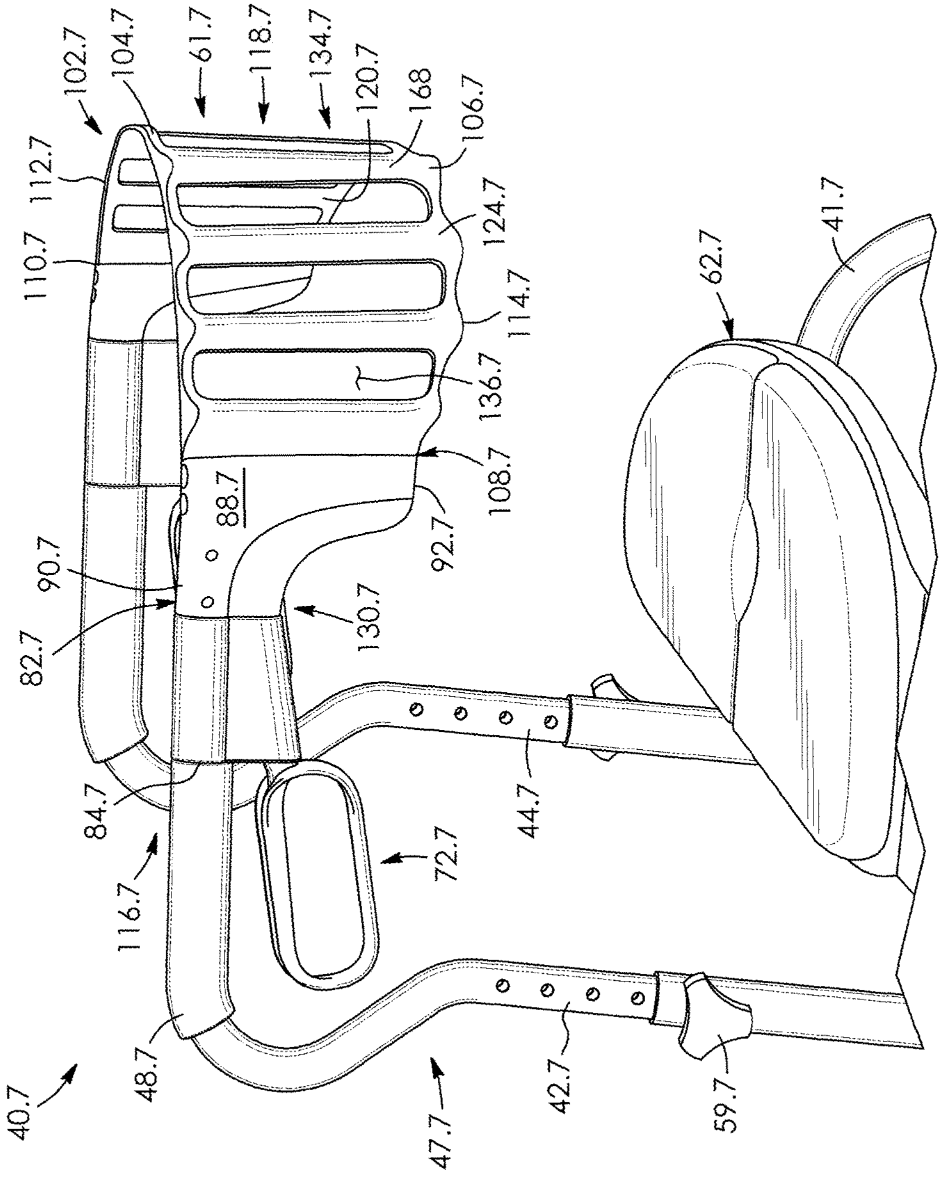
FIG. 41 is a fragmentary, side perspective view of a walker apparatus according to an eighth aspect.

FIGS. 39 and 40 show a walker apparatus 40.6 according to a seventh aspect. Like parts have like numbers and functionings as the apparatus shown in FIGS. 36 and 37 with decimal extension ".6" replacing decimal extension ".4" and being added for parts not previous having decimal extensions. Walker apparatus 40.6 is generally similar to walker apparatus 40.4 shown in FIGS. 36 and 37, with backrest 102.6 being cantilevered to upper ends 48.6 of frame members 42.6 and 44.6 and having an aperture 136.6 extending therethrough, but with the apparatus having the following differences.

Connecting members 156.6 and 158.6, which connect upper strap 104.6 and lower strap 106.6 together, have a generally elongated s-shape in this example. Ends 138.6 and 140.6 of aperture 136.6 are tapered in this example towards upper strap 104.6. The upper strap extends from connecting members 156.6 and 158.6 at acute angles $\alpha$ relative to the connecting members. As seen in FIG. 40, the backrest 102.6 is shaped to form a substantially v-shape when viewed from above in this example when the walker apparatus is folded laterally. The straps of the backrest are substantially inwardly spaced-apart from the support members 41.6 and 50.6.

FIGS. 41 to 45 show a walker apparatus 40.7 according to an eighth aspect. Like parts have like numbers and functionings as the apparatus shown in FIGS. 1 to 21 with the addition of decimal extension ".7". Walker apparatus 40.7 is generally similar to walker apparatus 40 shown in FIGS. 1 to 21, with backrest 102.7 being cantilevered to upper ends 48.7 of frame members 42.7 and 44.7 and including at least one aperture 136.7 extending therethrough, but with the apparatus having the following differences.

Figure 45:
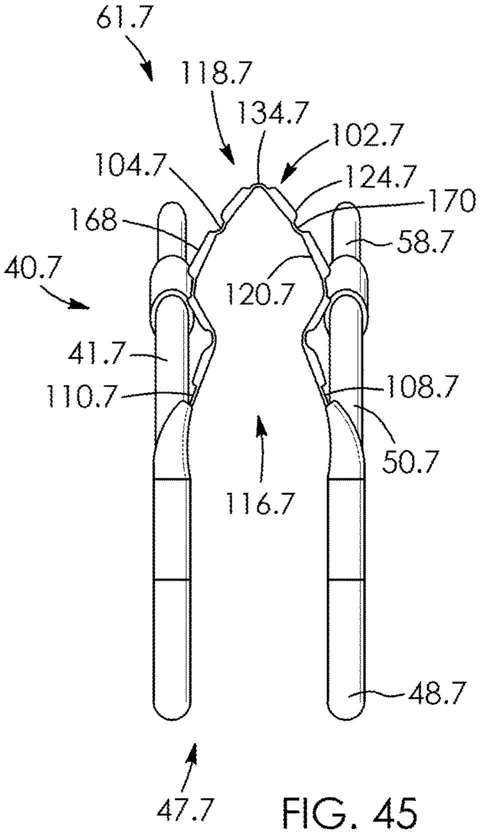
FIG. 45 is a fragmentary, top plan view of the walker apparatus of FIG. 41.

Backrest 102.7 comprises a plurality of spaced-apart, vertically-extending columns or ribs 168 each of which may be rigid and generally in the shape of a rectangular prism in this example, as seen in FIG. 45. Referring back to FIG. 41, the backrest is shaped to extend downwards sufficiently far so that it may function to support the lumbar 169 of the user 65 seen in FIG. 21 when the walker apparatus 40.7 is upright.

The backrest 102.7 further includes a pair of straps in the form of substantially-horizontal and elongate upper and lower bridging members 104.7 and 106.7 which are arcuate-shaped when the walker apparatus 40.7 is in its unfolded mode. Ribs 168 connect to and extend between the bridging members. As seen in FIG. 45, the ribs extend outwards relative to the bridging members 104.7 and 106.7. The bridging members are narrower in cross-section compared to the ribs 168 in this example.

Referring back to FIG. 41, the backrest 102.7 includes a plurality of spaced-apart openings which extend substantially vertically, which are in this example in the form of a plurality of vertically-extending apertures 136.7 interposed between adjacent ribs 168. The backrest may thus be said to have a skeleton-like structure.

As seen in FIG. 45, the backrest 102.7 has a plurality of u-shaped recesses at its exterior 118.7, as seen by recess 170. The recesses are adjacent to the bridging members 104.7 and 106.7 and are interposed between adjacent ribs 168. The recesses 170 facilitate folding of the backrest 102.7 and may function as vertically-extending bending regions to facilitate laterally folding the walker apparatus 40.7.

Figure 44:
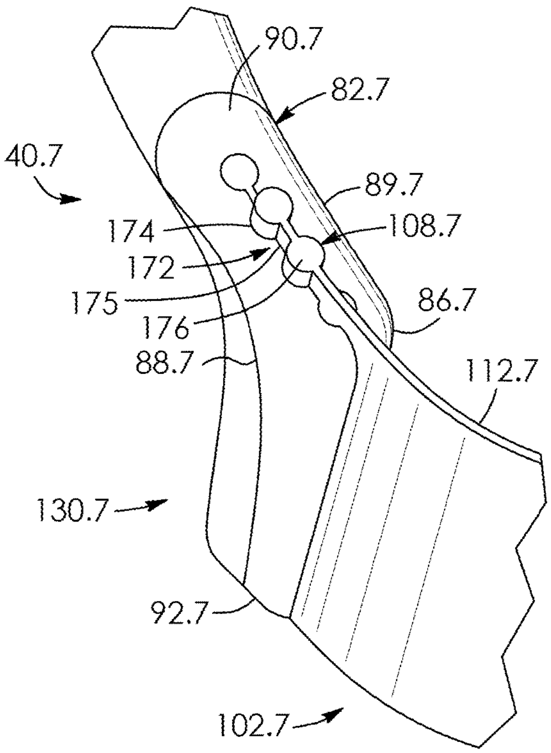
FIG. 44 is a fragmentary, side perspective view of the proximal end of the backrest of FIG. 43 engaging with the housing of the walker apparatus of FIG. 42 for connecting the backrest to the rest of the walker apparatus thereby.

Referring now to FIG. 44, housings 82.7 are generally L-shaped in profile in this example. Each housing has L-shaped sides 86.7 and 88.7. The housings have bottoms 92.7 that curve downwards in a concave-manner, in this example, as the housings extends outwards from upper ends 48.7 of the frame members 42.7 and 44.7 when the walker apparatus is upright.

Figure 42:
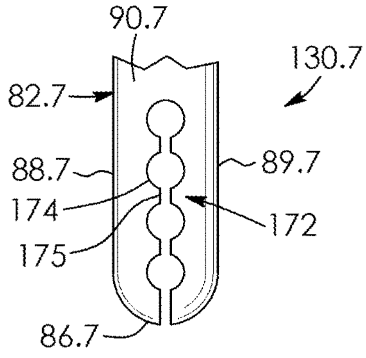
FIG. 42 is a fragmentary, plan view of housing which forms part of an adjustment assembly for the walker apparatus of FIG. 41.
Figure 43:
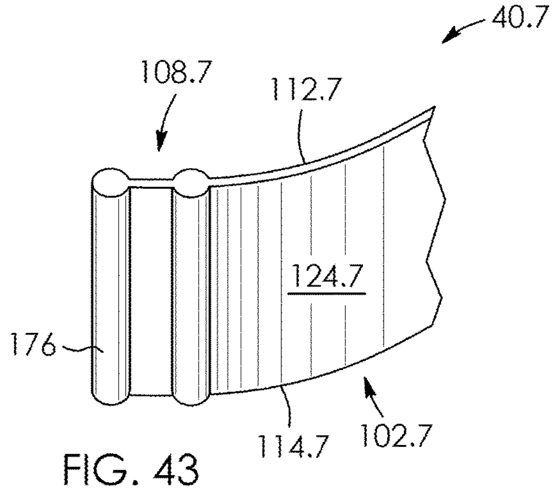
FIG. 43 is a fragmentary, side perspective view of a proximal end of a backrest of the walker apparatus of FIG. 41, the proximal ends of the backrest forming further parts of the adjustment assembly for the walker apparatus.

Referring to FIGS. 42 to 44, adjustment mechanism 130.7 has female connectors in the form slots 172 each extending inwards from a respective distal end 86.7 of its housing 82.7. Each slot extends from top 90.7 to bottom 92.7 of its housing in this example. As seen in FIG. 44, each slot 172 further includes a plurality of horizontally spaced-apart recesses, in this example in the form of four recesses, as seen by recess 174, positioned therewithin, and a plurality connector portions interposed between the recesses, as seen by connector portion 175. The recesses are wider than and extend radially outwards relative to the connector portions of the slots 172. Adjustment mechanism 130.7 further includes a plurality of vertically extending protrusions, in this example a pair of protrusions, as seen by protrusion 176. The protrusions are located adjacent to and extend outwards from respective ones of the distal ends 108.7 of the backrest 102.7. The protrusions are receivable within slots 172 and selective ones of the recesses 174.

Figure 46:
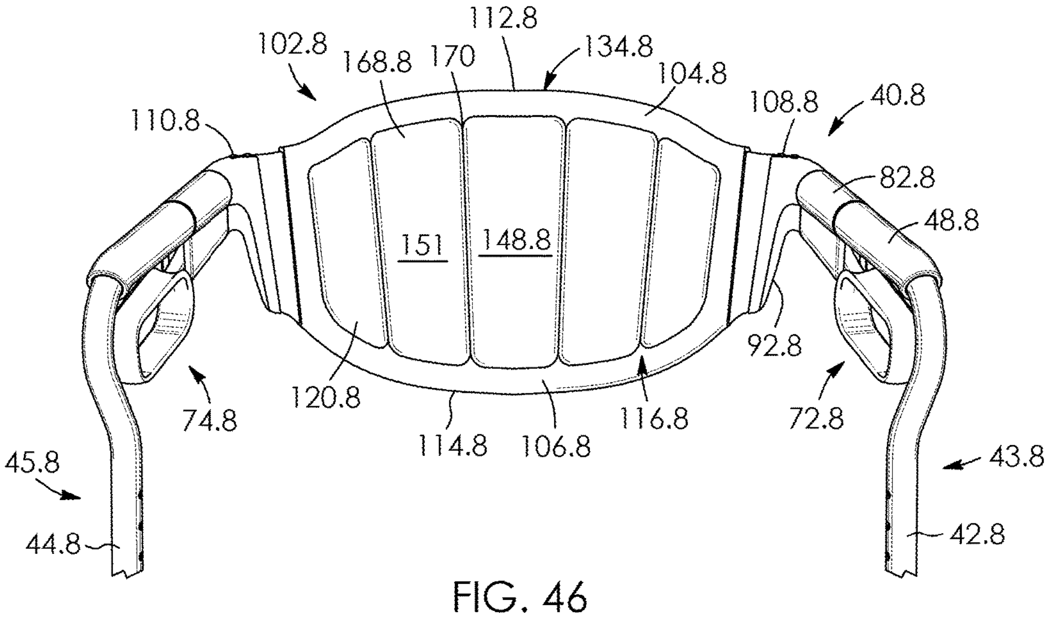
FIG. 46 is a fragmentary, rear perspective view of a walker apparatus according to a ninth aspect.

FIG. 46 shows a walker apparatus 40.8 according to a ninth aspect. Like parts have like numbers and functionings as the apparatus shown in FIGS. 41 to 45 with decimal extension ".8" replacing decimal extension ".7" and being added for numerals of corresponding parts not previously having a decimal extensions. Walker apparatus 40.8 is generally similar to walker apparatus 40.7 shown in FIGS. 41 to 45, with backrest 102.8 being cantilevered to upper ends 48.8 of frame members 42.8 and 44.8, but with the apparatus having the following differences.

In this example a cushioning member 148.8 substantially extends around ribs 168.8 and bridging members 104.8 and 106.8 extend between the ribs. The cushioning member, or outer coat, may be made of neoprene or EVA foam (ethylene vinyl acetate) wrapped in polyester, according to some examples. However, here too these materials are not strictly required and other materials may be used in other embodiments. The cushioning member 148.8 comprises a plurality of vertical-extending portions coupled together and which extend between the bridging members 104.8 and 106.8, as seen by portion 151 of the cushioning member.

Bridging member 104.8 is upwardly curved as the backrest 102.8 extends towards central portion 134.8 of the backrest. Bridging member 106.8 downwardly curves as the backrest extends towards the central portion of the backrest.

Figure 47:
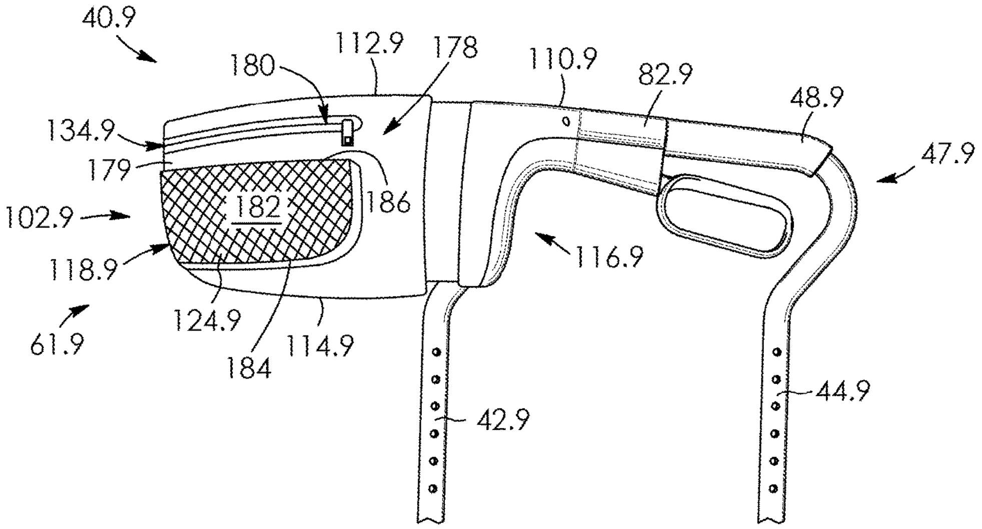
FIG. 47 is a fragmentary, side perspective view of a walker apparatus according to a tenth aspect.

FIG. 47 shows a walker apparatus 40.9 according to a tenth aspect. Like parts have like numbers and functionings as the apparatus shown in FIG. 47 with decimal extension ".9" replacing decimal extension ".8" and being added for numerals of corresponding parts not previously having a decimal extensions. Walker apparatus 40.9 is generally similar to walker apparatus 40.8 shown in FIG. 46, with backrest 102.9 being cantilevered to upper ends 48.9 of frame members 42.7 and 44.7, but with the apparatus having the following differences. In this case, backrest 102.9 is substantially rectangular in section.

Also, the backrest includes a receptacle 178 extending across the back 179 of the backrest for storing objects. The receptacle is positioned on the exterior 118.9 of the backrest 102.9. The receptacle 178 in this example includes a zipper assembly 180 for selectively opening and closing the receptacle. The backrest 102.9 further includes an outer netting 182 having a closed bottom 184 and open top 186 for further facilitating storing of objects. The netting is also positioned on the exterior 118.9 of the backrest in this example.

Figure 48:
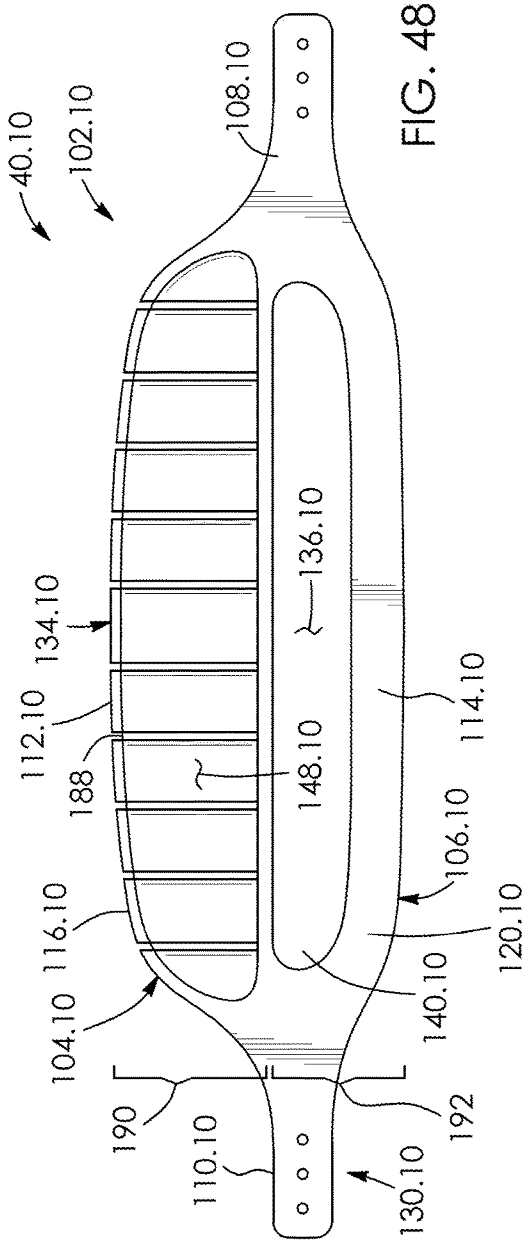
FIG. 48 is a rear elevation view of a backrest for a walker apparatus according to an eleventh aspect, the backrest being shown laid out flat and unattached to the walker apparatus.
Figure 49:
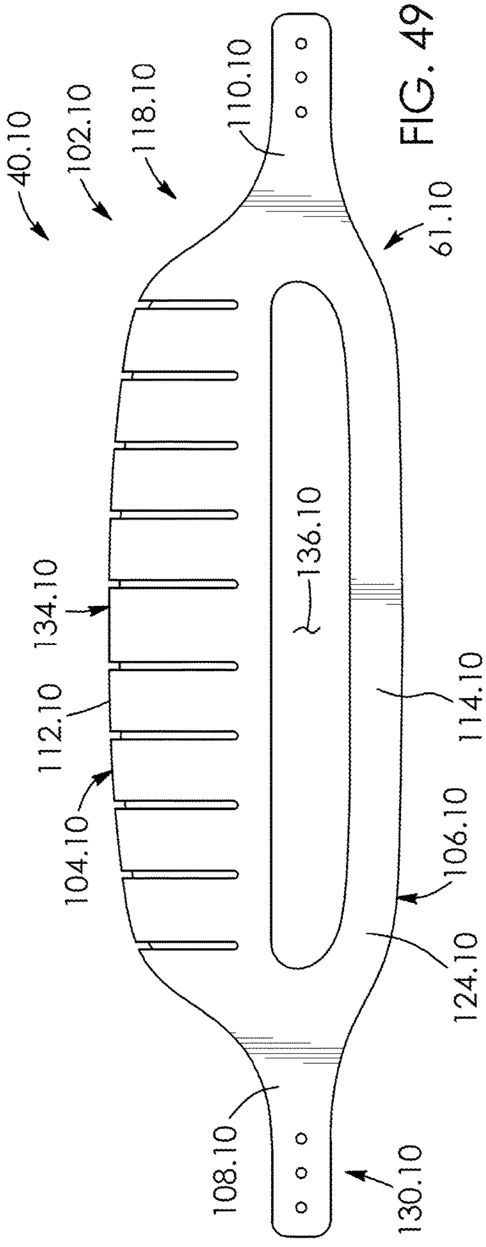
FIG. 49 is a front elevation view thereof.

FIGS. 48 and 49 show a backrest 102.10 of a walker apparatus 40.10 according to an eleventh aspect. Like parts have like numbers and functionings as the apparatus shown in FIGS. 39 and 40 with decimal extension ".10" replacing decimal extension ".6" and being added for features not previously having decimal extensions. The backrest is shown laid out flat. The backrest 102.10 of the walker apparatus 40.10 is generally similar to the backrest 102.6 of walker apparatus 40.6 shown in FIGS. 39 and 40, with backrest 102.10 being cantilevered to the upper ends of the frame members 42, such as the upper ends 48.6 of frame members 42.6 and 44.6 seen in FIG. 39, including at least one aperture 136.10 extending therethrough, with apparatus 40.10 having the following differences.

Aperture 136.10 of the backrest 102.10 aligns with the upper ends of the frame members, such as the upper ends 48.6 of frame members 42.6 and 44.6 seen in FIG. 39, with the upper strap 104.10 being substantially positioned above the upper ends of the frame members and lower strap 106.10 being substantially positioned below the upper ends of the frame members in this example. Upper strap 104.10 includes a plurality of spaced-apart slits or grooves 188 partially extending therethrough which extend downwards from the top 112.10 of the backrest when the walker apparatus 40.10 is upright. The grooves extend substantially vertically in this example and are circumferentially spaced-apart when the backrest 102.10 is in its unfolded, arcuate-shaped mode.

The upper strap 104.10 comprises an upper half 190 of the backrest. Cushioning member 148.10 substantially extends along the upper half of the backrest adjacent to the interior 116.10 of the backrest. Aperture 136.10 of the backrest and lower strap 106.10 together comprise a lower half 192 of the backrest. Grooves 188 extend from top 112.10 and substantially through upper half 190 of the backrest towards the lower half 192 of the backrest in this example. Cushioning member 148.10 substantially extends along the grooves, leaving the grooves exposed adjacent to the top 112.10 of the backrest.

Backrest 102.10 is generally formed with flat surfaces made of polyolefins (polyethylene or polypropylene) with no reinforcement in this example, though these materials are not strictly required. The resulting backrest may bend evenly along its width.

Figure 50:
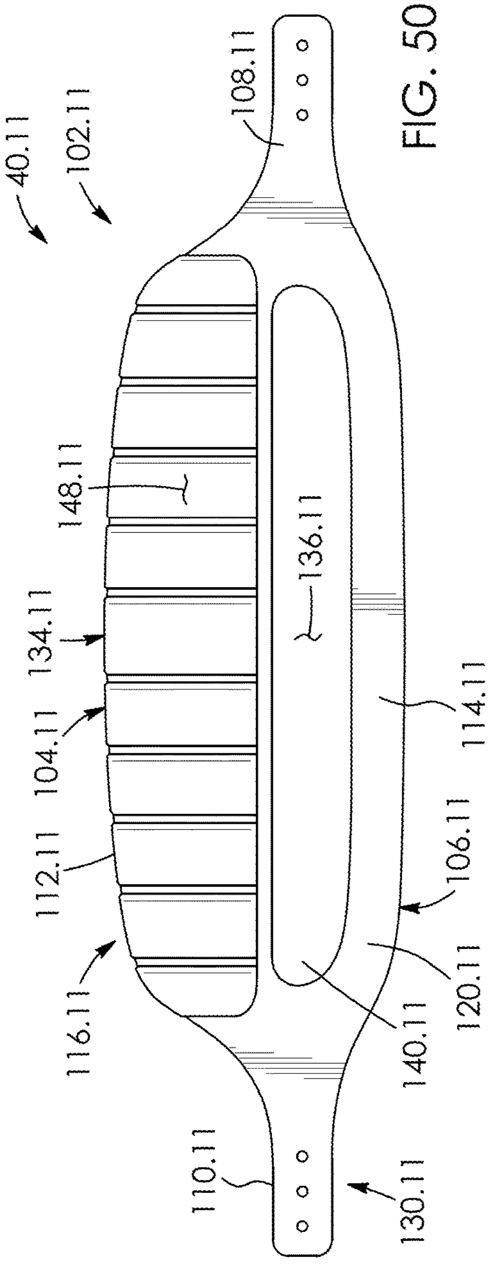
FIG. 50 is a rear elevation view of a backrest for a walker apparatus according to a twelve aspect, the backrest being shown laid out flat and unattached to the walker apparatus.
Figure 51:
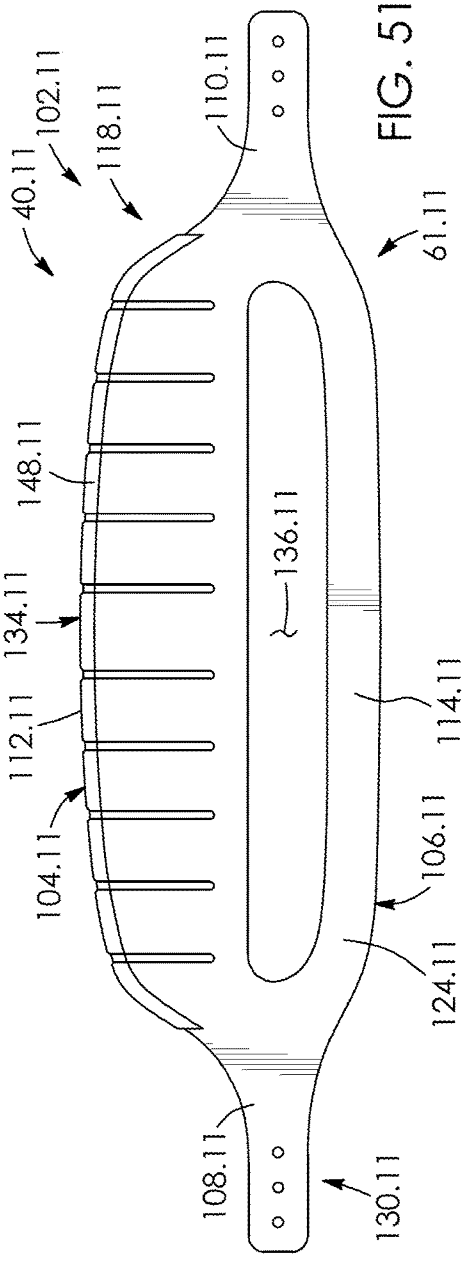
FIG. 51 is a front elevation view thereof.

FIGS. 50 and 51 show a backrest 102.11 for a walker apparatus 40.11 according to a twelfth aspect. Like parts have like numbers and functionings as the apparatus shown in FIGS. 48 and 49 with decimal extension ".11" replacing decimal extension ".10" and being added for features not previously having decimal extensions. The backrest 102.11 of walker apparatus 40.11 is generally similar to the backrest 102.11 of walker apparatus 40.10 shown in FIGS. 48 and 49 with the exception that cushioning member 148.11 extends over the tops of grooves 188.11 on the interior side 116.11 of the backrest 102.11 and extends over top 112.11 of the backrest.

Figure 52:
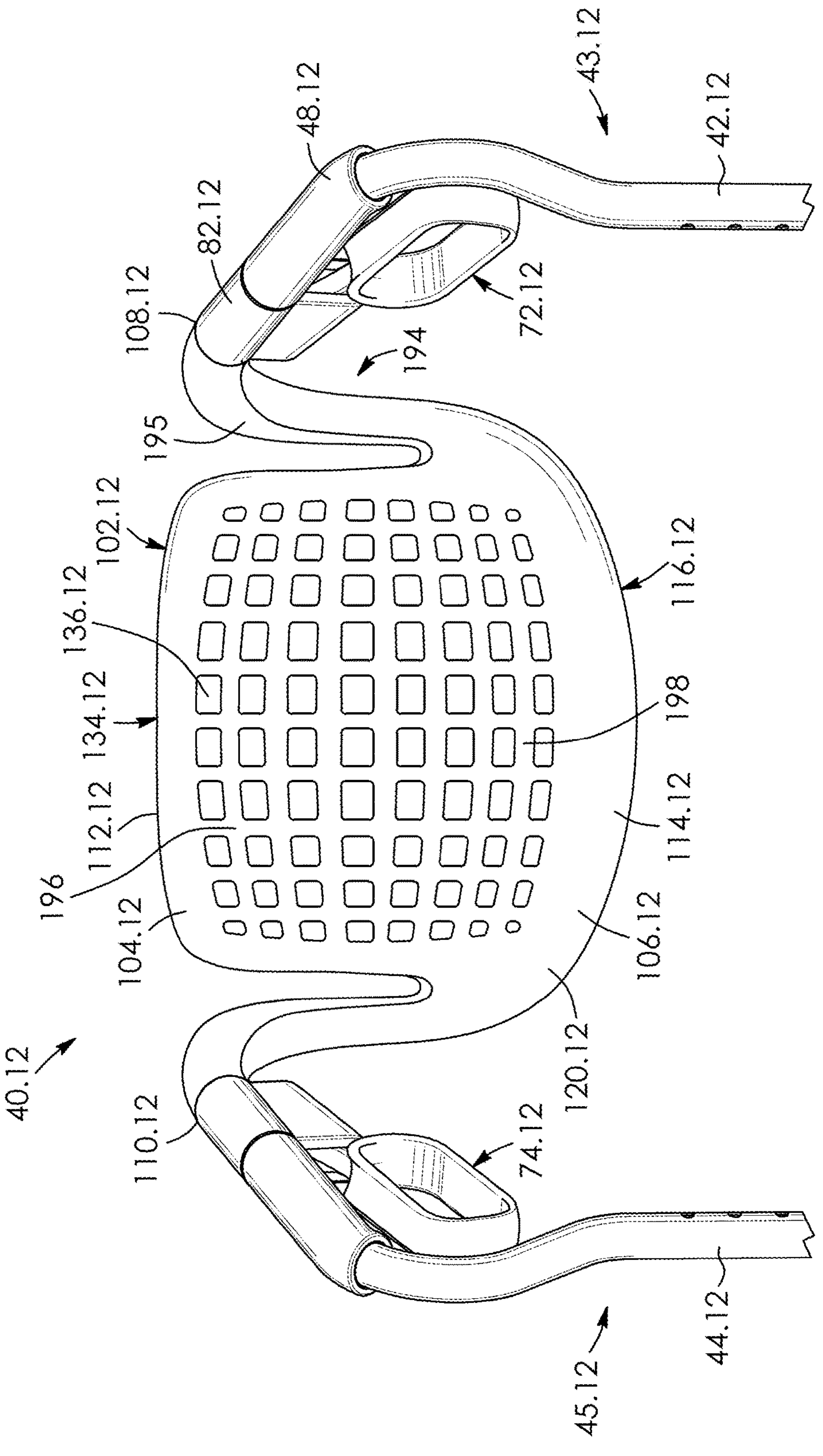
FIG. 52 is a fragmentary, rear perspective view of a walker apparatus according to a thirteenth aspect.
Figure 53:
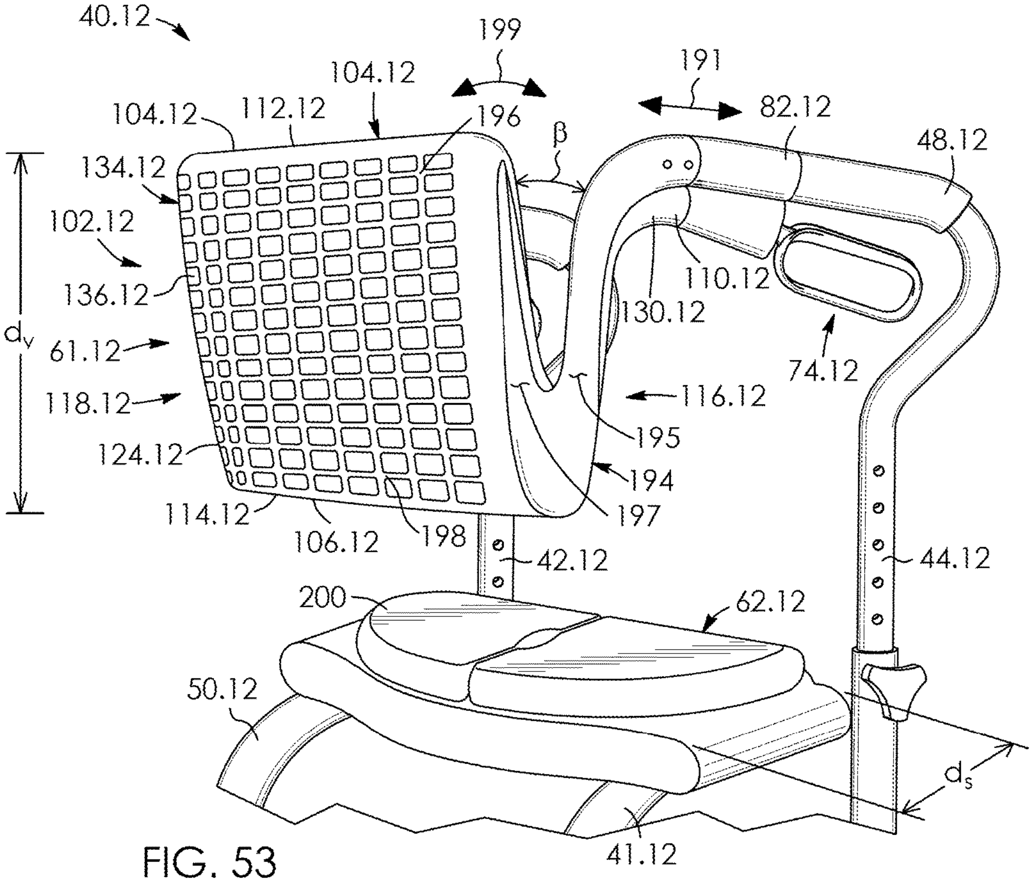
FIG. 53 is a fragmentary, side perspective view thereof.
Figure 54:
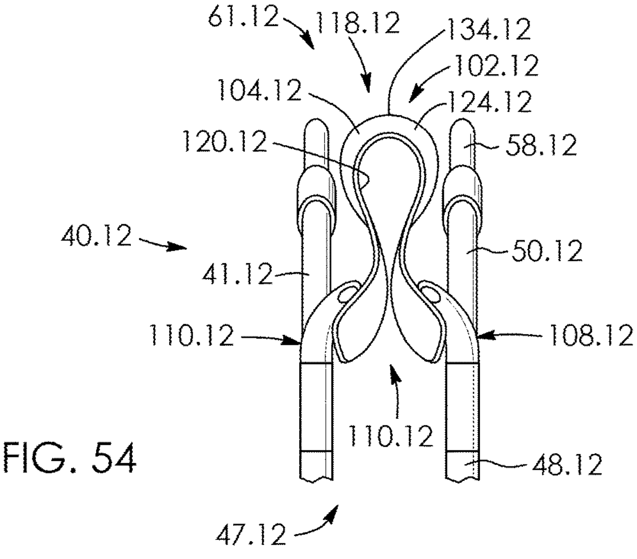
FIG. 54 is a fragmentary, top plan view thereof.

FIGS. 52 to 54 show a walker apparatus 40.12 according to a thirteenth aspect. Like parts have like numbers and functionings as the apparatus shown in FIGS. 1 to 21 with the addition of decimal extension ".12". Walker apparatus 40.12 is generally similar to walker apparatus 40 shown in FIGS. 1 to 21, with backrest 102.12 being cantilevered to the upper ends 48.12 of the frame members 42.12 and 44.12 and including at least one aperture 136.12 extending therethrough, but with the apparatus having the following differences.

Apparatus 40.12 includes a pair of u-shaped, resilient arms or connecting members, as seen by connecting member 194, that operatively connect the backrest 102.12 to upper ends 48.12 of the frame members 42.12 and 44.12, respectively, via housings 82.12 in this example. The connecting members may be made of acrylonitrile Butadiene Styrene (ABS) or hard polypropylene according to one example, though this is not strictly required and other materials may be used.

The connecting members 194 are adjustable in a horizontal direction as seen by arrow 191 in FIG. 53. Elongate first portions 195 of the connecting members extend downwards in a generally s-like shape and elongate second portions 197 of the connecting members extend generally upwards when the walker apparatus 40.12 is upright. The second portions of the connecting members extend angularly from the first portions of the connecting members by an angle $\beta$ that is acute in this example. The backrest 102.12 extends along and couples to the second portions 197 of the connecting members 194 in this example. Second portions 197 of the connecting members are at least partially flexible and are resiliently moveable relative to the first portions 195 of the connecting members, as seen by arrow of numeral 199 in FIG. 53.

The backrest 102.12 may be made of a more flexible material compared to the connecting members 194, enabling the connecting members to provide vertical support and strength and some resilience, while still ensuring that the backrest is readily foldable laterally. In this example the backrest 102.12 may be made of soft polypropylene or polyethylene, though this is not strictly required. The backrest includes a plurality of spaced-apart vertically-extending strips 196 and a plurality of spaced-apart horizontally-extending strips 198 intersecting with the vertically-extending strips in a grid-like pattern. A plurality of rows and columns of apertures 136.12 are formed thereby which are interposed between respective ones of the strips. The apertures are substantially rectangular in profile in this example. In this example, the backrest 102.12 is generally rectangular in front and rear profile.

As seen in FIG. 52, top 112.12 of the backrest aligns with the upper ends 48.12 of the frame members 42.12 and 44.12 in this example. Referring to FIG. 53, the vertically spanning distance $d_v$ of the backrest distance between the top 112.12 and bottom 114.12 of the backrest 102.12 is equal to or greater than the depth $d_s$ of the seat assembly 62.12 in this example. As seen in FIG. 54, backrest 102.12 so shaped is freely flexible and may fold in a wide-curl like shape when the walker apparatus 40.12 is folded laterally.

Figure 55:
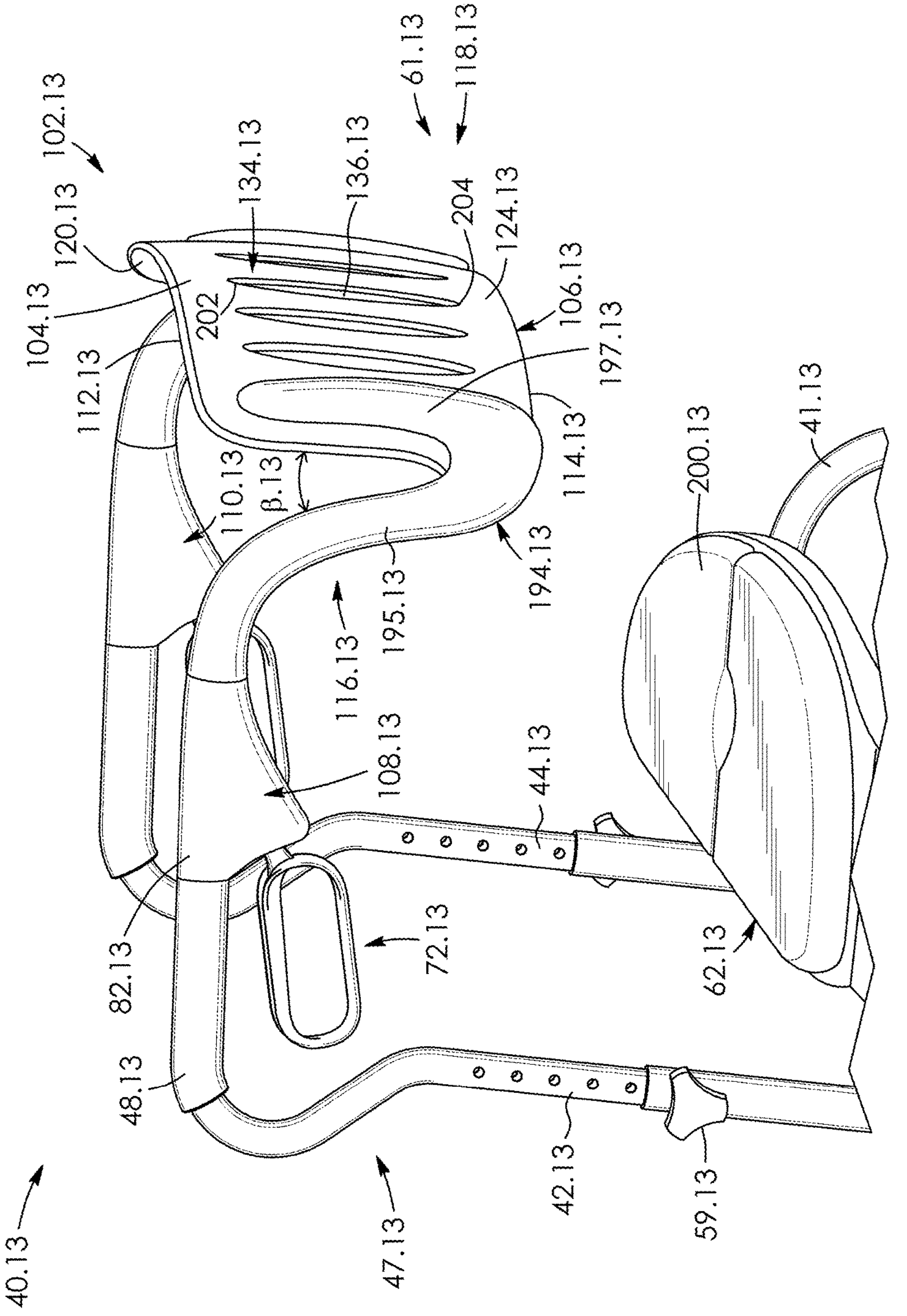
FIG. 55 is a fragmentary, side perspective view of a walker apparatus according to a fourteenth aspect.

FIG. 55 shows a walker apparatus 40.13 according to a fourteenth aspect. Like parts have like numbers and functionings as the apparatus shown in FIGS. 52 to 54 with decimal extension ".13" replacing decimal extension ".12" and being added for features not previously having decimal extensions. Walker apparatus 40.13 is generally similar to walker apparatus 40.12 shown in FIGS. 52 to 54, with backrest 102.13 being cantilevered to the upper ends 48.13 of frame members 42.13 and 44.13 and including at least one aperture 136.13 extending therethrough, but with the apparatus having the following differences.

In this example, backrest 120.13 includes a plurality of spaced-apart, vertically-extending slits 136.13 with first ends 202 adjacent to the top 112.13 of the backrest and second ends 204 adjacent to the bottom 114.13 of the backrest.

Figure 56:
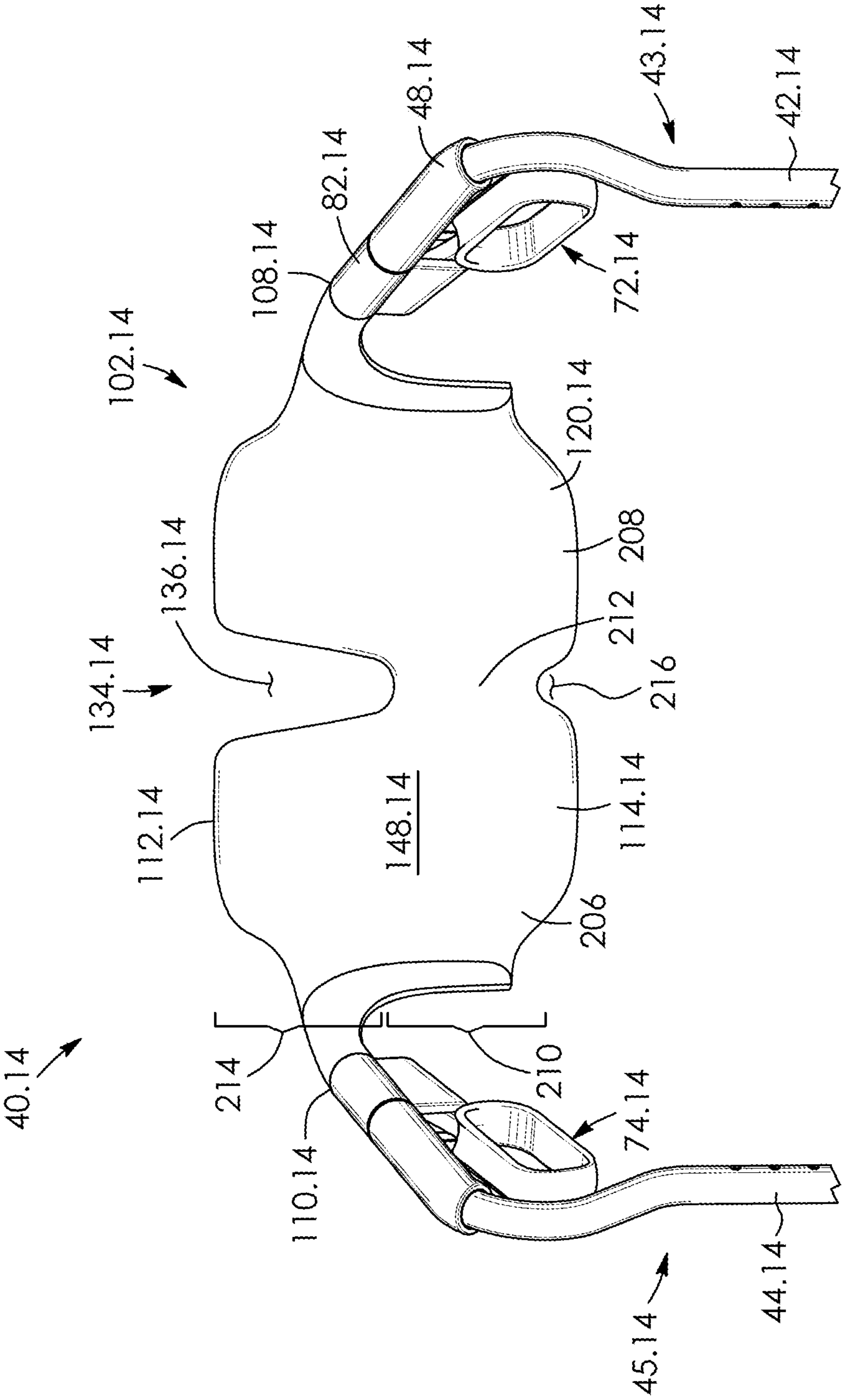
FIG. 56 is a fragmentary, rear perspective view of a walker apparatus according to a fifteenth aspect.
Figure 57:
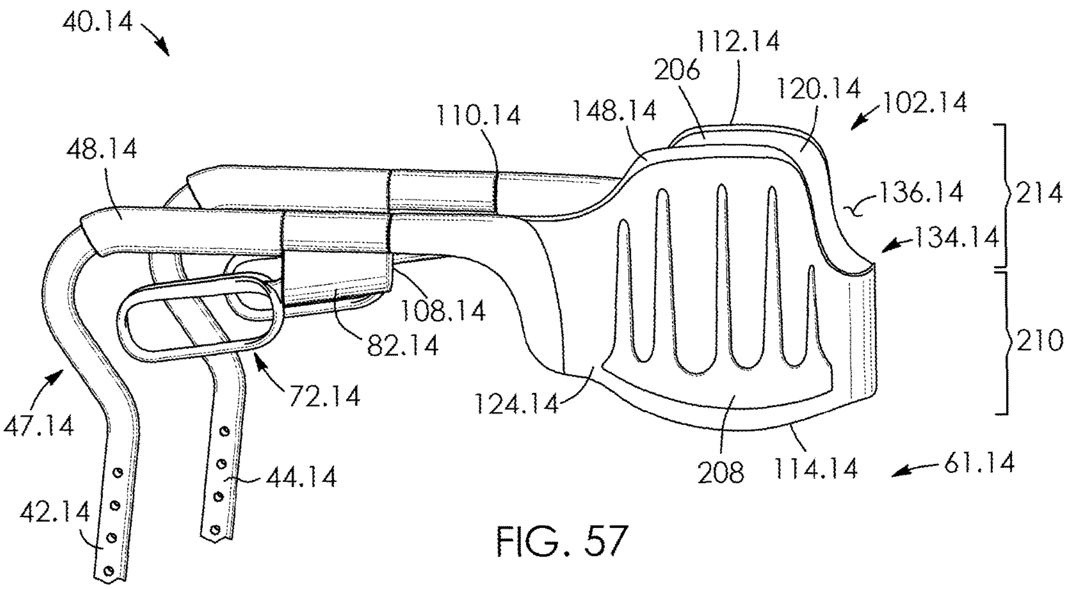
FIG. 57 is a fragmentary, side perspective view thereof.
Figure 58:
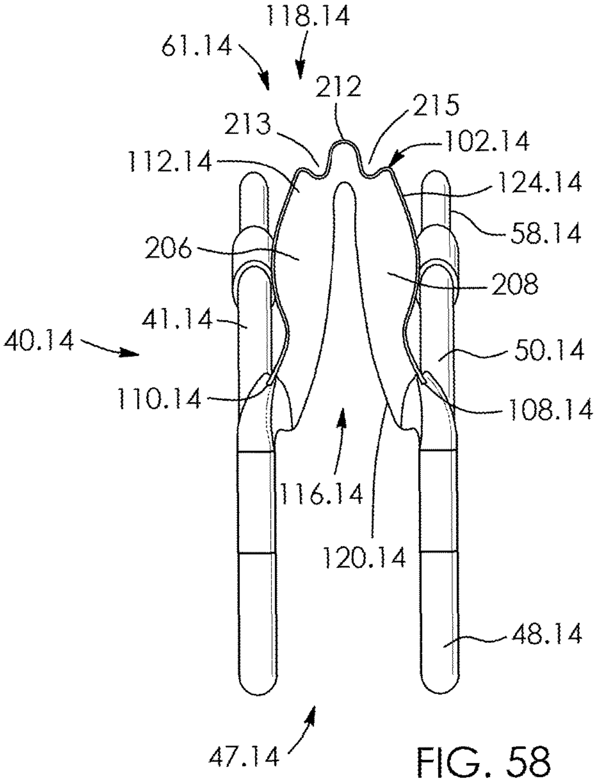
FIG. 58 is a fragmentary, top plan view thereof.

FIGS. 56 to 58 show a walker apparatus 40.14 according to a fifteenth aspect. Like parts have like numbers and functionings as the apparatus shown in FIG. 46 with decimal extension ".14" replacing decimal extension ".8" and being added for features not previously having decimal extensions. Walker apparatus 40.14 is generally similar to walker apparatus 40.8 shown in FIG. 46, with backrest 102.14 being cantilevered to upper ends 48.14 of frame members 42.14 and 44.14 and including at least one opening or recessed portion 136.14 extending therethrough, but with the apparatus having the following differences.

In this example, backrest 102.14 comprises a pair of substantially rectangular portions 206 and 208 coupled together at tower portions, in this example tower halves 210 thereof. As best seen in FIG. 58, a centrally positioned, vertically-extending rib 212 couples the rectangular portions of the backrest together in this example. The backrest 102.14 includes a pair of vertically-extending recessed portions 213 and 215 interposed between the rectangular portions 206 and 208 and rib 212, respectively. The backrest at these central locations are thinner compared to the rectangular portions and rib and may function to facilitate ready folding of the walker apparatus. Rib 212 may be also be thinner in cross-section than the rectangular portions 206 and 208 and may be made of polyurethane or double injection hard plastic for example, though this is not strictly required.

Referring in FIG. 56, the backrest 102.14 includes an upper opening in the form of an upper recessed portion 136.14 centrally extending downwards from the top 112.14 of the backrest when the walker apparatus 40.14 is upright. The recessed portion separates two side-by-side portions 206 and 208 of the backrest. The recessed portion 136.14 of the backrest 102.14 extends from an upper half 214 of the backrest to the lower half 210 of the backrest and is generally v-shaped in this example. The backrest in this example further includes a centrally-disposed lower recessed portion 216, seen in FIG. 56, extending upwards from the bottom 114.14 of the backrest 102.14 to rib 212 when the walker apparatus 40.14 is upright. The lower recessed portion 216 is also v-shaped in this example and is smaller than the upper recessed portion 136.14 in this example.

Figure 59:
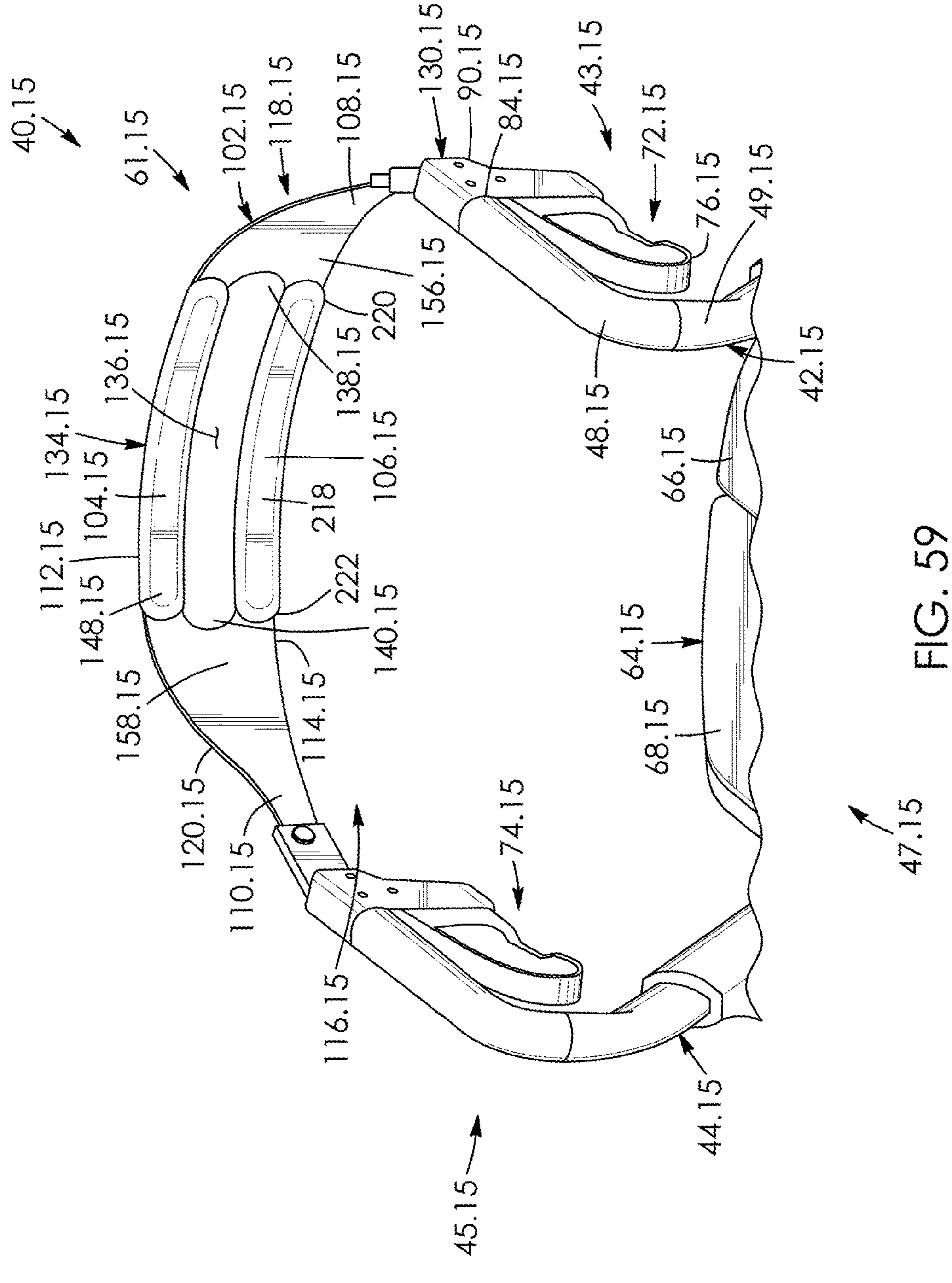
FIG. 59 is a fragmentary, rear, top perspective view of a walker apparatus including a backrest according to a sixteenth aspect.

FIG. 59 shows a walker apparatus 40.15 according to a sixteenth aspect. Like parts have like numbers and functions as the apparatus shown in FIGS. 25 to 33 with decimal extension ".15" replacing decimal extension ".2" and being added for features not previously having decimal extensions. Walker apparatus 40.15 is generally similar to walker apparatus 40.2 shown in FIG. 25, with backrest 102.15 being cantilevered to upper ends 48.15 of frame members 42.15 and 44.15 and including at least one opening or recessed portion 136.15 extending therethrough, but with the apparatus having at least the following exceptions.

Lower strap 106.15 of the backrest 102.15 aligns with, tangentially extends from, and couples to the upper ends 48.15 of the frame members 42.15 and 44.15 in this example. The backrest 102.15 includes a pair of connecting members 156.15 and 158.15 that couple the upper and lower straps together. The connecting members are planar and arc-shaped in top profile in this example.

Upper strap 104.15 is spaced-apart above lower strap 106.15 and above the upper ends 48.15 of the frame members 42.15 and 44.15 of the walker apparatus 40.15 when the walker apparatus is upright. Straps 104.15 and 106.15 are generally rectangular in front profile and arc-shaped in top profile in this example. The straps extend substantially parallel to each other in this example and in a substantially horizontal direction in this example when the walker apparatus is upright 40.15.

A first cushion member 148.15 extends about upper strap 104.15 and a second cushion member 218 extends about lower strap 106.15. Each of the cushion members has a first end 220 which aligns adjacent to end 138.15 of aperture 136.15 of the backrest 102.15 and a second end 222 which aligns adjacent to end 140.15 of the aperture in this example. The aperture of the backrest is oblong in this example and extends in a substantially horizontal direction in this example.

Figure 60:
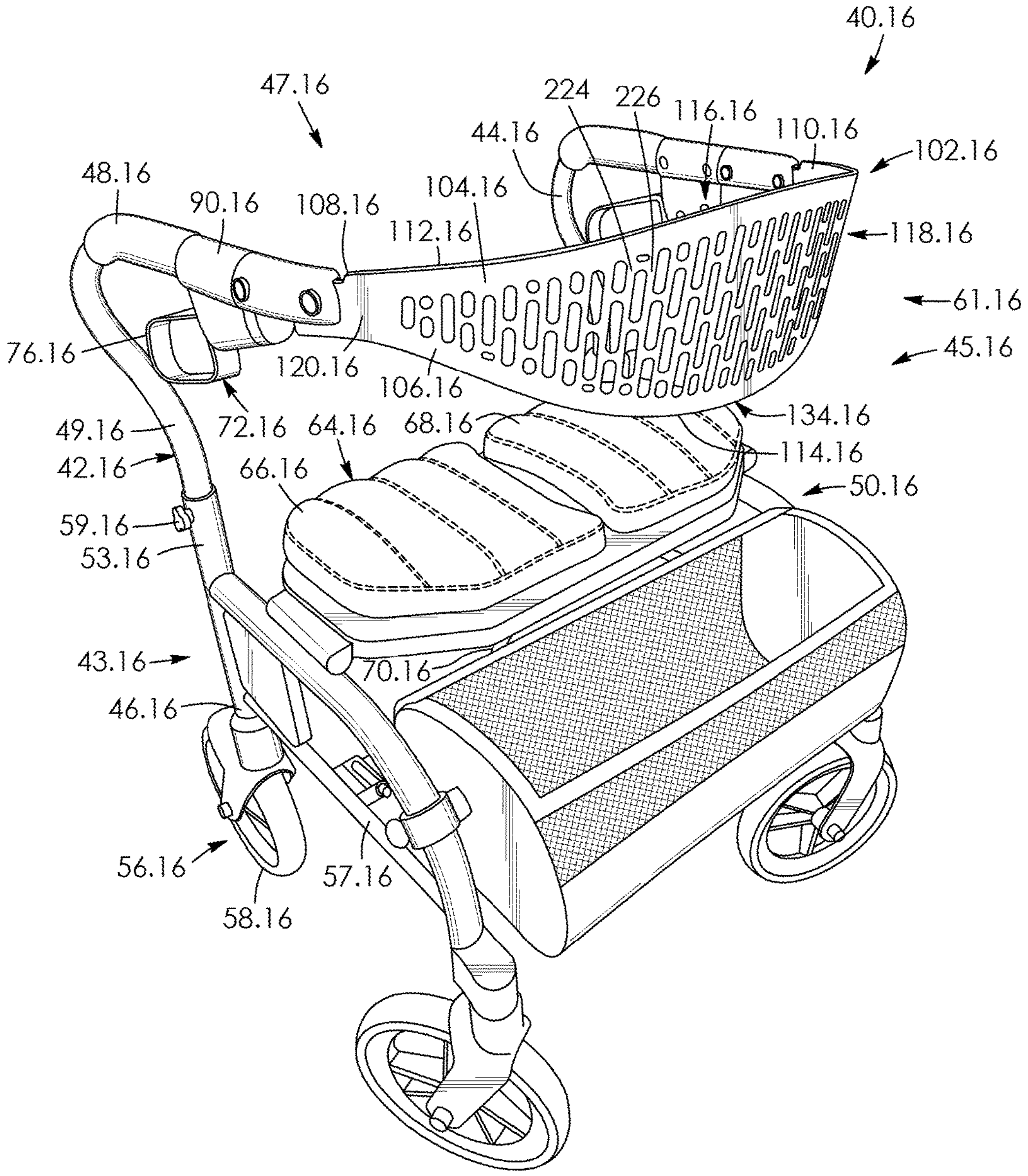
FIG. 60 is a fragmentary, front, side perspective view of a walker apparatus including a backrest according to a seventeenth aspect.
Figure 61:
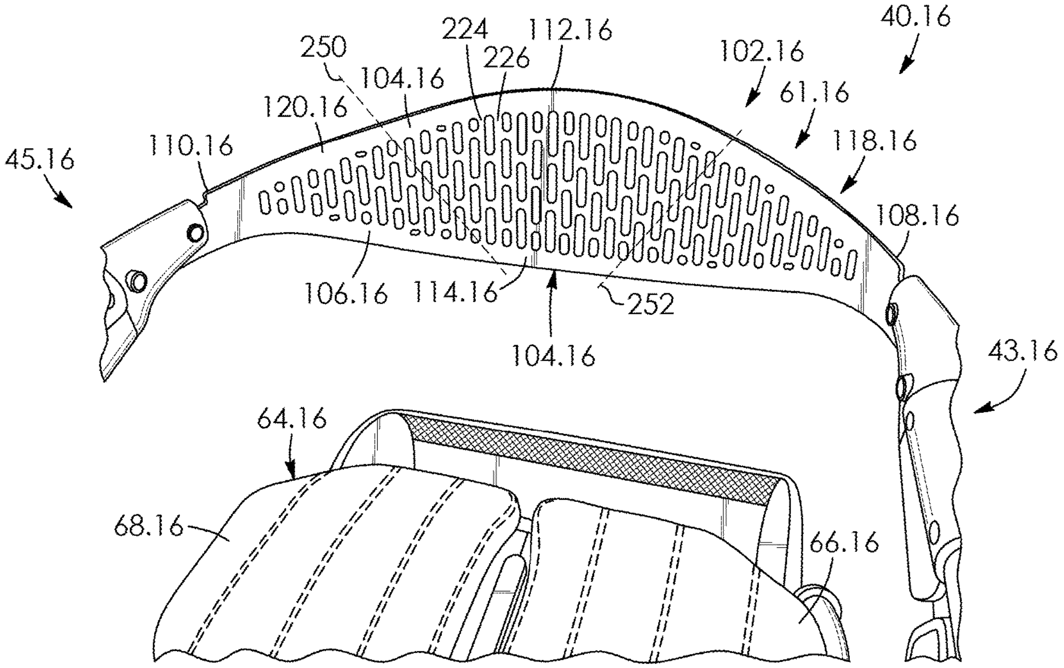
FIG. 61 is a fragmentary, rear view thereof.
Figure 62:
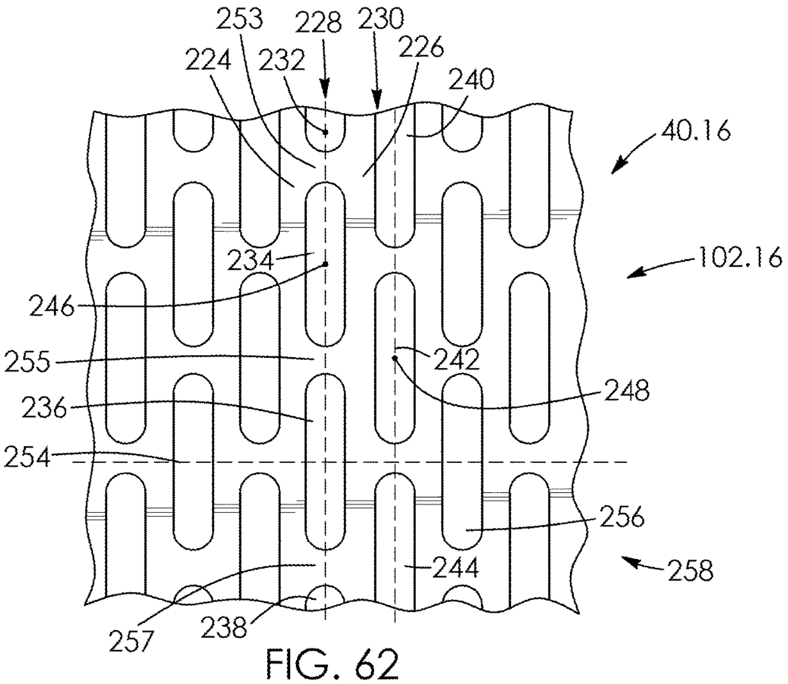
FIG. 62 is an elevation view showing a plurality of apertures of the backrest of FIG. 60, the backrest being shown in fragment.

FIGS. 60 to 62 show a walker apparatus 40.16 according to a seventeenth aspect. Like parts have like numbers and functions as the apparatus shown in FIGS. 25 to 33 with decimal extension ".16" replacing decimal extension ".2" and being added for features not previously having decimal extensions. Walker apparatus 40.16 is generally similar to walker apparatus 40.2 shown in FIG. 25, with backrest 102.16 being cantilevered to upper ends 48.16 of frame members 42.16 and 44.16 and including at least one opening or recessed portion 136.16 extending therethrough, but with the apparatus having at least the following exceptions.

The backrest 102.16 further includes a pair of elongate top and bottom members, in this example upper and lower bridging members 104.16 and 106.16. The top 112.16 of the backrest is positioned above the upper ends 48.16 of the frame members 42.16 and 44.16 of the walker apparatus 40.16 in this example. The bottom 114.16 of the backrest extends below the upper ends of the frame members of the walker apparatus in this example.

As seen in FIG. 61, the bridging members 104.16 and 106.16 of the backrest 102.16 are further apart at increasing distances from their ends 108.16 and 110.16 to the central portion 134.16 of the backrest 102.16, where they are furthest apart.

The backrest 102.16 includes a plurality of vertically-extending, spaced-apart elongate members, in this example vertical strips, as shown by adjacent strips 224 and 226. The strips connect to and extend between the bridging members 104.16 and 106.16. The strips 224 and 226 are rectangular prisms in shape in this example. The strips are longer adjacent to the central portion 134.16 of the backrest 102.16 then the strips closer to ends 108.16 and 110.16 of the bridging members 104.16 and 106.16.

The backrest 102.16 has a plurality of vertically-extending apertures extending therethrough arranged in a plurality of vertically-extending, spaced-apart columns, with each said column having a series of said apertures. This is shown in FIG. 62 by adjacent columns 228 and 230, with column 228 having apertures 232, 234, 236 and 238, and column 230 having apertures 240, 242, and 244. The apertures of column 228 have respective center points 246 which are axially offset from the center points 248 of the respective adjacent apertures of column 230 in this example. The vertically-extending apertures are between adjacent ones of the strips 224 and 226. As seen in FIG. 61, the apertures further align in diagonally-extending rows 250 and 252 in this example.

The backrest 102.16 includes a plurality of horizontally-extending elongate members, in this example horizontally extending strips, interposed between respective apertures and coupling together adjacent vertical strips. This is shown in FIG. 62 by horizontal strips 253, 255 and 257 extending between vertical strips 224 and 226. Aperture 234 is interposed between strips 253 and 255 and aperture 236 is interposed between strips 255 and 257.

Referring to FIG. 62, every second aperture aligns in a horizontally-extending row as well in this example, as seen by apertures 254, 236 and 256 in horizontally-extending row 258.

ADDITIONAL DESCRIPTION

There is provided a walker apparatus having a backrest cantilevered to its upright frame members. The backrest has at least one opening extending therethrough for permitting a user's vision past the backrest when the user grips the upright frame members.

Examples of a walker apparatus and a backrest therefor have been described. The following clauses are offered as further description.

(1) A walker apparatus having a backrest cantilevered to its upright frame members, the backrest having at least one opening extending therethrough for permitting visibility past the backrest when a user grips the upright frame members.

(2) The apparatus of clause 1 further including a seat operatively connected to the upright frame members.

(3) The apparatus of at least one of the preceding clauses wherein the backrest is flexible and arcuate.

(4) The apparatus of at least one of the preceding clauses wherein the backrest is horizontally split.

(5) The apparatus of at least one of the preceding clauses wherein the backrest includes a pair of spaced-apart straps.

(6) The apparatus of at least one of the preceding clauses wherein the straps connect together at common ends.

(7) The apparatus of at least one of the preceding clauses wherein an upper one of the straps is U-shaped in cross-section.

(8) The apparatus of at least one of the preceding clauses wherein an upper one of the straps is upwardly-convex in cross-section.

(9) The apparatus of at least one of the preceding clauses wherein the frame members have upper ends and wherein an upper one of the straps extends upwardly from the upper ends of the frame members.

(10) The apparatus of at least one of the preceding clauses wherein an upper one of the straps operatively extends in an upwardly curved manner from the frame members.

(11) The apparatus of at least one of the preceding clauses wherein the straps extend from the frame members in outwardly divergent directions relative to each other.

(12) The apparatus of at least one of the preceding clauses wherein an upper one of the straps extends from the frame members in an upward direction and wherein a lower one of the straps extends from the frame members in a downward direction.

(13) The apparatus of at least one of the preceding clauses wherein an upper one of the straps extends from the frame members in an upwardly-concave manner and wherein a lower one of the straps extends from the frame members in a downwardly-concave manner.

(14) The apparatus of at least one of the preceding clauses wherein the backrest has a central portion positioned between the frame members and wherein the straps are further spaced-apart as the straps move away from the frame members towards to the central portion of the backrest.

(15) The apparatus of at least one of the preceding clauses wherein the walker apparatus has a pair of sides and wherein the backrest has extending therethrough an oval-shaped aperture with tapered ends positioned adjacent to the sides of the walker apparatus, the aperture being positioned between the straps.

(16) The apparatus of at least one of the preceding clauses wherein the walker apparatus includes a folding mechanism operatively connected to and interposed between the frame members, the folding mechanism enabling the walker apparatus to be laterally-foldable along a folding axis, the straps being furthest spaced-apart relative to each other in a region aligning with the folding axis.

(17) The apparatus of at least one of the preceding clauses further including an adjustment mechanism that enables the extent to which the backrest extends from the frame members to be adjustable.

(18) The apparatus of at least one of the preceding clauses further including a handle brake assembly and wherein the adjustment mechanism comprises at least one female connector having a plurality of horizontally spaced-apart apertures extending therethrough and at least one male connector, the at least one male connector being receivable with respective ones of the apertures of the at least one female connector, the at least one female connector being a part of a first one of the handle brake assembly and distal ends of the backrest and the at least one male connector coupling to a second one of the handle brake assembly and distal ends of the backrest.

(19) The apparatus of at least one of the preceding clauses wherein the adjustment mechanism includes a pair of female connectors operatively connected to respective ones of the frame members, each female connector including a slot extending therein and each female connector including a plurality of horizontally-spaced recesses positioned within said slot, and wherein the adjustment mechanism includes vertically extending protrusions located adjacent to respective ones of the distal ends of the backrest, the protrusions being receivable within selective ones of said recesses of the female connectors.

(20) The apparatus of at least one of the preceding clauses further including a pair of slide rail assemblies, the backrest operatively connecting to and being extendable relative to the frame members via the slide rail assemblies.

(21) The apparatus of at least one of the preceding clauses wherein the straps extend along the front and sides of the walker apparatus.

(22) The apparatus of at least one of the preceding clauses wherein the straps extend along the front of the walker apparatus.

(23) The apparatus of at least one of the preceding clauses wherein the straps are symmetrical about the vertical and horizontal axes of the backrest.

(24) The apparatus of at least one of the preceding clauses wherein the backrest is arcuate with an inner portion formed of polypropylene and an outer portion formed of thermoplastic polyurethane.

(25) The apparatus of at least one of the preceding clauses wherein the backrest is elliptical from the side as the backrest extends from the frame members.

(26) The apparatus of at least one of the preceding clauses wherein the backrest is y-shaped from the side as the backrest extends from the frame members.

(27) The apparatus of at least one of the preceding clauses wherein the backrest is u-shaped from the side as the backrest extends from the frame members.

(28) The apparatus of at least one of the preceding clauses wherein an upper one of the straps aligns with and tangentially extends from upper ends of the frame members and wherein a lower one of the straps extends in a spaced-apart and parallel manner relative to the upper one of the straps.

(29) The apparatus of at least one of the preceding clauses further including a pair of arc-shaped connecting members that connect the upper and lower ones of the straps together.

(30) The apparatus of at least one of the preceding clauses wherein the upper and lower ones of the straps connect to and extend tangentially from the arc-shaped connecting members.

(31) The apparatus of at least one of the preceding clauses further including a pair of s-shaped connecting members that connect the upper and lower ones of the straps together.

(32) The apparatus of at least one of the preceding clauses wherein an upper one of the straps aligns with and tangentially extends from upper ends of the frame members and wherein a lower one of the straps is spaced-apart below the upper ends of the frame members.

(33) The apparatus of at least one of the preceding clauses wherein the backrest includes a concave-shaped interior and a cushioning member positioned within said interior.

(34) The apparatus of at least one of the preceding clauses wherein cushioning member has an aperture extending therethrough.

(35) The apparatus of at least one of the preceding clauses wherein the cushioning member is loop-shaped.

(36) The apparatus of at least one of the preceding clauses wherein the backrest includes a cushioning member that substantially extends around the straps.

(37) The apparatus of at least one of the preceding clauses wherein the backrest includes a concave-shaped interior and a cushioning member positioned within said interior, the cushioning member connecting to and extending from one of the straps.

(38) The apparatus of at least one of the preceding clauses wherein an upper one of the straps is spaced-apart above upper ends of the frame members and wherein a lower one of the straps is spaced-apart below the upper ends of the frame members.

(39) The apparatus of at least one of the preceding clauses wherein each of the frame members is telescopic and includes a push button for selecting adjusting the height thereof.

(40) The apparatus of at least one of the preceding clauses wherein said at least one opening extends in a substantially horizontal direction.

(41) The apparatus of at least one of the preceding clauses wherein said at least one opening extends in a substantially vertical direction.

(42) The apparatus of at least one of the preceding clauses wherein the backrest has at least one aperture extending therethrough which extends in a substantially horizontal direction and at least one aperture extending therethrough which extends in a substantially vertical direction.

(43) The apparatus of at least one of the preceding clauses wherein the backrest comprises a plurality of spaced-apart, vertically-extending ribs with a plurality of vertically-extending apertures interposed between respective ones of the ribs.

(44) The apparatus of at least one of the preceding clauses wherein the backrest further includes a pair of substantially-horizontal upper and lower bridging members, the ribs connecting to and extending between the bridging members.

(45) The apparatus of at least one of the preceding clauses wherein the ribs radially extend outwards relative to the bridging members.

(46) The apparatus of at least one of the preceding clauses wherein the backrest has a convex-shaped exterior and a receptacle for storing objects, the receptacle connecting to the exterior of the backrest.

(47) The apparatus of at least one of the preceding clauses wherein an upper one of the straps includes a plurality of spaced-apart grooves partially extending therethrough.

(48) The apparatus of at least one of the preceding clauses wherein the opening is in the form of a substantially-horizontally extending aperture which aligns upper ends of the frame members, the upper one of the straps being positioned above the upper ends of the frame members and a lower one of the straps being positioned below the upper ends of the frame members.

(49) The apparatus of at least one of the preceding clauses wherein the upper one of the straps comprises an upper half of the backrest and wherein the aperture and the lower strap comprise a lower half of the backrest.

(50) The apparatus of at least one of the preceding clauses wherein an upper one of the straps includes a plurality of spaced-apart vertically-extending slits and wherein the backrest further includes a plurality of spaced-apart, vertically-extending ribs coupled to the upper one of the straps with the plurality of vertically-extending slits being interposed between respective ones of the ribs.

(51) The apparatus of at least one of the preceding clauses further including a pair of u-shaped, resilient connecting members that operatively connect the backrest to upper ends of the frame members, respectively.

(52) The apparatus of at least one of the preceding clauses wherein the backrest is substantially rectangular in profile.

(53) The apparatus of at least one of the preceding clauses wherein the backrest includes a plurality of spaced-apart vertically-extending strips and a plurality of spaced-apart horizontally-extending strips intersecting with the vertically-extending strips.

(54) The apparatus of at least one of the preceding clauses wherein the backrest includes a plurality of spaced-apart, vertically-extending

(55) The apparatus of at least one of the preceding clauses wherein the backrest includes a top and wherein the at least one opening is a recessed portion centrally extending downwards from the top of the backrest when the walker apparatus is upright.

(56) The apparatus of at least one of the preceding clauses wherein the recessed portion of the backrest extends from an upper half of the backrest to a lower half of the backrest.

(57) The apparatus of at least one of the preceding clauses wherein the backrest includes a top, an upper recessed portion extending downwards from the top of the backrest, a bottom spaced-apart from the top, and a lower recessed portion extending upwards from the bottom of the backrest when the walker apparatus is upright.

(58) The apparatus of at least one of the preceding clauses wherein the backrest has a central portion located between the frame members, the recessed portions being positioned within said central portion of the backrest.

(59) The apparatus of at least one of the preceding clauses wherein the backrest comprises a pair of substantially rectangular portions coupled together at lower halves thereof.

(60) The apparatus of at least one of the preceding clauses wherein a centrally positioned, vertically-extending rib couples the rectangular portions of the backrest together.

(61) The apparatus of at least one of the preceding clauses wherein the backrest is shaped to form a substantially v-shape when the walker apparatus is folded laterally.

(62) The apparatus of at least one of the preceding clauses wherein the straps are substantially inwardly spaced-apart from support members when the apparatus is folded laterally.

(63) A walker apparatus comprising: a pair of spaced-apart, upright frame members; a seat operatively connected to the upright frame members; and a backrest cantilevered from the frame members, the backrest including a plurality of spaced-apart, vertically-extending ribs and a pair of substantially-horizontal upper and lower bridging members, the ribs connecting to and extending between the bridging members.

(64) The apparatus of at least one of the preceding clauses wherein the upper bridging member upwardly curves as the backrest extends towards its central portion.

(65) The apparatus of at least one of the preceding clauses wherein the lower bridging member downwardly curves as the backrest extends towards its central portion.

(66) A walker apparatus comprising a pair of spaced-apart, upright frame members, a pair of support members extending outwards from the frame members, a seat connected to and extending between the support members, and a pair of coupling members connecting the frame members and the support members together, each of the coupling members comprising an upright tubular portion which at least partially extends around part of a respective one of the frame members and an arcuate-shaped tubular portion which at least partially extends around part of a respective one of the support members.

(67) The apparatus of clause 66 wherein the coupling members are L-shaped.

(68) The apparatus of any one of clauses 66 and 67 wherein the support members are arcuate-shaped.

(69) The apparatus of any one of clauses 66 to 68 wherein the coupling members have upper ends in the form of elongate rods to which the seat pivotally connects.

(70) The apparatus of any one of clauses 66 to 68 wherein the coupling members have upper ends in the form of receptacles to which the seat pivotally connects.

It will be appreciated that many variations are possible within the scope of the invention described herein. It will be further understood by someone skilled in the art that many of the details provided above are by way of example only and are not intended to limit the scope of the invention which is to be determined with reference to at least the following claims.

What is claimed is:

1. A backrest for a walker apparatus, the backrest having at least one opening extending therethrough and comprising a pair of spaced-apart, elongate upper and lower portions, the portions of the backrest connecting together at common ends, being flexible and extending from the walker apparatus in outwardly divergent directions relative to each other.

2. The backrest as claimed in claim 1, wherein said at least one opening extends in a substantially horizontal direction.

3. The backrest as claimed in claim 1, wherein the backrest is arcuate and laterally-foldable.

4. The backrest as claimed in claim 1, wherein the backrest has a plurality of vertically-extending apertures extending therethrough.

5. The backrest as claimed in claim 4, further including a plurality of vertically-extending strips coupled to and extending between the upper portion and the lower portion of the backrest, the vertically-extending apertures being interposed between adjacent ones of the strips.

6. A walker apparatus, comprising:

the backrest as claimed in claim 1; and a pair of spaced-apart, upright frame members having upper ends, the upper portion of the backrest extending upwardly from the upper ends of the frame members when the walker apparatus is upright.

7. A walker apparatus, comprising:

the backrest as claimed in claim 1; and a pair of spaced-apart, upright frame members having upper ends, the lower portion of the backrest extending downwardly from the upper ends of the frame members when the walker apparatus is upright.

8. A walker apparatus, comprising:

the backrest as claimed in claim 1; and a pair of spaced-apart, upright frame members, said at least one opening of the backrest aligning with upper ends of the frame members.

9. A walker apparatus comprising:

a pair of spaced-apart, upright frame members; and a backrest cantilevered to the frame members, the backrest being substantially rectangular in front profile, and wherein the walker apparatus further includes a pair of u-shaped, resilient connecting members that connect the backrest to upper ends of the frame members, respectively.

10. The walker apparatus as claimed in claim 9, wherein the backrest has a plurality of spaced-apart vertically-extending slits extending therethrough.

11. The walker apparatus as claimed in claim 9 wherein the backrest includes a plurality of spaced-apart vertically-extending strips and a plurality of spaced-apart horizontally-extending strips intersecting with the vertically-extending strips in a grid-like pattern.

12. A backrest for a walker apparatus having upright members, the backrest being cantilevered to said upright members, being arcuate-shaped, being flexible, being outwardly-divergent and having a plurality of vertically-extending apertures extending therethrough.

13. The backrest as claimed in claim 12, further including a plurality of vertically-extending strips, the vertically-extending apertures being between adjacent ones of the strips.

14. The backrest as claimed in claim 13, wherein the strips are rectangular prisms in shape and wherein the backrest further includes a pair of upper and lower bridging members, the strips connecting to and extending between the bridging members.

15. The backrest as claimed in claim 12 wherein the apertures are arranged in a plurality of vertically-extending, spaced-apart columns, with each said column having a series of said apertures, the apertures further aligning in diagonally-extending rows.

16. A walker apparatus, comprising:

a pair of spaced-apart, upright frame members having upper ends;

a backrest cantilevered to the frame members, the backrest including a pair of spaced-apart, elongate upper and lower straps, a first of said straps of the backrest aligning with and tangentially extending from the upper ends of the frame members; and a pair of arc-shaped connecting members that connect the upper strap and the lower strap together, the upper strap and the lower strap connecting to and extending tangentially from the arc-shaped connecting members.

17. A walker apparatus, comprising:

a pair of spaced-apart, upright frame members having upper ends; and a backrest cantilevered to the frame members, the backrest including a pair of spaced-apart, elongate upper and lower straps, a first of said straps of the backrest aligning with and tangentially extending from the upper ends of the frame members, the backrest having a concave-shaped interior, and the backrest including a pair of cushioning members each coupling to a respective one of the straps of the backrest, the cushioning members being positioned within said interior of the backrest.

18. A backrest for a walker apparatus, the backrest having at least one opening extending therethrough and comprising a pair of spaced-apart, elongate upper and lower portions, the portions of the backrest connecting together at common ends, being flexible, and being most spaced-apart relative to each other in a region that aligns with a folding axis of the walker apparatus.

19. A walker apparatus, comprising:

a pair of spaced-apart, upright frame members; and the backrest as claimed in claim 18, the backrest having proximal ends coupled to the frame members and the backrest including a central portion positioned between the frame members, the upper portion and the lower portion of the backrest being increasingly spaced-apart as the upper portion and the lower portion of the backrest extend outwards from the proximal ends of the backrest and towards the central portion of the backrest.

20. A walker apparatus, comprising:

a pair of spaced-apart, upright frame members;

the backrest of claim 18, the backrest being cantilevered to the frame members; and a folding mechanism operatively connected to and interposed between the frame members, the folding mechanism enabling the walker apparatus to be laterally-foldable along said folding axis.

* * * * *